United States Patent
Sirohiwala et al.

(10) Patent No.: US 10,048,718 B2
(45) Date of Patent: Aug. 14, 2018

(54) JOYSTICK ASSEMBLY

(71) Applicant: ALLEGRO MICROSYSTEMS, LLC, Worcester, MA (US)

(72) Inventors: Ali Husain Yusuf Sirohiwala, Somerville, MA (US); William P. Taylor, Amherst, NH (US); Katherine Shamberger, Groton, MA (US)

(73) Assignee: ALLEGRO MICROSYSTEMS, LLC, Manchester, NH (US)

( * ) Notice: Subject to any disclaimer, the term of this patent is extended or adjusted under 35 U.S.C. 154(b) by 3 days.

(21) Appl. No.: 15/224,942

(22) Filed: Aug. 1, 2016

(65) Prior Publication Data
US 2016/0334830 A1   Nov. 17, 2016

Related U.S. Application Data

(63) Continuation-in-part of application No. 14/748,823, filed on Jun. 24, 2015, now Pat. No. 9,852,832.
(Continued)

(51) Int. Cl.
*G01B 7/30* (2006.01)
*G05G 5/05* (2006.01)
(Continued)

(52) U.S. Cl.
CPC ............... *G05G 5/05* (2013.01); *G01D 5/145* (2013.01); *G05G 1/04* (2013.01); *G05G 1/08* (2013.01);
(Continued)

(58) Field of Classification Search
CPC ..................................................... G01D 5/145
(Continued)

(56) References Cited

U.S. PATENT DOCUMENTS

| 7,518,374 | B1 * | 4/2009 | Olsson | ..................... G01V 3/15 |
| | | | | 324/260 |
| 2008/0184799 | A1 * | 8/2008 | Phan Le | ............... G01P 15/105 |
| | | | | 73/514.31 |

(Continued)

OTHER PUBLICATIONS

Response filed Sep. 9, 2016 to Non-Final Office Action dated Jul. 1, 2016; for U.S. Appl. No. 13/960,910; 11 pages.
(Continued)

*Primary Examiner* — Reena Aurora
(74) *Attorney, Agent, or Firm* — Daly, Crowley, Mofford & Durkee, LLP

(57) ABSTRACT

A joystick assembly for use with a device including a joystick surface and a first magnet having north and south magnetic poles includes a second magnet having north and south magnetic poles and a movable elongated shaft having first and second opposing ends arranged along a major axis of the shaft. The first end of the shaft is coupled to the second magnet such that movement of the shaft results in movement of the second magnet relative to the first magnet such that a line between centers of the north and south magnetic poles of the second magnet is movable relative to a line between the north and south magnetic poles of the first magnet. An attraction of the second magnet to the first magnet results in a restoring force upon the shaft, and the shaft and the second magnet are removable from the joystick surface.

18 Claims, 25 Drawing Sheets

Related U.S. Application Data

(60) Provisional application No. 62/016,772, filed on Jun. 25, 2014.

(51) Int. Cl.
  *G05G 1/04* (2006.01)
  *G05G 1/08* (2006.01)
  *G01D 5/14* (2006.01)
  *H01F 7/02* (2006.01)

(52) U.S. Cl.
  CPC .......... *H01F 7/021* (2013.01); *H01F 7/0273* (2013.01); *G05G 2505/00* (2013.01)

(58) Field of Classification Search
  USPC .................................................. 324/207.22
  See application file for complete search history.

(56) References Cited

U.S. PATENT DOCUMENTS

| | | |
|---|---|---|
| 2010/0265176 A1 | 10/2010 | Olsson et al. |
| 2013/0147642 A1 | 6/2013 | Rubio et al. |
| 2015/0042320 A1 | 2/2015 | Cadugan et al. |
| 2015/0377648 A1 | 12/2015 | Sirohiwala et al. |

OTHER PUBLICATIONS

Final Office Action dated Sep. 28, 2016; for U.S. Appl. No. 13/960,910; 27 pages.
Invitation to Pay Additional Fees dated Jan. 4, 2018 for PCT Application No. PCT/US2017/042094; 15 pages.

\* cited by examiner

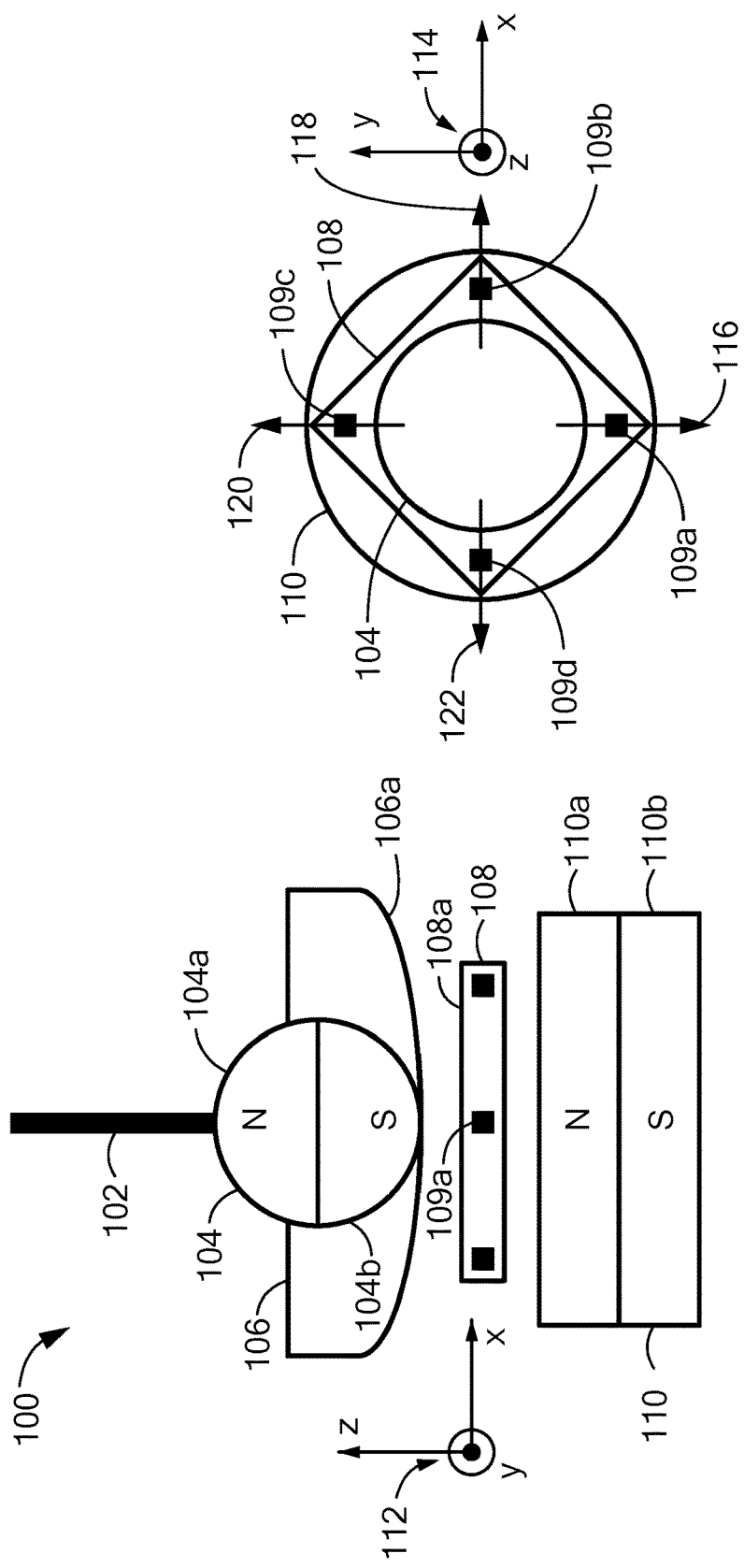

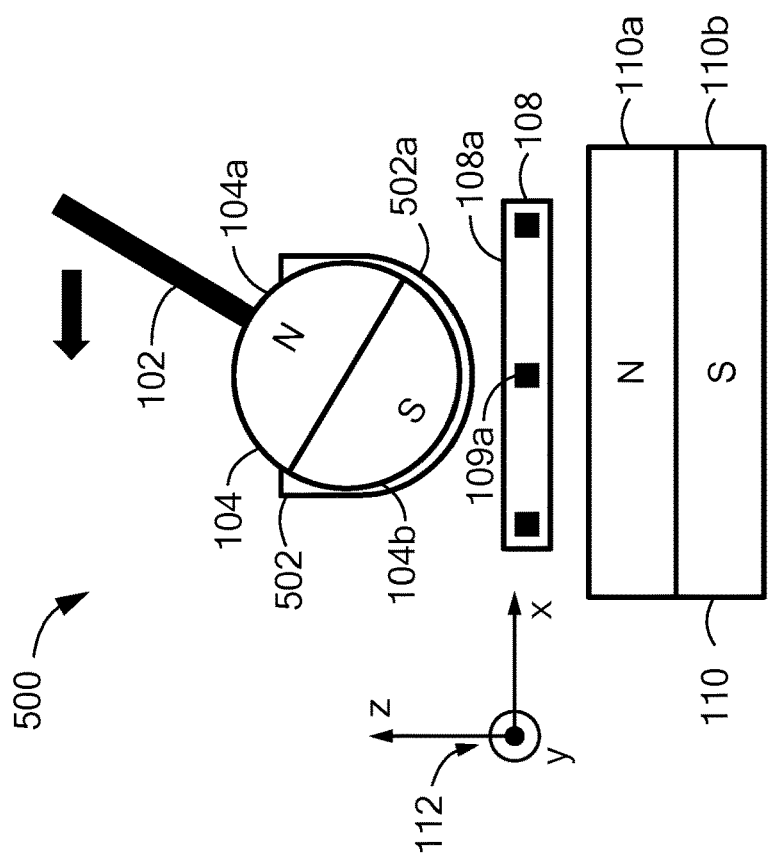
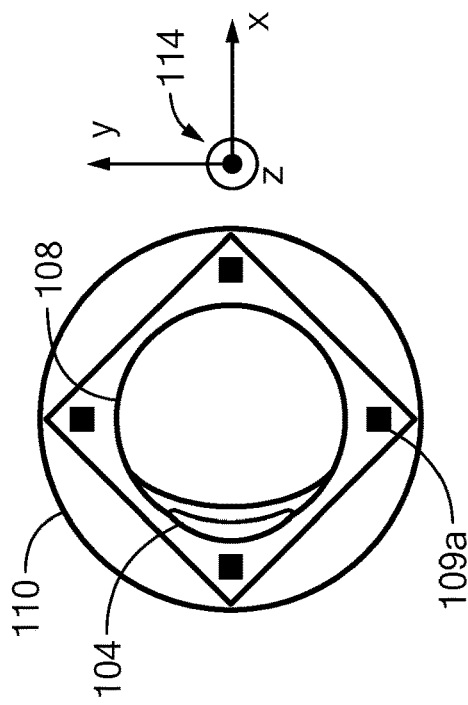
FIG. 7
FIG. 8

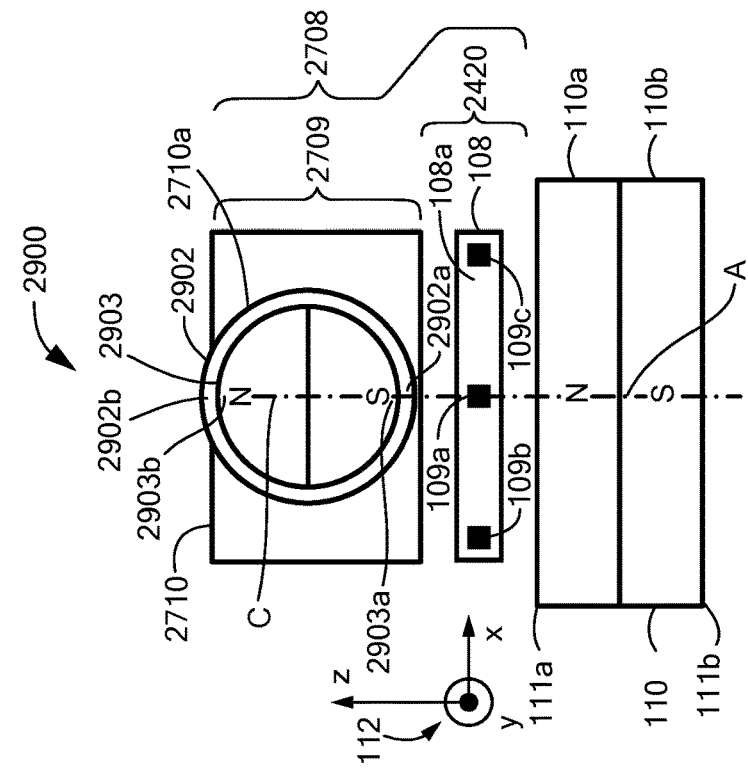
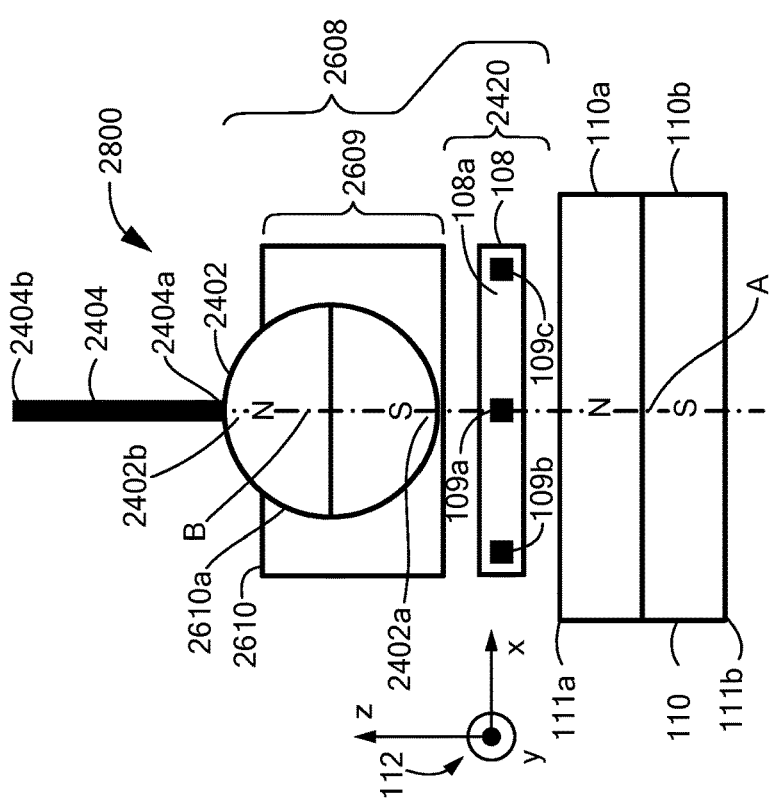

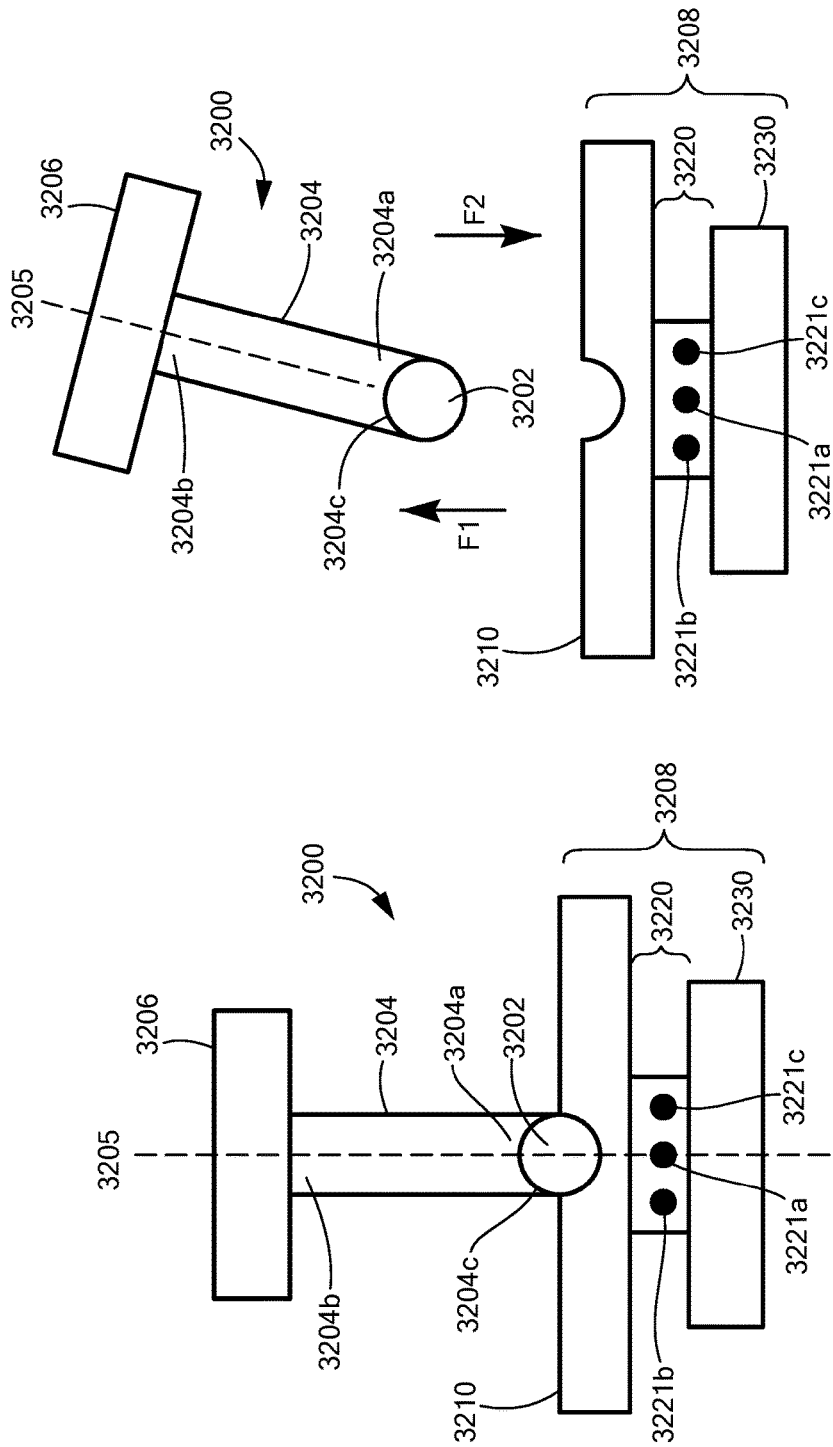

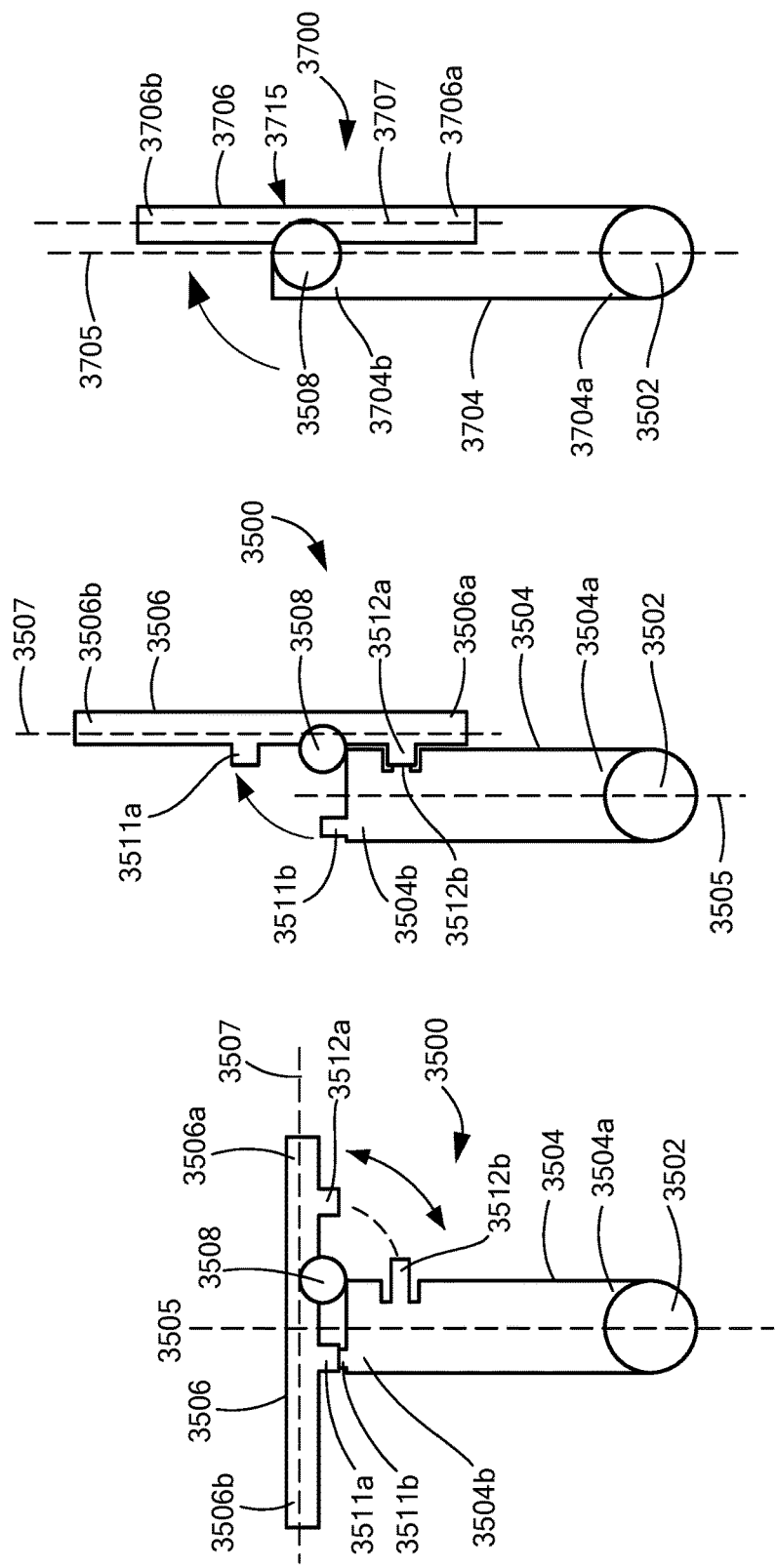

JOYSTICK ASSEMBLY

CROSS REFERENCE TO RELATED APPLICATIONS

This application is a Continuation-in-Part (CIP) application of and claims the benefit of and priority to U.S. patent application Ser. No. 14/748,823, filed on Jun. 24, 2015, which application claims the benefit of U.S. Provisional Application No. 62/016,772 filed on Jun. 25, 2014 under 35 U.S.C. § 119(e), which applications are incorporated by reference herein in their entirety.

STATEMENT REGARDING FEDERALLY SPONSORED RESEARCH

Not Applicable.

FIELD

This disclosure relates generally to magnetic field sensors and, more particularly, to a joystick assembly for use with a device including at least a first magnet having north and south magnetic poles.

BACKGROUND

Joystick assemblies are known. A known joystick has a shaft, which can be moved by a user, and electronics, which can sense the position of the shaft. Some known types of joysticks employ optical elements to sense a position of the shaft. Other known types of joysticks employ magnetic elements to sense a position of the shaft.

Some known types of joysticks employ a restoring force, such that, when the user releases the shaft of the joystick, the shaft returns to the center zero position. Other known types of joysticks, such as trackballs, can only sense relative motion of the trackballs with respect to a previous position of the trackballs and do not employ a restoring force.

Additionally, known joysticks are typically substantially fixed to the devices in which they are used. Further, known joysticks typically comprise a plurality of mechanical components, such as actuator devices, springs, and washers. As is known, mechanical components are subject to mechanical wear (e.g., due to mechanical forces) and typically need to be replaced long before the electrical components (e.g., sensors) in which the mechanical components are used with.

SUMMARY

The present disclosure provides a magnetic assembly that may be used in a joystick, or that may be used in other applications, for which magnets used in the magnetic assembly provide a restoring force, and for which movement of one of the magnets used in the magnetic assembly is sensed by electronic circuits associated therewith. An electronic circuit can be used in the magnetic assembly to provide one or more output signals representative of one or more angles associated with the magnets. A magnetic field sensor can include one magnet.

The present disclosure also provides a joystick assembly that may be used in connection with the magnetic assembly according to the disclosure, or other magnet assemblies. The joystick assembly can have a reduced number of mechanical components in comparison to known joystick assemblies. Additionally, the joystick assembly can be adapted for use with devices in a variety of applications, including consumer, industrial and manufacturing applications.

In accordance with an example useful for understanding an aspect of the present disclosure, a magnetic field sensor includes an electronic circuit. The electronic circuit can include one or more of the following:

a substrate having a major surface disposed in an x-y plane;

first, second, third, and fourth magnetic field sensing elements disposed upon the major surface of the substrate and configured to generate first, second, third and fourth respective electronic magnetic field signals, wherein each electronic magnetic field signal is responsive to a respective magnetic field parallel to the major surface of the substrate, wherein the first and third magnetic field sensing elements have respective first and third maximum response axes parallel to each other, directed in opposite directions, and parallel to the major surface of the substrate, and wherein the second and fourth magnetic field sensing elements have respective second and fourth maximum response axes parallel to each other, directed in opposite directions, and parallel the major surface of the substrate, wherein the first and third major response axes are not parallel to the second and fourth major response axes;

a first differential circuit coupled to the first and third magnetic field sensing elements and configured to generate a first difference signal related to a difference between the first and third electronic magnetic field signals; or a second differential circuit coupled to the second and fourth magnetic field sensing elements and configured to generate a second difference signal related to a difference between the second and fourth electronic magnetic field signals, wherein the first difference signal has an amplitude related to a an x-axis projection upon the x-y plane and the second difference signal has an amplitude related to a y-axis projection upon the x-y plane.

In accordance with an example useful for understanding another aspect of the present disclosure, a magnetic assembly can include one or more of the following:

a first magnet having north and south magnetic poles;

a second magnet having north and south magnetic poles;

a movable shaft fixedly coupled to the second magnet such that movement of the movable shaft results in movement of the second magnet relative to the first magnet such that a line between centers of the north and south magnetic poles of the second magnet is movable relative to a line between the north and south magnetic poles of the first magnet, wherein an attraction of the second magnet to the first magnet result in a restoring force upon the shaft; or a magnetic field sensor disposed between the first and second magnets, wherein the magnetic field sensor comprises an electronic circuit.

The electronic circuit can include one or more of the following:

a substrate having a major surface disposed in an x-y plane, wherein the line between centers of the north and south magnetic poles of the first magnet is perpendicular to the x-y plane;

first, second, third, and fourth magnetic field sensing elements disposed upon the major surface of the substrate and configured to generate first, second, third and fourth respective electronic magnetic field signals, wherein each electronic magnetic field signal is responsive to a respective magnetic field parallel to the major surface of the substrate, wherein the first and third magnetic field sensing elements have respective first and third maximum response axes parallel to each other, directed in opposite directions, and parallel the major surface of the substrate, and wherein the second and fourth magnetic field sensing elements have respective second and fourth maximum response axes parallel to each other, directed in opposite directions, and parallel the major surface of the substrate, wherein the first and third major response axes are not parallel to the second and fourth major response axes;

a first differential circuit coupled to the first and third magnetic field sensing elements and configured to generate a first difference signal related to a difference between the first and third electronic magnetic field signals; or a second differential circuit coupled to the second and fourth magnetic field sensing elements and configured to generate a second difference signal related to a difference between the second and fourth electronic magnetic field signals, wherein the first difference signal has an amplitude related to a an x-axis projection upon the x-y plane and the second difference signal has an amplitude related to a y-axis projection upon the x-y plane.

In accordance with an example useful for understanding another aspect of the present disclosure, a method of sensing a position of a magnet can include one or more of the following:

providing, upon a substrate, first, second, third, and fourth magnetic field sensing elements configured to generate first, second, third and fourth respective electronic magnetic field signals, wherein each electronic magnetic field signal is responsive to a respective magnetic field parallel to the major surface of the substrate, wherein the first and third magnetic field sensing elements have respective first and third maximum response axes parallel to each other, directed in opposite directions, and parallel to the major surface of the substrate, and wherein the second and fourth magnetic field sensing elements have respective second and fourth maximum response axes parallel to each other, directed in opposite directions, and parallel the major surface of the substrate, wherein the first and third major response axes are not parallel to the second and fourth major response axes;

generating a first difference signal related to a difference between the first and third electronic magnetic field signals; or generating a second difference signal related to a difference between the second and fourth electronic magnetic field signals.

In accordance with an example useful for understanding another aspect of the present disclosure, a method of sensing a position of a magnet can include one or more of the following:

providing a first magnet having north and south magnetic poles;

providing a second magnet having north and south magnetic poles;

providing a movable shaft fixedly coupled to the second magnet such that movement of the movable shaft results in movement of the second magnet relative to the first magnet such that a line between centers of the north and south magnetic poles of the second magnet is movable relative to a line between the north and south magnetic poles of the first magnet, wherein an attraction of the second magnet to the first magnet result in a restoring force upon the shaft; or providing a magnetic field sensor disposed between the first and second magnets, wherein the magnetic field sensor comprises an electronic circuit.

The electronic circuit can include one or more of the following:

a substrate having a major surface disposed in an x-y plane, wherein the line between centers of the north and south magnetic poles of the first magnet is perpendicular to the x-y plane; or first, second, third, and fourth magnetic field sensing elements disposed upon the major surface of the substrate and configured to generate first, second, third and fourth respective electronic magnetic field signals, wherein each electronic magnetic field signal is responsive to a respective magnetic field parallel to the major surface of the substrate, wherein the first and third magnetic field sensing elements have respective first and third maximum response axes parallel to each other, directed in opposite directions, and parallel the major surface of the substrate, and wherein the second and fourth magnetic field sensing elements have respective second and fourth maximum response axes parallel to each other, directed in opposite directions, and parallel the major surface of the substrate, wherein the first and third major response axes are not parallel to the second and fourth major response axes.

The method can include one or more of the following:

generating a first difference signal related to a difference between the first and third electronic magnetic field signals; or generating a second difference signal related to a difference between the second and fourth electronic magnetic field signals, wherein the first difference signal has an amplitude related to a an x-axis projection upon the x-y plane and the second difference signal has an amplitude related to a y-axis projection upon the x-y plane.

In accordance with an example useful for understanding another aspect of the present disclosure, a magnetic field sensor can include an electronic circuit. The electronic circuit can include one or more of the following:

a substrate having a major surface disposed in an x-y plane;

a plurality of magnetic field sensing elements disposed upon the major surface of the substrate and configured to generate a respective plurality of electronic magnetic field signals, wherein each electronic magnetic field signal is responsive to a respective magnetic field parallel to the major surface of the substrate, wherein the plurality of magnetic field sensing elements have respective maximum response axes directed in different directions and parallel to the major surface of the substrate;

a processor coupled to the plurality of magnetic field sensing elements and configured to generate a first signal and a second signal, wherein the first signal has an amplitude related to a an x-axis projection upon the x-y plane and the second signal has an amplitude related to a y-axis projection upon the x-y plane; or a magnet disposed at a fixed relationship and proximate to the substrate, wherein the magnet has a north pole and a south pole, a line between which is perpendicular to the major surface of the substrate, wherein a magnetic force of the magnet results in a restoring force upon a shaft.

In accordance with an example useful for understanding another aspect of the present disclosure, a magnetic assembly can include one or more of the following:

a first magnet having north and south magnetic poles;

a second magnet having north and south magnetic poles;

a movable shaft fixedly coupled to the second magnet such that movement of the movable shaft results in movement of the second magnet relative to the first magnet such that a line between centers of the north and south magnetic poles of the second magnet is movable relative to a line between the north and south magnetic poles of the first magnet, wherein an attraction of the second magnet to the first magnet result in a restoring force upon the shaft; or a magnetic field sensor disposed between the first and second magnets, wherein the magnetic field sensor comprises an electronic circuit.

The electronic circuit can include one or more of the following.

a substrate having a major surface disposed in an x-y plane, wherein the line between centers of the north and south magnetic poles of the first magnet is perpendicular to the x-y plane;

a plurality of magnetic field sensing elements disposed upon the major surface of the substrate and configured to generate a respective plurality of electronic magnetic field signals, wherein each electronic magnetic field signal is responsive to a respective magnetic field parallel to the major surface of the substrate, wherein the plurality of magnetic field sensing elements have respective maximum response axes directed in different directions and parallel to the major surface of the substrate; or a processor coupled to the plurality of magnetic field sensing elements and configured to generate a first signal and a second signal, wherein the first signal has an amplitude related to a an x-axis projection upon the x-y plane and the second signal has an amplitude related to a y-axis projection upon the x-y plane.

In accordance with an example useful for understanding another aspect of the present disclosure, a method of sensing a position of a magnet can include one or more of the following:

providing, upon a substrate, a plurality of magnetic field sensing elements disposed upon the major surface of the substrate and configured to generate a respective plurality of electronic magnetic field signals, wherein each electronic magnetic field signal is responsive to a respective magnetic field parallel to the major surface of the substrate, wherein the plurality of magnetic field sensing elements have respective maximum response axes directed in different directions and parallel to the major surface of the substrate;

generating a first signal and a second signal, wherein the first signal has an amplitude related to a an x-axis projection upon the x-y plane and the second signal has an amplitude related to a y-axis projection upon the x-y plane; or providing a magnet disposed at a fixed relationship and proximate to the substrate, wherein the magnet has a north pole and a south pole, a line between which is perpendicular to the major surface of the substrate, wherein a magnetic force of the magnet results in a restoring force upon a shaft.

In accordance with an example useful for understanding another aspect of the present disclosure, a method of sensing a position of a magnet can include one or more of the following:

providing a first magnet having north and south magnetic poles;

providing a second magnet having north and south magnetic poles;

providing a movable shaft fixedly coupled to the second magnet such that movement of the movable shaft results in movement of the second magnet relative to the first magnet such that a line between centers of the north and south magnetic poles of the second magnet is movable relative to a line between the north and south magnetic poles of the first magnet, wherein an attraction of the second magnet to the first magnet result in a restoring force upon the shaft; or providing a magnetic field sensor disposed between the first and second magnets, wherein the magnetic field sensor comprises an electronic circuit.

The electronic circuit can include one or more of the following:

a substrate having a major surface disposed in an x-y plane, wherein the line between centers of the north and south magnetic poles of the first magnet is perpendicular to the x-y plane; or a plurality of magnetic field sensing elements disposed upon the major surface of the substrate and configured to generate a respective plurality of electronic magnetic field signals, wherein each electronic magnetic field signal is responsive to a respective magnetic field parallel to the major surface of the substrate, wherein the plurality of magnetic field sensing elements have respective maximum response axes directed in different directions and parallel to the major surface of the substrate.

The method can also include: generating a first signal and a second signal, wherein the first signal has an amplitude related to an x-axis projection upon the x-y plane and the second signal has an amplitude related to a y-axis projection upon the x-y plane.

In one aspect of the concepts described herein, a joystick assembly according to the disclosure for use with a device including a joystick surface and a first magnet having north and south magnetic poles includes a second magnet having north and south magnetic poles. The joystick assembly also includes a movable elongated shaft having first and second opposing ends arranged along a major axis of the shaft. The first end of the shaft is coupled to the second magnet such that movement of the shaft results in movement of the second magnet relative to the first magnet. Additionally, the first end of the shaft is coupled to the second magnet such that a line between centers of the north and south magnetic poles of the second magnet is movable relative to a line between the north and south magnetic poles of the first magnet. Attraction of the second magnet to the first magnet results in a restoring force upon the shaft, and the shaft and the second magnet are removable from the joystick surface.

The joystick assembly may include one or more of the following features individually or in combination with other features. The movable elongated shaft and the second magnet may be removable upon application of a force which is greater than and in a substantially opposite direction with respect to the attraction of the second magnet to the first magnet. The device may include a magnetic field sensor disposed between the joystick surface and the second magnet. The magnetic field sensor may include a plurality of magnetic field sensing elements supported by a substrate. The magnetic field sensing elements may be configured to generate a respective plurality of magnetic field signals and to detect a position of the second magnet relative to the first magnet.

The joystick assembly may include a handle coupled to the second end of the movable elongated shaft. The movable elongated shaft may include a first elongated shaft and the handle may take the form of a second elongated shaft having first and second opposing ends arranged along a major axis of the second elongated shaft. A portion between the first and second ends of the second elongated shaft may be coupled to the second end of the movable elongated shaft. The device may include a device housing having at least two couplable portions, wherein at least one of the couplable portions includes the joystick surface. The second magnet may be a substantially spherical magnet, and the first end of the shaft may include a cavity in which the second magnet is retained. The second magnet may be removable from the shaft upon application of a predetermined force. The second magnet and the shaft may take the form of a ball and socket type assembly.

The handle may be fixedly coupled to the movable elongated shaft. The movable elongated shaft and the handle may form a substantially T-shaped assembly in some embodiments. The movable elongated shaft and the handle may form a substantially L-shaped assembly in other embodiments. The handle may be foldable with respect to the movable elongated shaft. The joystick assembly may include a hinge coupled between the handle and the movable elongated shaft. The hinge may result in the handle being pivotable about at least one axis with respect to the movable elongated shaft. The joystick assembly may include a motion restriction element configured to restrict an excursion of the second magnet with respect to the joystick surface to a predetermined excursion. The motion restriction element may be coupled to the moveable elongated shaft proximate to the first end of the shaft. The motion restriction element may be further disposed on the joystick surface. The device may be at least one of a smartphone, a tablet computer, an instrumentation console, a video game console, a video game controller, a keyboard, and a laptop computer.

In another aspect of the concepts described herein, a joystick assembly for use with a device comprising a first magnet having north and south magnetic poles includes a second magnet having north and south magnetic poles. The joystick assembly also includes a movable elongated shaft having first and second opposing ends arranged along a major axis of the shaft. The first end of the shaft is fixedly coupled to the second magnet such that movement of the shaft results in movement of the second magnet relative to the first magnet. Additionally, the first end of the shaft is fixedly coupled to the second magnet such that a line between centers of the north and south magnetic poles of the second magnet is movable relative to a line between the north and south magnetic poles of the first magnet. An attraction of the second magnet to the first magnet results in a restoring force upon the shaft. The joystick assembly further includes a handle coupled proximate to the second end of the movable elongated shaft, with the handle foldable with respect to the shaft.

The joystick assembly may include one or more of the following features individually or in combination with other features. The moveable elongated shaft may include a recess configured to receive at least a portion of the handle when the handle is folded. The handle may be folded and the portion of the handle may be received in the recess, and the moveable elongated shaft and the handle may form at least one common planar surface. The moveable elongated shaft may include a first elongated shaft and the handle may take the form of a second elongated shaft having first and second opposing ends arranged along a major axis of the second elongated shaft. The movable elongated shaft may include at least an inner tube and an outer tube which is telescopically slideable with respect to the inner tube.

The device may include a joystick surface adjacent to the first magnet and the moveable elongated shaft and the second magnet may be removable from the joystick surface. The device may include a joystick surface adjacent to the first magnet and a magnetic field sensor between the joystick surface and the second magnet. The magnetic field sensor may include a plurality of magnetic field sensing elements supported by a substrate. The magnetic field sensing elements may be configured to generate a respective plurality of magnetic field signals and to detect a position of the second magnet relative to the first magnet. The device may be at least one of a smartphone, a tablet computer, an instrumentation console, a video game console, a video game controller, a keyboard, and a laptop computer.

In yet another aspect of the concepts described herein, a joystick assembly for use with a device including a first magnet having north and south magnetic poles includes a substantially spherical trackball including a second magnet having north and south magnetic poles. The trackball encloses the second magnet such that movement of the trackball results in movement of the second magnet relative to the first magnet and such that a line between centers of the north and south magnetic poles of the second magnet is movable relative to a line between the north and south magnetic poles of the first magnet. An attraction of the second magnet to the first magnet results in a restoring force upon the trackball.

The joystick assembly may include one or more of the following features individually or in combination with other features. The restoring force may result in the trackball being restored to a null position. The device may further include a cavity in which the trackball is fixedly and movably retained. The device may further include a joystick surface adjacent to the first magnet and a magnetic field sensor disposed between the joystick surface and the second magnet. The magnetic field sensor may include a plurality of magnetic field sensing elements supported by a substrate. The magnetic field sensing elements may be configured to generate a respective plurality of magnetic field signals and to detect a position of the second magnet relative to the first magnet. The device may further include a joystick surface adjacent to the first magnet, and the trackball may be removable from the joystick surface. The joystick assembly may further include a lubricant disposed over one or more portions of the trackball. The trackball may include a magnetic material providing the second magnet. The trackball may include an outer shell enclosing the second magnet. The joystick assembly may be provided in a mobile computing device. The device may be at least one of a smartphone, a tablet computer, an instrumentation console, a video game console, a video game controller, a keyboard, and a laptop computer.

In yet another aspect of the concepts described herein, a joystick assembly for use with a device comprising a joystick surface and a first magnet having north and south magnetic poles includes a second magnet having north and south magnetic poles. The joystick assembly also includes a movable elongated shaft having first and second opposing ends arranged along a major axis of the shaft. The first end of the shaft is coupled to the second magnet such that movement of the shaft results in movement of the second magnet relative to the first magnet. Additionally, the first end of the shaft is fixedly coupled to the second magnet such that a line between centers of the north and south magnetic poles of the second magnet is movable relative to a line between the north and south magnetic poles of the first magnet. An attraction force between the second magnet and the first magnet results in a restoring force upon the shaft, and a magnitude of the attraction force is associated with a joystick classification.

The joystick assembly may include one or more of the following features individually or in combination with other features. The magnitude of the attraction force and the associated joystick classification may be a function of size and/or a shape of the second magnet. The second magnet may be substantially spherical and the magnitude of the attraction force and the associated joystick classification may be a function of a diameter of the second magnet. The magnitude of the attraction force and the associated joystick classification may be a function of a material of the second magnet.

The device may further include a magnetic field sensor disposed between the joystick surface and the second magnet. The magnetic field sensor may include a plurality of magnetic field sensing elements supported by a substrate. The magnetic field sensing elements may be configured to generate a respective plurality of magnetic field signals, to detect a position of the second magnet relative to the first magnet, and to detect the magnitude of the attraction force and the associated joystick classification. The joystick classification may include a user classification. The joystick user classification may be one of an administrator, a user, an operator, and a manager. The movable elongated shaft may be removably coupled to the second magnet. The device may be at least one of a smartphone, a tablet computer, an instrumentation console, a video game console, a video game controller, a keyboard, and a laptop computer.

BRIEF DESCRIPTION OF THE DRAWINGS

The foregoing features of the disclosure, as well as the disclosure itself may be more fully understood from the following detailed description of the drawings, in which:

FIG. 1 is a side view showing a magnetic assembly having first and second magnets and an electronic substrate disposed between the first and second magnets;

FIG. 2 is a top view of the magnetic assembly of FIG. 1;

FIG. 7 is a side view showing the magnetic assembly of FIG. 5 with a change of position of the second magnet:

FIG. 8 is a top view of the magnetic assembly of FIG. 7;

FIG. 28 is a side view of a third example configuration of a joystick assembly according to the disclosure;

FIG. 29 is a side view of a fourth example configuration of a joystick assembly according to the disclosure;

FIG. 32 is a side view of another example configuration of a joystick assembly according to the disclosure;

FIG. 33 is a side view of an example configuration of the joystick assembly of FIG. 32;

FIG. 35 is a side view of a further example configuration of a joystick assembly according to the disclosure;

FIG. 36 is a side view of an example configuration of the joystick assembly of FIG. 35;

FIG. 37 is a side view of another example configuration of a joystick assembly according to the disclosure;

DETAILED DESCRIPTION

Figures 3, 4:
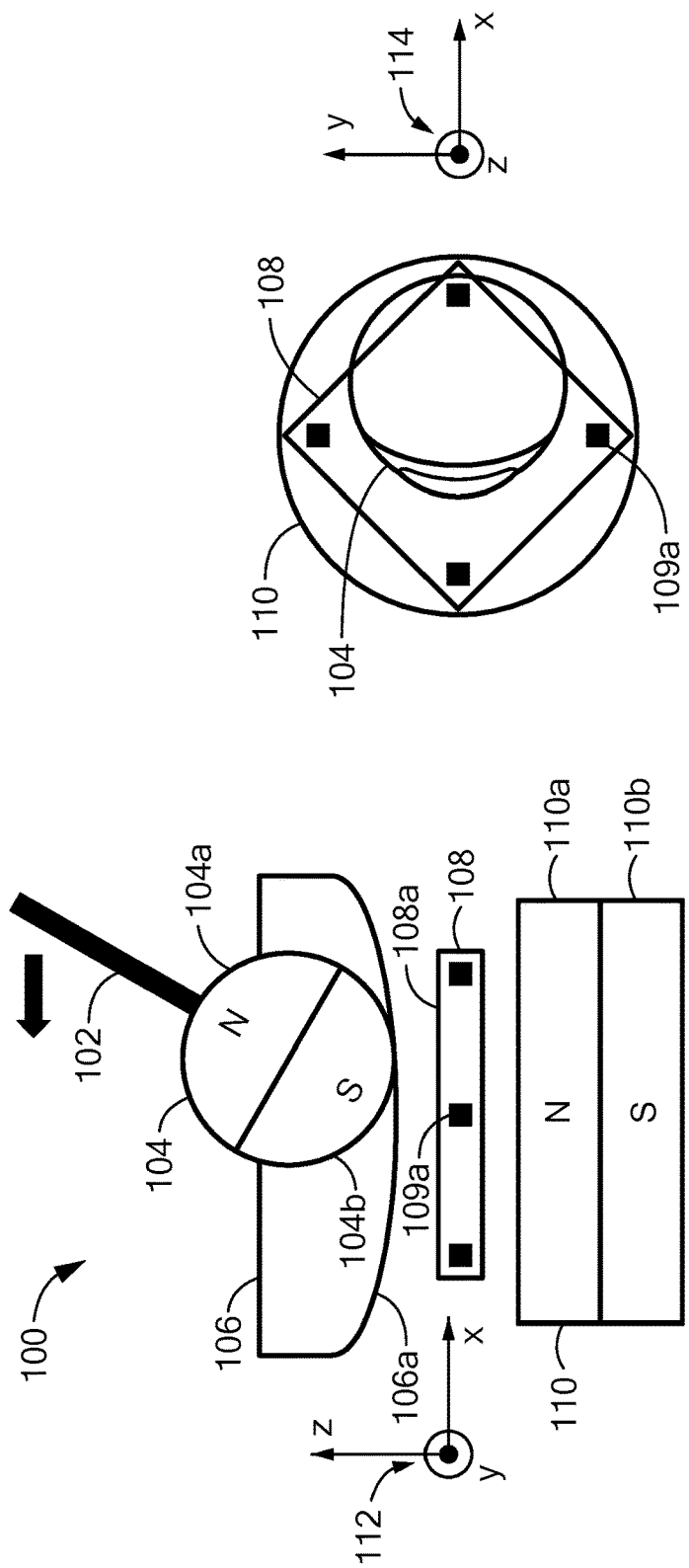
FIG. 3 is a side view showing the magnetic assembly of FIG. 1 with a change of position of the second magnet.
FIG. 4 is a top view of the magnetic assembly of FIG. 3.

Before describing the present disclosure, it should be noted that reference is sometimes made herein to magnetic assemblies and joystick assemblies having components (e.g., magnets) with particular shapes (e.g., spherical). One of ordinary skill in the art will appreciate, however, that the techniques described herein are applicable to a variety of sizes and shapes.

For convenience, certain introductory concepts and terms used in the specification are collected here.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

While specific reference is made below to magnetic field sensing elements that have maximum response axes that are parallel to a surface of an electronic substrate, it should be recognized that other magnetic field sensing elements with magnetic maximum response axes in other directions may be used.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture. As used herein, the term "determined," when referring to a value or signal, is used to refer to a value or signal that is identified by a circuit during operation, after manufacture.

As used herein, the term "active electronic component" is used to describe and electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

Referring to FIG. 1, an example of a magnetic assembly 100 includes a first magnet 110, a second magnet 104, and an electronic substrate 108 disposed between the first magnet 110 and the second magnet 104. A shaft 102 can be rigidly or fixedly coupled to the second magnet 104 so that, if the shaft 102 is moved, the second magnet 104 also experiences movement. The second magnet 104 is shown here in a zero or resting position.

The magnetic assembly 100 will be recognized to have characteristics representative of a joystick, wherein the shaft 102 is indicative of a shaft that can be moved by a user. However, other applications are possible other than joysticks, and while joysticks are mentioned explicitly herein, it will be understood that movement of position of the second magnet 104 and other magnets described below can be detected by electronic circuits described herein, when used in other applications, which may or may not have a shaft.

The electronic substrate 108 can include a plurality of magnetic field sensing elements, e.g. a magnetic field sensing element 109*a*.

The shaft 102 and the second magnet 104 attached thereto, are subject to movement, which is detected by the magnetic field sensing elements upon the electronic substrate 108 in ways described more fully below.

The electronic substrate 108 has a major planar surface 108*a*. This first magnet 110 has a north pole 110*a* and a south pole 110*b*, a line between which is substantially perpendicular to the major planar surface 108*a* of the electronic substrate 108.

The second magnet 104 has a north pole 104a and a south pole 104b, a line between which is substantially perpendicular to the major planar surface 108a of the electronic substrate 108 when the second magnet 104 is at the zero resting position.

The first and second magnets 110, 104, respectively, have a magnetic force therebetween, resulting in a restoring force upon the second magnet 104, such that the second magnet 104 will achieve the position shown when no other force is applied to the second magnet 104.

In this position, it will be appreciated that in a region between the first magnet 110 and the second magnet 104, magnetic flux lines pass through the electronic substrate 108 in a direction substantially perpendicular to the major planar surface 108a of the electronic substrate 108.

In some embodiments, the second magnet 104 can be disposed in a cavity 106 having a cavity surface 106a. The cavity surface 106a can be curved or flat. In some embodiments, the second magnet 104 is substantially spherical.

In some embodiments, the electronic substrate 108 is part of a magnetic field sensor that includes not only the magnetic field sensing elements, e.g., 109a, upon the electronic substrate 108, but also other electronics, including active and/or passive electronic components. Some types of magnetic field sensors are shown in FIGS. 13 and 16-19. In some embodiments, the first magnet 110 forms a part of a magnetic field sensor.

The substrate 108 is shown to be larger than the second magnet 104. However, typically, the substrate 108 is smaller than the magnet 104 (here and in figures below).

In some embodiments, the second magnet 104 has a spherical shape with a diameter of about 0.25 inches. In some embodiments, the first magnet 110 is a solid cylinder with a diameter of about 0.25 inches and a thickness of about 0.125 inches.

Coordinate axes 112 are used here and in figures below to show a common reference frame.

Referring now to FIG. 2, in which like elements of FIG. 1 are shown having like reference designations, the electronic substrate 108 is shown to have first, second, third, and fourth magnetic field sensing elements 109a, 109b, 109c, 109d, respectively. In some embodiments, the four magnetic field sensing elements 109a, 109b, 109c, 109d are disposed at corners of the square, such that a line between the first and third magnetic field sensing elements 109a, 109c, respectively, and a line between the second and fourth magnetic field sensing elements 109b, 109d are perpendicular to each other. However, other angles are also possible.

The first magnetic field sensing element 109a has a directional maximum response axis 116, the second magnetic field sensing element 109b as a directional maximum response axis 118, the third magnetic field sensing element 109c has a maximum response axis 120, and the fourth magnetic field sensing element 109d has a directional maximum response axis 122.

In some embodiments, the four directional response axes 116, 118, 120, 122 can be parallel to the major planar surface 108a of the electronic substrate 108.

In some embodiments, the directional response axes 116, 120 can be parallel to each other but in opposite directions. Also, the directional response axes 118, 122 can be parallel to each other but in opposite directions.

In some embodiments, the directional axes 116, 120 can be perpendicular to the directional axes 118, 122. However, other angles are also possible. Maximum response axes are not shown in figures below, however, it will be understood that a similar maximum response axes apply to the various figures below.

In some embodiments, the arrangement of magnetic field sensing elements is in a square, e.g., the substrate 108, with sides about 1.14 mm long. However, the substrate 108 can be larger or smaller. The square shape of the substrate 108 can be representative of the substrate, or instead representative of the arrangement of the magnetic field sensing elements 109a, 109b, 109c, 109d, in which case, the substrate can be larger than the square shape shown.

Coordinate axes 114, shown here and in figures below, show the same reference frame as the coordinate axes 112 of FIG. 1.

Referring to FIG. 3, in which like elements of FIG. 1 are shown having like reference designations, the second magnet 104 has been rotated, for example by a user applying a force upon a shaft 102, and there is a restoring force represented by an arrow. If the user were to release the shaft, the second magnet 104 would return to its position shown above in conjunction with FIG. 1.

It should be recognized that rotation of the second magnet can cause the second magnet 104 to move laterally along the surface 106a of the cavity 106.

Referring now to FIG. 4, in a top view, in which like elements of FIG. 1 are shown having like reference designations, it can be seen that the second magnet 104 has moved laterally relative to the electronic substrate 108 and to the first magnet 110. The first magnet 110 can be stationary relative to the electronic substrate 108.

Lateral movement of the second magnet 104 may not be desirable.

Figure 5:
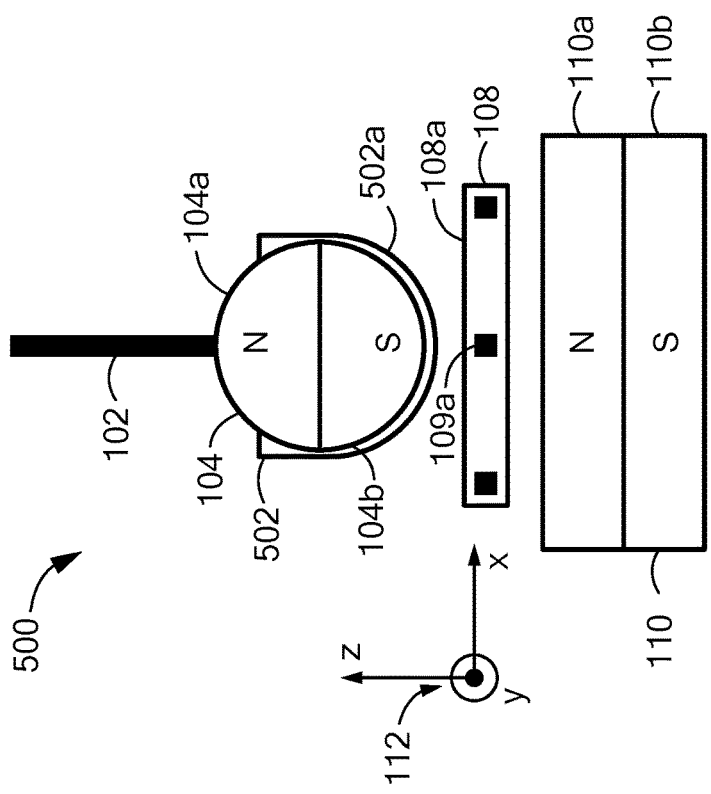
FIG. 5 is a side view showing yet another magnetic assembly having first and second magnets and an electronic substrate disposed between the first and second magnets.

Referring now to FIG. 5, in which like elements of FIG. 1 are shown having like reference designations, another magnetic assembly 500 is like the magnetic assembly 100 of FIG. 1, however, a different cavity 502 having a different cavity surface 502a is used.

The cavity 502 allows the second magnet 104 to rotate, but keeps the second magnet in place and not able to move laterally.

Figure 6:
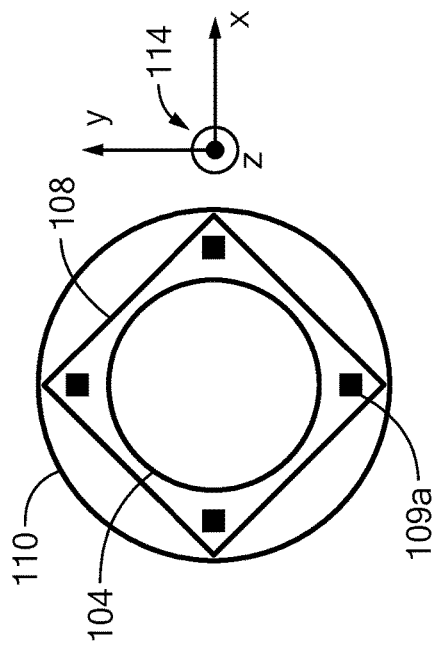
FIG. 6 is a top view of the magnetic assembly of FIG. 5.

Referring now to FIG. 6, in a top view, in which like elements of FIG. 1 are shown having like reference designations, the second magnet 104 is substantially centered with the four magnetic field sensing elements.

Referring now to FIG. 7, in which like elements of FIG. 1 are shown having like reference designations, the magnetic assembly 500 is shown again where the second magnet 104 has been rotated, for example, by a force applied by user upon a shaft 102. A restoring force, described above in conjunction with FIG. 3, is represented by an arrow.

Referring now to FIG. 8, in a top view, in which like elements of FIG. 1 are shown having like reference designations, even though the second magnet 104 is rotated, the second magnet 104 substantially centered with the four magnetic field sensing elements.

Figure 9:
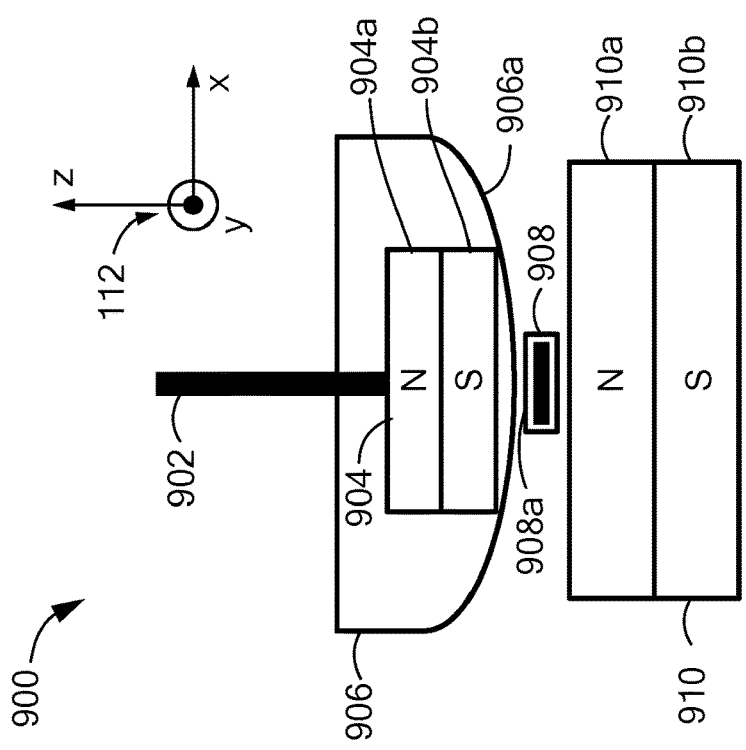
FIG. 9 is a side view showing yet another magnetic assembly having first and second magnets and an electronic substrate disposed between the first and second magnets.

Referring now to FIG. 9, another example of a magnetic assembly 900 includes a first magnet 910, a second magnet 904, and an electronic substrate 908 disposed between the first magnet 910 and the second magnet 904. A shaft 902 is rigidly or fixedly coupled to the second magnet 904 so that, if the shaft 902 is moved, the second magnet 904 also experiences movement. The second magnet 904 is shown here in a zero or resting position.

The magnetic assembly 900 will be recognized to have characteristics representative of a joystick, wherein the shaft 902 is indicative of a shaft that can be moved by a user. However, other applications are possible other than joysticks, and while joysticks are mentioned explicitly herein, it will be understood that movement of position of the second magnet 904 and other magnets described below can be detected by electronic circuits described herein, when used in other applications.

The electronic substrate 908 can include a plurality of magnetic field sensing elements.

The shaft 902, and the second magnet 904 attached thereto, are subject to movement, which is detected by the magnetic field sensing elements upon the electronic substrate 908 in ways described more fully below.

The electronic substrate 908 has a major planar surface 908a. This first magnet 910 has a north pole 910a and a south pole 910b, a line between which is substantially perpendicular to the major planar surface 908a of the electronic substrate 908.

The second magnet 904 has a north pole 904a and a south pole 904b, a line between which is substantially perpendicular to the major planar surface 908a of the electronic substrate 908 when the second magnet 904 is at the zero resting position.

The first and second magnets 910, 904, respectively, have a magnetic force therebetween, resulting in a restoring force upon the second magnet 904, such that the second magnet 904 will achieve the position shown when no other force is applied to the second magnet 904.

In this position, it will be appreciated that in a region between the first magnet 910 and the second magnet 904, magnetic flux lines pass through the electronic substrate 908 in a direction substantially perpendicular to the major planar surface 908a of the electronic substrate 108.

In some embodiments, the second magnet 904 can be disposed in a cavity 906 having a cavity surface 906a. The cavity surface 908a can be curved or flat.

In some embodiments, the second magnet 904 is substantially cylindrical, with or without a void center part.

In some embodiments, the electronic substrate 908 is part of a magnetic field sensor that includes not only the magnetic field sensing elements, e.g., 109a, upon the electronic substrate 108, but also other electronics, including active and/or passive electronic components. Some types of magnetic field sensors are shown in FIGS. 13 and 16-19. In some embodiments, the first magnet 110 forms a part of a magnetic field sensor.

In some embodiments, the arrangement of magnetic field sensing elements is in a square, e.g., the substrate 908, with sides about 1.14 mm long. However, the substrate 908 can be larger or smaller. The square shape of the substrate 908 can be representative of the substrate, or instead representative of the arrangement of the magnetic field sensing elements, e.g., 909a, in which case, the substrate can be larger than the square shape shown.

In some embodiments, the second magnet 904 has a cylindrical shape with a diameter of about 0.25 inches and a thickness of about 0.125 inches. In some embodiments, the second magnet 904 is an open cylinder with an internal diameter of about 0.125 inches.

In some embodiments, the first magnet 910 has a cylindrical shape with a diameter of about 0.25 inches and a thickness of about 0.125 inches. In some embodiments, the first magnet 910 is an open cylinder with an internal diameter of about 0.125 inches.

Coordinate axes 112 are the same as coordinate axes 112 in figures above.

Figure 10:
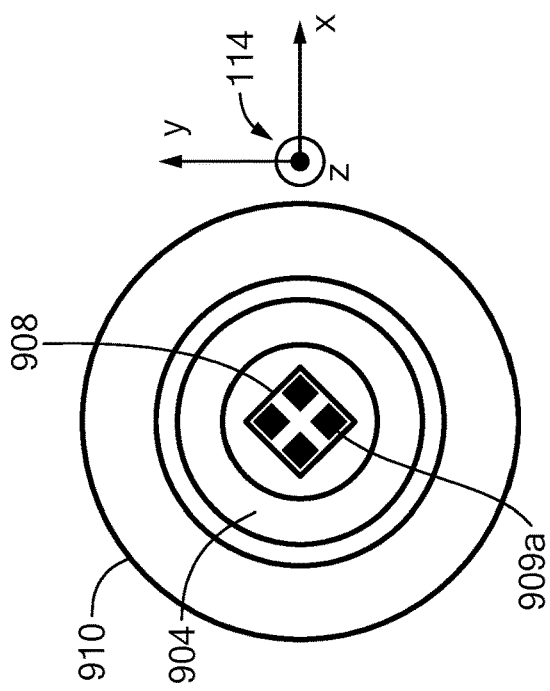
FIG. 10 is a top view of the magnetic assembly of FIG. 9.

Referring now to FIG. 10, in which like elements of FIG. 9 are shown having like reference designations, the electronic substrate 908 is shown to have four magnetic field sensing elements, e.g., 909a. As described above in conjunction with FIG. 2, in some embodiments, the four magnetic field sensing elements are disposed at corners of the square, such that a line between opposite ones of the four magnetic field sensing elements and a line between other opposite ones of the four magnetic field sensing elements are perpendicular to each other. However, other angles are also possible.

Directional maximum response axes and orientations thereof can be the same as or similar to those described above in conjunction with FIG. 2.

Coordinate axes 114 are the same as coordinate axes 114 in figures above.

Here; the second magnet 904 has a center void, such that the second magnet 904 is in the form of a cylindrical ring. In some embodiments, the first magnet 910 is also in the form of a cylindrical ring. However, in other embodiments, either one of, or both of, the magnets can be in the form of solid cylinders.

Figure 11:
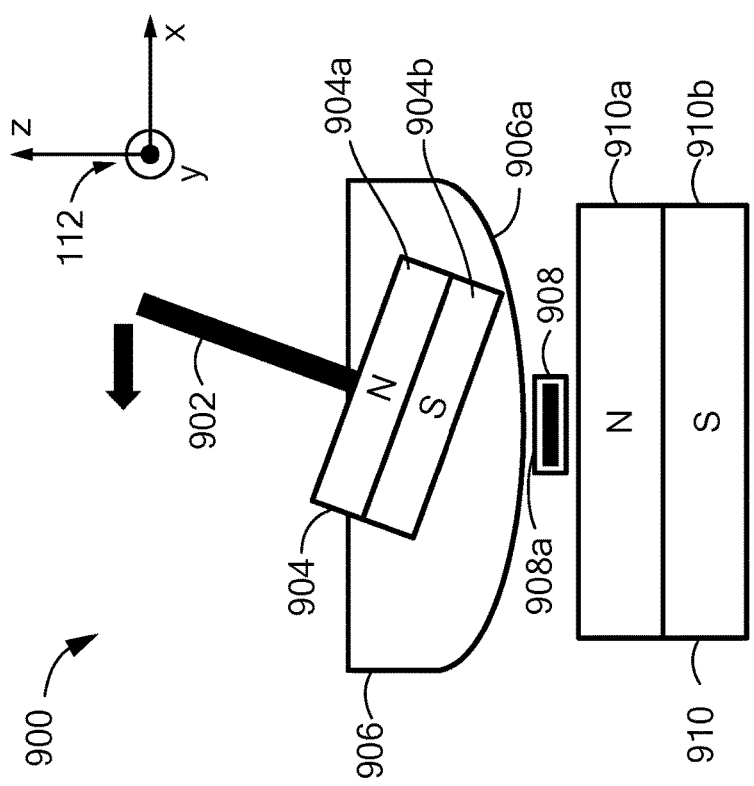
FIG. 11 is a side view showing the magnetic assembly of FIG. 9 with a change of position of the second magnet.

Referring to FIG. 11, in which like elements of FIG. 9 are shown having like reference designations, the second magnet 904 has been rotated, for example by a user applying a force upon a shaft 902. A restoring force, described above in conjunction with FIG. 3, is represented by an arrow. If the user were to release the shaft, the second magnet 904 would return to its position shown above in conjunction with FIG. 9.

It should be recognized that rotation of the second magnet 904 causes the second magnet to move laterally along the surface 906a of the cavity 906.

Figure 12:
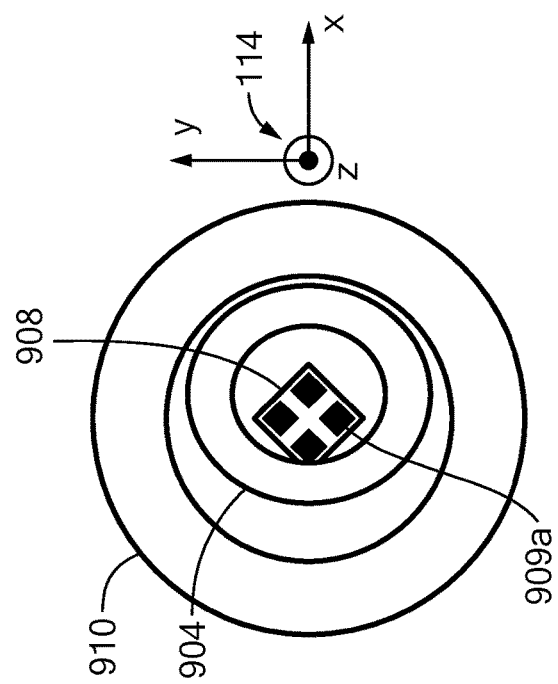
FIG. 12 is a top view of the magnetic assembly of FIG. 11.

Referring now to FIG. 12, in a top view, in which like elements of FIG. 9 are shown having like reference designations, it can be seen that the second magnet 904 has moved laterally relative to the electronic substrate 908 and relative to the first magnet 910.

Lateral movement of the second magnet 904 may not be desirable. The first magnet 910 can be stationary relative to the electronic substrate 908.

Figure 13:
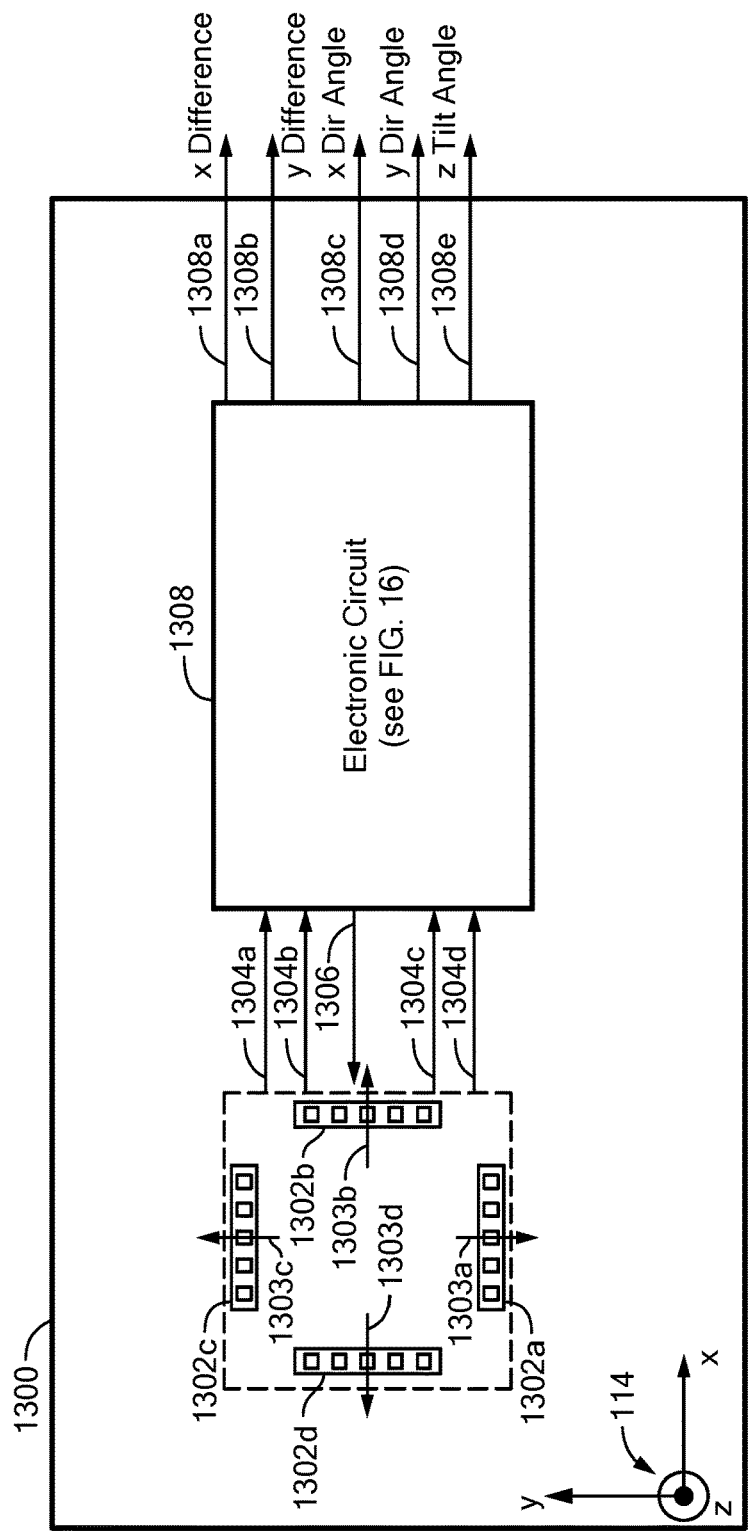
FIG. 13 is a top view of an electronic substrate having four magnetic field sensing elements and an electronic circuit that can be used as one of the above-mentioned electronic substrates.

Referring now to FIG. 13, an electronic substrate 1300 can be the same as or similar to the electronic substrates 108, 908 described above. Upon the electronic substrate 1300 can be disposed first, second, third, and fourth magnetic field sensing elements 1302a, 1302b, 1302c, 1302d, respectively.

The first, second, third, and fourth magnetic field sensing elements 1302a, 1302b, 1302c, 1302d are shown in a form more representative of vertical Hall elements. As is known, a typical vertical Hall element has vertical Hall element contacts, e.g., five vertical Hall element contacts as shown by small boxes, arranged in a row. In operation, a current is passed between some of the contacts, and a differential voltage output signal is generated at two of the contacts. A polarity, i.e., a direction of a directional maximum response axis, can be switched merely by switching the two contacts at which the differential output voltage is generated.

Accordingly, the first, second, third, and fourth magnetic field sensing elements 1302a, 1302b, 1302c, 1302d have respective first, second, third, and fourth directional maximum response axes 1303a, 1303b, 1303c, 1303d, respectively. The directional maximum response axes 1303a, 1303b, 1303c, 1303d have the same characteristics as the direction maximum response axes 116, 118, 120, 122 of FIG. 2.

Current spinning or chopping is a known technique used to reduce DC offset voltage (i.e., residual DC voltage when in the presence of zero magnetic field) of a Hall element. Current spinning can be used for both planar (horizontal) and vertical Hall elements. With current spinning, Hall element contacts that are driven and Hall element contacts at which a differential output voltage is generated, are changed or switched at a chopping rate. For each change of the connections, the Hall element tends to generate a different offset voltage. When the different DC output voltages are taken together, i.e., averaged, the net DC offset voltage is greatly reduced.

The first, second, third, and fourth magnetic field sensing elements 1302a, 1302b, 1302c, 1302d can generate a respective first, second, third, and fourth electronic magnetic field signals 1304a, 1304b, 1304c, 1304d, respectively. In some embodiments, the first, second, third, and fourth electronic magnetic field signals 1304a, 1304b, 1304c, 1304d are differential signals, but are here shown as individual connections.

An electronic circuit 1308 can be coupled to receive the first, second, third, and fourth magnetic field signals 1304a, 1304b, 1304c, 1304d, respectively. The electronic circuit 1308 can also be configured to generate one or more drive signals 1306 that can drive the magnetic field sensing elements 1302a, 1302b, 1302c, 1302d.

Angles (e.g., of the shaft 102 of FIG. 3) projected in the x-y plane are referred to herein as direction angles. A direction angle can be an x direction angle relative to the x-axis, or a y direction angle relative the x-axis. Angles (e.g., of the shaft 102 of FIG. 3) relative to the z-axis are referred to herein as tilt angles.

The electronic circuit 1308 is configured to generate one or more output signals, which can include, but which are not limited to, an x difference signal 1308a representative of, for example, a projection of the shaft 102 of FIG. 3 upon the x-axis of the x-y plane, output y difference signal 1308b representative of, for example, a projection of the shaft 102 of FIG. 3 upon the y-axis of the x-y plane, an x direction angle signal 1308c representative of, for example, an angle between a projection of the shaft 102 of FIG. 3 in the x-y plane and the x-axis, a y direction angle signal 1308d is representative of, for example, an angle between a projection of the shaft 102 of FIG. 3 the x-y plane and the y-axis, or a tilt angle signal 1308e representative of, for example, a z tilt angle of the shaft 102 of FIG. 3 relative to the z-axis perpendicular to the x-y plane. The electronic circuit 1308 is described more fully below in conjunction with FIG. 16.

In some embodiments, the first, second, third, and fourth magnetic field sensing elements 1302a, 1302b, 1302c, 1302d, respectively, here shown to be vertical Hall elements, can instead be magnetoresistance elements. Magnetoresistance elements are not used with current spinning or chopping.

Magnetoresistance elements can be formed in a variety of shapes when viewed from the top. For example, in some embodiments magnetoresistance elements can be formed in a bar shape wherein the directional maximum response axis is perpendicular to the longest axis of the bar. In other embodiments, the magnetoresistance elements can be formed in a yoke shape having a longest side and the maximum response axis can be perpendicular to the length of the longest side.

Figure 14:
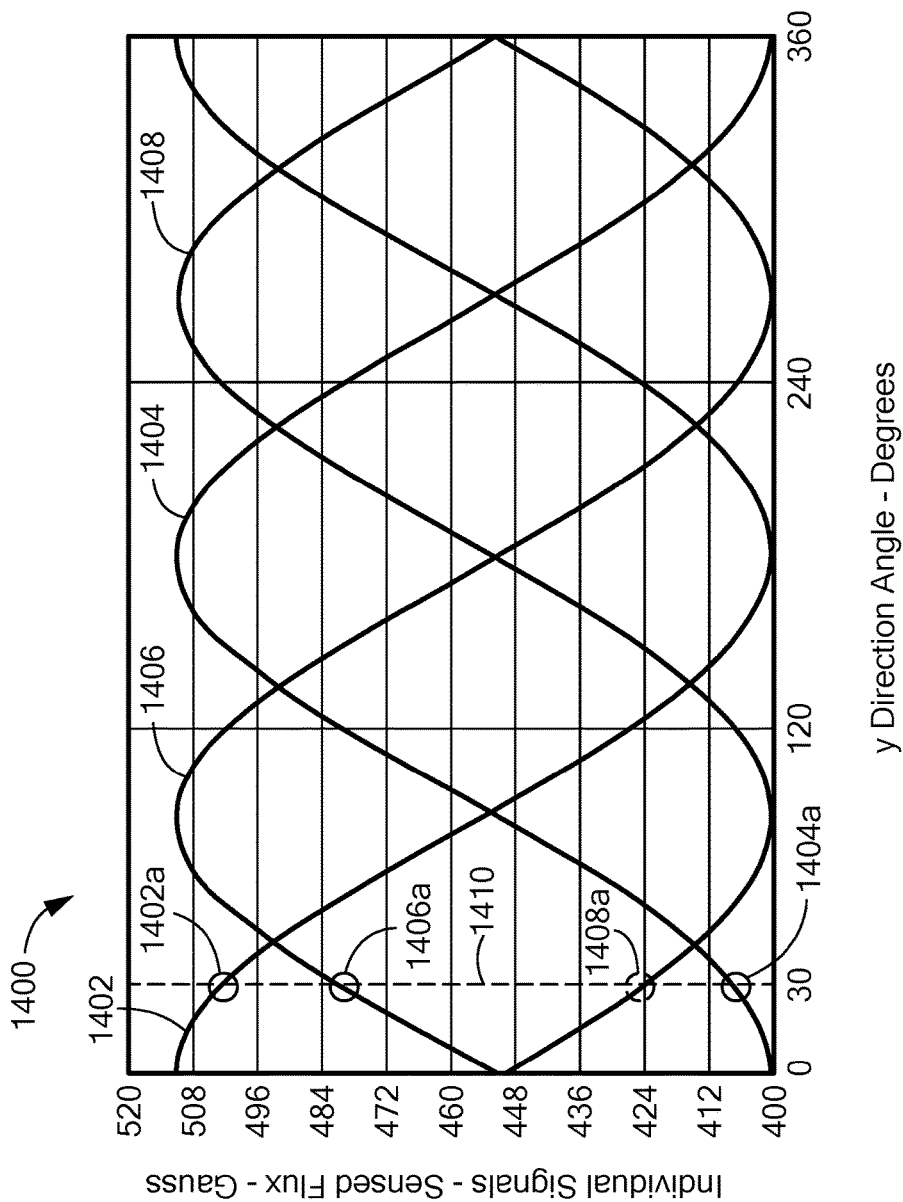
FIG. 14 is a graph showing four signals that can be generated by the four magnetic field sensing elements of FIG. 13.

Referring now to FIG. 14, a graph 1400 has a horizontal axis in with a scale in units of degrees. Degrees are indicative of a projected y direction angle of the shaft 102 of FIG. 3 in the x-y plane relative to the y-axis as the shaft is moved in a circle about its zero position, i.e., around the z-axis. The graph 1400 also has a vertical axis with a scale in units of a sensed magnetic field in Gauss, as sensed by the four magnetic field sensing elements of figures herein.

A signal 1402 is representative of an output signal from one of the magnetic field sensing elements most sensitive to magnetic field parallel to the y-axis, for example, the magnetic field sensing element 109a of FIG. 2, as the shaft 102 of FIG. 3 is moved in a circle around the z-axis, (i.e., to different direction angles but at a fixed tilt angle). A signal 1404 is representative of an output signal from an opposite one of the magnetic field sensing elements, sensitive to magnetic field parallel to the y-axis, for example, the magnetic field sensing element 109c of FIG. 2. Signals 1402 and 1404 are one hundred eighty degrees apart.

A signal 1406 is representative of an output signal from one of the magnetic field sensing elements sensitive to magnetic field parallel to the x-axis, for example, the magnetic field sensing element 109b of FIG. 2, as the shaft 102 of FIG. 3 is moved in a circle around the z-axis, (i.e., to different direction angles but at a fixed tilt angle). A signal 1408 is representative of an output signal from an opposite one of the magnetic field sensing elements sensitive to magnetic field parallel to the x-axis, for example, the magnetic field sensing element 109d of FIG. 2. Signals 1406 and 1408 are one hundred eighty degrees apart.

It can be seen that, different ones of the signals 1402, 1404, 1406, 1408 achieve positive maximum values at different direction angles, i.e., as the shaft 102 of FIG. 3 points toward different ones of the magnetic field sensing elements 109a, 109b, 109c, 109d.

It should be appreciated that an absolute amplitude of the signals 1402, 1404, 1406, 1408 is dependent upon the tilt angle of the shaft 102 relative to the z-axis. The amplitudes can be greater for greater tilt angles relative to the z-axis. However, the phase relationships (and ratios of signals for any projected y direction angle) remain the same.

The indicated phase relationships are indicative of four magnetic field sensing elements having orthogonal maximum response axes. However, in other embodiments, other relationships between directions of the maximum response axes can result in other phase relationships of the signals 1402, 1404, 1406, 1408. For example, in conjunction with the arrangement of FIGS. 20 and 21 having three magnetic field sensing elements spaced one hundred twenty degrees apart results in three sinusoids that are one hundred twenty degrees apart in phase.

Circuits described in further detail below can, in some embodiments, take difference measurements between pairs of the signals 1402, 1404, 1406, 1408. Values 1402a, 1404a, 1406a, 1408a are representative of a thirty degree y direction angle relative to the y-axis, (i.e., projected angle in the x-y plane relative to the y-axis) and also a twenty degree z tilt angle (i.e., angle over and relative to the x-y plane).

It is desirable that the magnetic field sensing elements described herein have maximum response axes in the x and y directions. In some embodiments, circuits described in further detail below take difference measurements between pairs of the signals 1402, 1404, 1406, 1408, for example a difference of values 1402a and 1404a referred to herein as a y difference signal, and a difference of values 1406a and 1408a, referred to herein as an x difference signal. Difference measurements allow for rejections of effects that may result from the large magnetic fields between the first and second magnets that are directed along the z-axis.

As indicated above, it should be understood that, for larger z tilt angles relative to the z-axis, the signals 1402, 1404, 1406, 1408 are larger, and the y difference signal and x difference are signal also larger.

Figure 15:
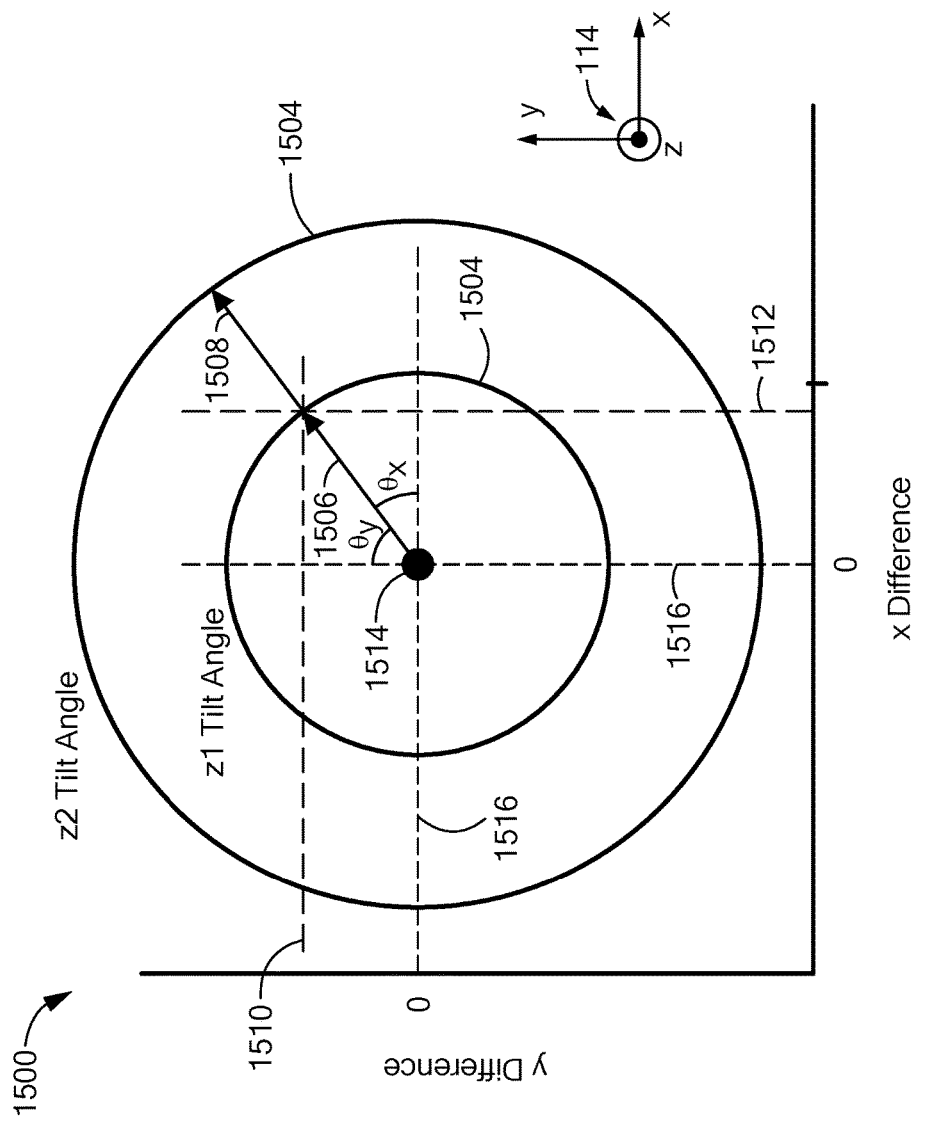
FIG. 15 is a graph representative of signal that can be generated by the electronic circuit of FIG. 13.

Referring now to FIG. 15, a graph 1500 has a horizontal axis with a scale in arbitrary unit indicative of an x difference signal, for example, a difference of the signals 1406, 1408 of FIG. 14. The graph 1500 also has a vertical axis with a scale in arbitrary units indicative of a y difference signal, for example, a difference of the signals 1402, 1404 of FIG. 14.

An arrow 1506 is representative of a top view looking down on any of magnetic assemblies above, for example, looking down at the shaft 102 of the figures above. The arrow is representative of a projection upon the x-y plane.

Direction angles θx and θy are shown. A z tilt angle θz comes out of the page.

It should be apparent that by knowing a value 1512 of an x difference signal and a value 1510 of a y difference signal, the direction angles θx and θy of the arrow 1506 in the x-y plane can be determined, for example by:

$$x \text{ direction angle} = \theta x = \arctan(x/y); \quad (1)$$

where:
x=value of the x difference signal, and
y=value of the y difference signal; or by $$y \text{ direction angle} = \theta y = \arctan(y/x). \quad (2)$$

It should also be apparent that the length of the arrow 1506 can change, for example, to an arrow 1508, for different z tilt angles of the shaft 102 of figures above relative to the z-axis. The different z tilt angle can result in a different value of the x difference signal and a different value of the y difference signal, but the same ratio of the values when the pointing angle (in the x-y plane) remains the same.

It should also be apparent that the z tilt angle (relative to the z-axis) can also be computed by knowing the value (e.g., 1512) of the x difference signal and the value (e.g., 1510) of the y difference signal. For example, the two values can be used to identify a length of the projected arrow, e.g., 1506, or 1508. In essence, the length of the arrow 1506 or 1508 (a projection upon the x-y plane) is proportional to the z tilt angle.

In some embodiments, the length of the projected arrow can be computed by:

$$L = \mathrm{sqrt}(x^2 + y^2); \quad (3)$$

where:
L=length of projected arrow,
x=value of the x difference signal, and
y=value of the y difference signal.

It should be appreciated that the length, L, of the arrow can vary in a way that is not only related to tilt angle. For example, if the shaft 102 of FIG. 1 does not pivot about a fixed point, another geometric relationship can be related to the length, L. However, the other geometric relationship may be known, and thus, it may still be possible to establish a tilt angle using calibrations described below, in combination with the known geometric relationship.

In some embodiments, in order to identify the z tilt angle from the computed length, L, of the arrow (e.g., 1506 or 1508), a calibration is performed. For example, taking the magnetic assembly of FIGS. 1-4, the shaft 102 can be tilted to a maximum possible tilt angle θztiltmax, which is limited by mechanical considerations, to a known maximum angle. A maximum length of the projected arrow, Lmax, (projected into the x-y plane), i.e., a maximum diameter of a circle, e.g., 1502, 1504, can be computed by equation (3) above.

Knowing Lmax, and corresponding maximum tilt angle θtiltmax, then other tilt angle can be identified as follows:

$$\tan(\theta z t i l t m a x) = L \max/K; \quad (4)$$

where:
θztiltmax=maximum z tilt angle,
Lmax=maximum length of the projection onto the x-y plane, and
K=a constant (equivalent to a constant unprojected length of the arrow).

$$\theta z = \arctan(L/K) \quad (5)$$

where:
θz=z tilt angle
K=constant computed by equation (4), and
L=length of projected arrow computed by equation (3).

In other embodiments, a predetermined value is used for the above constant K, and there is no calibration. Equation 5 can be used to compute the z tilt angle using the predetermined constant K.

In other embodiments, the value, K, is not constant, but can be measured at a variety of projected arrows, L, in which case, the z tilt angle, θz, can be interpolated using the variety of K and L values.

In other embodiments, an algorithm can be used to compute K in relation to L.

Figure 16:
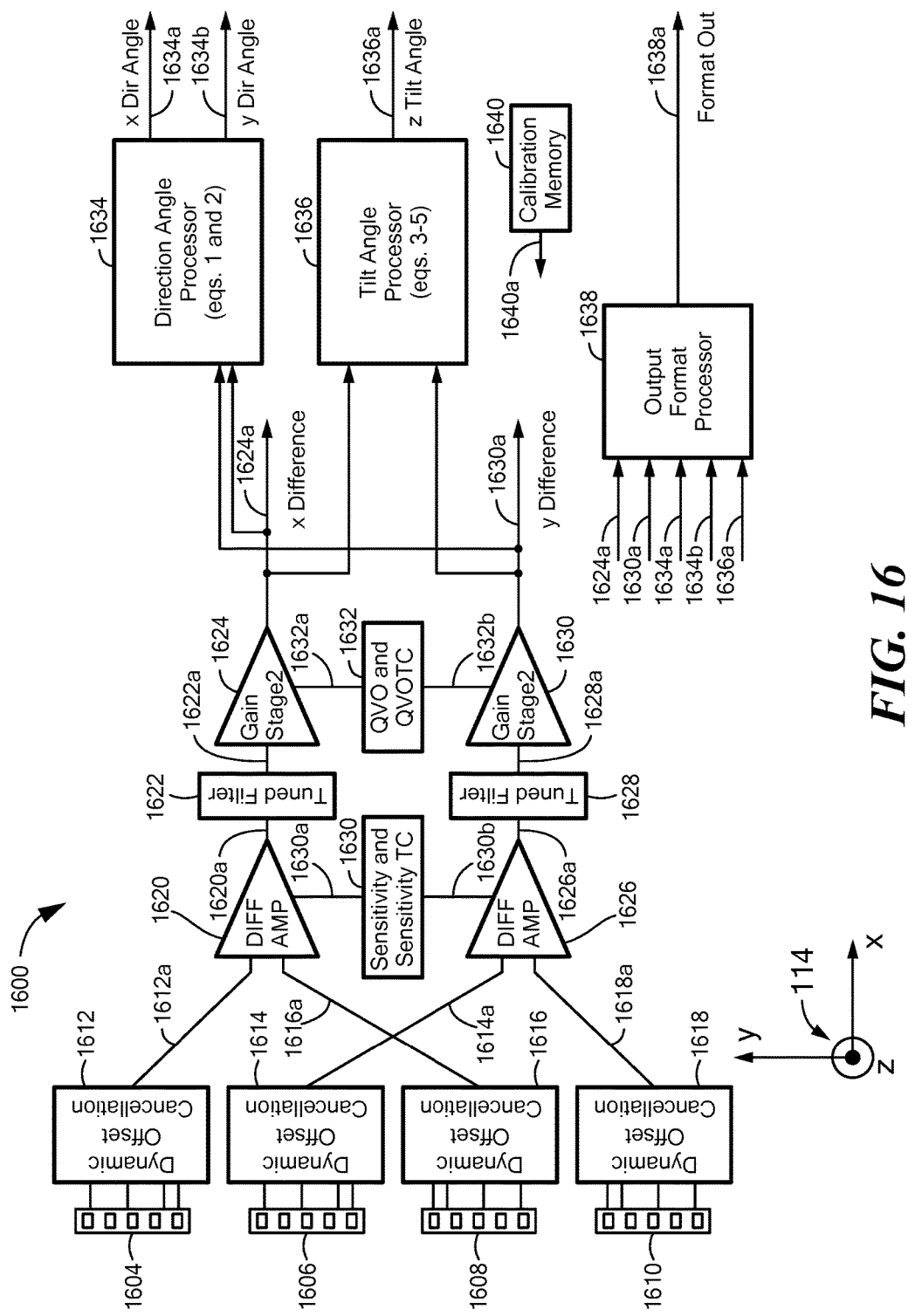
FIG. 16 is a block diagram showing further details of an example of an electronic circuit that can be used as the electronic circuit of FIG. 13.

Referring now to FIG. 16, an electronic circuit 1600 can form a part of a magnetic field sensor and can be disposed upon the electronic substrate 1300. The electronic circuit 1600 can include for magnetic field sensing elements 1604, 1606, 1608, 1610, here shown to have graphical shapes representative of vertical Hall elements. From discussion above in conjunction with FIG. 13, physical arrangement and maximum response axes will be understood. Here, however the four magnetic field sensing elements 1604, 1606, 1608, 1610 are shown in a line for clarity of the block diagram.

In some embodiments, the four magnetic field sensing element 1604, 1606, 1608, 1610 can be coupled to so-called "dynamic offset cancellation" modules 1612, 1614, 1616, 1618, respectively. The dynamic offset cancellation modules 1612, 1614, 1616, 1618 perform the above-described current spinning or chopping.

Output signals from the dynamic offset cancellation module 1612, 1614, 1616, 1618 are coupled to first and second differential amplifiers 1620, 1626 as shown.

In some alternate embodiments, there are no dynamic offset cancellation modules, and instead, the differential output signals from the four vertical Hall elements 1604, 1606, 1608, 6010 coupled directly to first and second differential amplifier 1620, 1626, respectively.

It is intended that signals associated the four magnetic field sensing elements 1604, 1606, 1608, 1610 couple to proper ones of the first and second differential amplifiers 6020, 6028. In essence, referring briefly to FIG. 13, it is intended that the signals associated with the vertical Hall elements 1302b, 1302d couple to the first differential amplifier 1620, and signals associated with the vertical Hall elements 1302a, 1302c coupled to the second differential amplifier 1628. Thus, it should be appreciated that the first differential amplifier 1620 is associated with an x-axis electronic channel and the second differential amplifier 1626 is associated with a y-axis electronic channel.

The first differential amplifier 1620 is configured to generate an x difference signal 1620a.

An electronic filter 1622 can be coupled to receive the x difference signal 1620a and configured to generate a filtered signal 1622a. In some embodiments, the tuned filter 1622 is a low pass filter able to pass DC signals, but acting to reduce electronic noise.

A gain stage 1624 can be coupled to receive the filtered signal 1622a and configured to generate an amplified x difference signal 1624a.

The second differential amplifier 1626 is configured to generate a y difference signal 1626a.

An electronic filter 1628 can be coupled to receive the y difference signal 1626a and configured to generate a filtered signal 1628a. In some embodiments, the tuned filter 1628 is a low pass filter able to pass DC signals, but acting to reduce electronic noise.

A gain stage 1630 can be coupled to receive the filtered signal 1628a and configured to generate an amplified y difference signal 1630a.

The electronic circuit 1600 can include a direction angle processor 1634 coupled to receive the x difference signal 1624a and coupled to receive the y difference signal 1630a. By use of equations one and two above, the direction angle processor 1634 is configured to generate at least one of an x direction angle signal 1634a or a y direction angle signal 1634b.

The electronic circuit can include a tilt angle processor 1634 coupled to receive the x difference signal 1624a and coupled to receive the y difference signal 1630a. By use of equations three, four, and five above, the tilt angle processor 1634 is configured to generate a z tilt angle signal 1636a.

In some embodiments, the direction angle processor 1634 and/or the tilt angle processor 1636 are analog processors. However, in other embodiments, the direction angle processor 1634 and/or the tilt angle processor 1636 are digital processors. For these digital embodiments, analog-to digital converters (DACS) (not shown) are disposed between the gain stages 1624, 1628 and the processors 1634, 1636.

In other embodiments, analog to digital conversions are made earlier, for example, prior to the tuned filters 1622, 1628, and the tuned filters 1622, 1628 are digital filters, and circuits that follow are digital circuits.

In some alternate embodiments, the electronic circuit 1600 does not include the tilt angle processor 1636. In some other alternate embodiments, the electronic circuit 1600 does not include the direction angle processor 1634. In some other alternate embodiments, the electronic circuit 1600 does not include the direction angle processor 1634 or the tilt angle processor 1636.

In some embodiments, the x difference signal 1624a and the y difference signal 1630a are provided to other circuits that are not a part of the electronic circuit 1600.

It should be understood that the x difference signal 1624a and the y difference signal 1630a provide an ability to reject common mode responses of individual magnetic field sensing elements used in the difference signals that may respond in-part to z-components of magnetic fields between the first and second magnets of FIGS. 1-12. Other circuits described below have two magnetic field sensing elements or three magnetic field sensing elements.

In some embodiments, the electronic circuit 1600 can include an output format processor 1636 coupled to receive one or more of the signals 1624a, 1630a, 1634a, 1634b, 1636a and configured to generate a serial or parallel output signal 1638a having information related to the one or more of the received signals. Example formats of the signal 1638a include, but are not limited to, a SENT format, and SPI format, and I²C format, and a serial format.

In some embodiments, the electronic circuit 1600 can include a calibration memory 1640 configured to store and provide calibration values 1640a, for example, according to the calibration described above in conjunction with FIG. 15.

While two parallel channels are shown in the electronic circuit 1600, other arrangements are also possible. For example, in one alternate embodiment samples from the four magnetic field sensing elements 1604, 1606 1608, 1610 are taken sequentially in a time division multiplexed (TDM) arrangement. The samples can be digitized, filtered, amplified, and sent to the common processor for processing equivalent to processing described above in conjunction with equations one through five.

Referring briefly to equations (1) and (2) above, it should be recognized that the x difference signal 1620a and the y difference signal 1620b are relatively independent from each other with movement or rotation of the second magnet, e.g., 104 of FIG. 1, due to their differential nature. Namely, a rotation or movement of the second magnet (e.g., 104 of FIG. 1) in the x direction, results in a change of the x difference signal 1620a, but results in little or no change of the y difference signal 1626a, and vice versa. Being independent, equations (1) and (2) can generate particularly accurate x direction angles and y direction angles. however, the calibration values 1640a can also provide further calibration related to equations (1) and (2).

Figure 17:
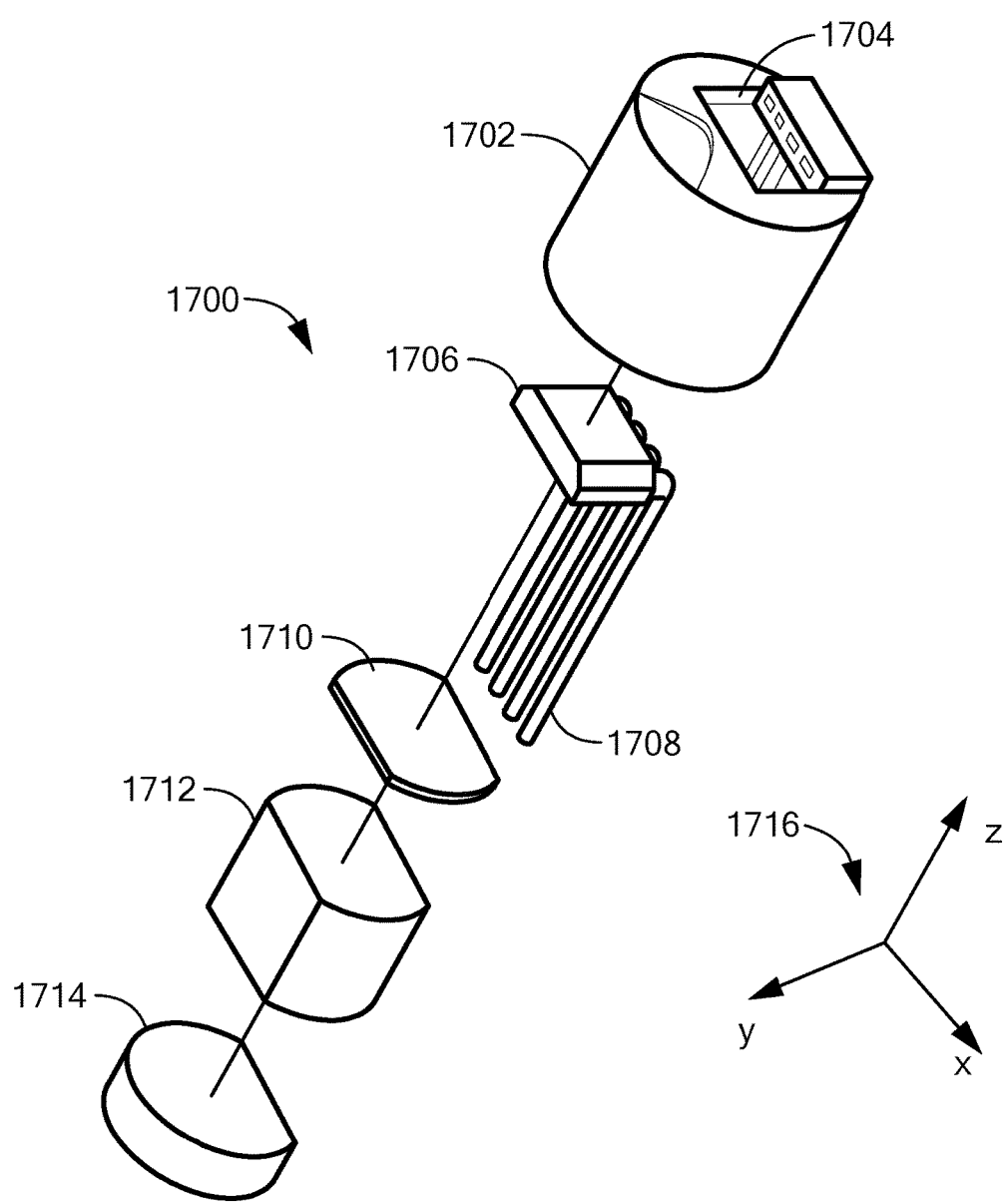
FIG. 17 is an exploded view of an example of a magnetic field sensor that can include the electronic circuit of FIGS. 13 and 16 and the first magnet described above to form part of the above-described magnetic assemblies.

Referring now to FIG. 17, a magnetic field sensor 1700 can include an integrated circuit 1706, which, for example, can be a packaged version of the electronic circuit 1600 of FIG. 16.

The magnetic field sensor 1700 can include a housing 1702 having a cavity 1704.

The magnetic field sensor 1700 can include a spacer, for example, an insulating spacer 1710.

The magnetic field sensor 1700 can include a magnet 1712, which can be the same as or similar to the magnets 110, 910 described in figures above.

The magnetic field sensor 1700 can also include a ceiling member 1714.

While the magnetic field sensor 1700 is shown in exploded form, the magnetic field sensor 1700 is shown and assembled form in FIG. 18 below.

Figure 18:
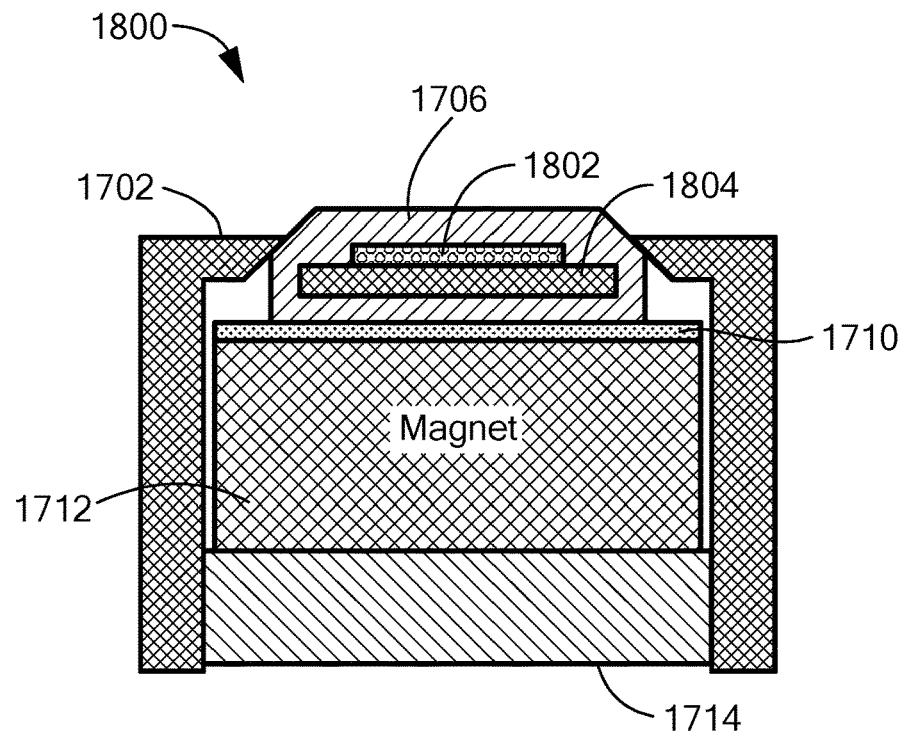
FIG. 18 is a side view cross section of the magnetic field sensor of FIG. 17 when assembled.

Referring now to FIG. 18, in which like elements of FIG. 17 are shown having like reference designations, a magnetic field sensor 1800 is the same as or similar to the magnetic field sensor 1700 of FIG. 17, but is here shown and assembled form.

The integrated circuit 1706 can include an electronic substrate 1802 disposed over a base plate 1804 of a lead frame. The integrated circuit 1706 can include a molding, for example, a plastic molding 1806.

It will be appreciated that the above described second magnets, e.g., 104, 904 and associated cavities 106, 502, 906 can be disposed over the magnetic field sensor 1800.

It will be apparent that, the arrangement of the magnetic field sensor 1800 includes the magnet 1712. However, in other embodiments the magnetic field sensor only includes the integrated circuit 1706.

Figure 19:
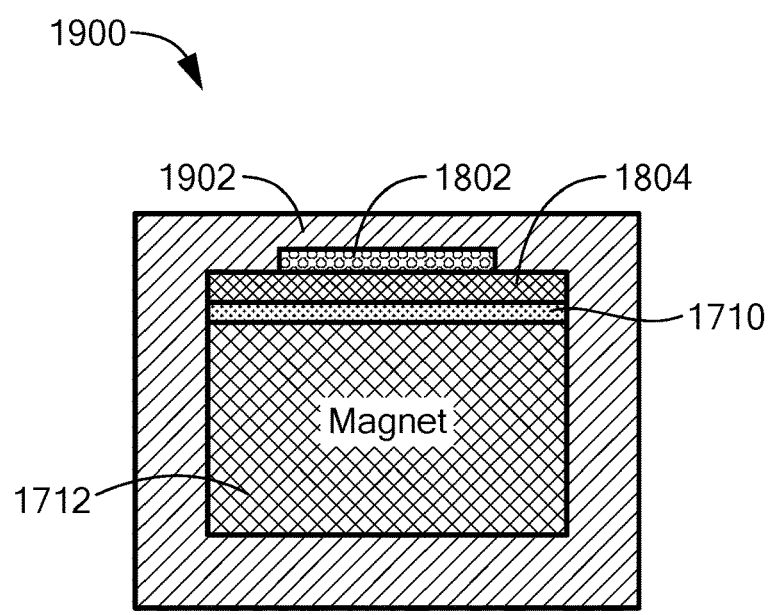
FIG. 19 is a side view cross section of another magnetic field sensor that can include the electronic circuit of FIGS. 13 and 16 and the first magnet described above to form part of the above-described magnetic assemblies.

Referring now to FIG. 19, in which like elements of FIG. 17 are shown having like reference designations, another magnetic field sensor 1900 can include an electronic substrate 1802 disposed over a base plate 1804. Here, however, instead of the plastic molding 1806 of FIG. 18, the magnetic field sensor 1900 includes but one molded structure 1902 surrounding electronic circuit substrate 1802, the base plate 1804, the insulating spacer 1710, and the magnet 1712.

It will be appreciated that the above described second magnets, e.g., 104, 904 and associated cavities 106, 502, 906 can be disposed over the magnetic field sensor 1900.

In some alternate embodiments, the magnetic field sensor 1900 does not include the magnet 1712.

Figure 20:
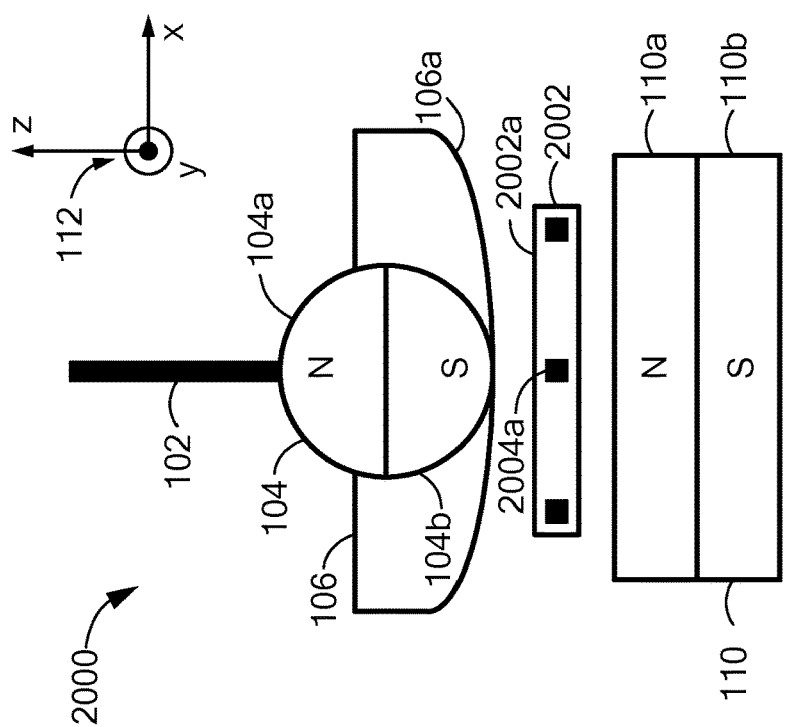
FIG. 20 is a side view showing yet another magnetic assembly having first and second magnets and an electronic substrate disposed between the first and second magnets.

Referring now to FIG. 20, in which like elements of FIG. 1 are shown having like reference designators, a magnetic assembly 2000 is like the magnetic assembly 100 of FIG. 1, but the magnetic assembly 2000 has a different substrate 2002 with a surface 2002a, and with a different quantity of magnetic field sensing elements, e.g. 2004a, shown in described in more detail below in conjunction with FIG. 21. An attractive force of first and second magnets 110, 104 results in a restoring force upon the second magnet 104, and therefore, upon the shaft 102

Figure 21:
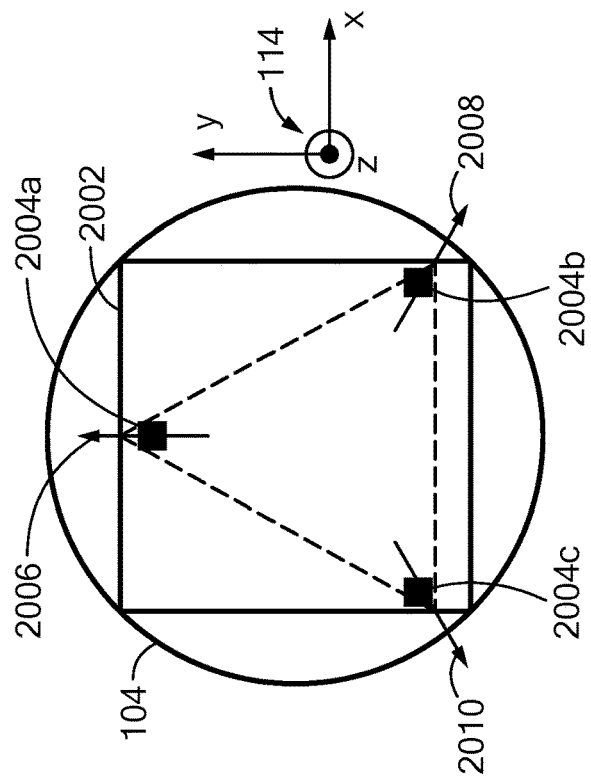
FIG. 21 is a top view of the magnetic assembly of FIG. 20.

Referring now to FIG. 21, in which like elements of FIG. 20 are shown having like reference designations, the substrate 2002 can have a plurality of magnetic field sensing elements, e.g., three magnetic field sensing elements 2004a, 2004b, 2004c. The three magnetic field sensing elements 2004a, 2004b, 2004c can have directional maximum response axes 2006, 2008, 2010, each parallel to the surface 2004a of the substrate 2004, but each pointing in a different direction.

In some embodiments, signals generated by the three magnetic field sensing elements 2004a, 2004b, 2004c are amplified, digitized, and provided as inputs to a processor. The processor can be configured to generate at least an x signal and a y signal. The x signal can be representative of, for example, a projected x-axis value indicative of a projection of the shaft 102 upon the x-axis of the x-y plane. The y signal can be representative of, for example, a projected y-axis value indicative of a projection of the shaft 102 upon the y-axis of the x-y plane.

To generate the x signal and the y signal, the above described processor can use equations different than equations 1 and 2 above. In some embodiments, the processor can use equations the same as or similar to equations described in U.S. patent application Ser. No. 13/960,910, filed Aug. 7, 2013, and entitled "Systems and Methods for Computing a Position of a Magnetic Target," which is assigned to the assignee of the present disclosure, and which is incorporated by reference herein in its entirety. These equations are described below.

In some embodiments, the above described processor can also use equations the same as or similar to equations 3, 4, and/or 5 described above to compute direction angles and/or a tilt angle. Discussion of calibration above also applies to the magnetic assembly 2000.

Figure 22:
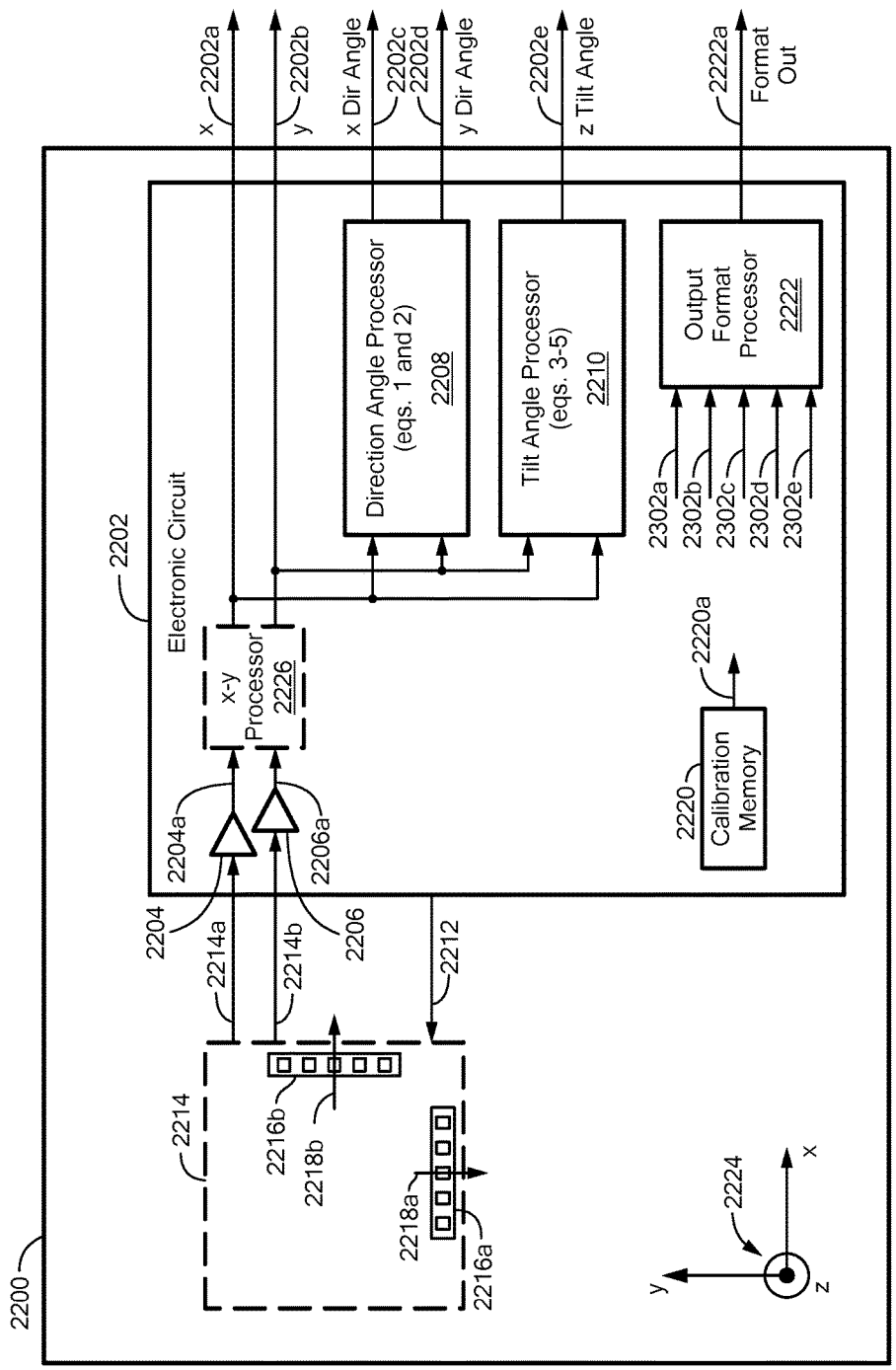
FIG. 22 is a top view of an electronic substrate having two magnetic field sensing elements and an electronic circuit that can be used as one of the above-mentioned electronic substrates.

Referring now to FIG. 22, an electronic substrate 2200 can be the same as or similar to the electronic substrates 108, 908 described above. However, unlike the substrates 108, 908, which can include four magnetic field sensing elements, upon the electronic substrate 2200 can be disposed two magnetic field sensing elements, for example, first and second magnetic field sensing elements 2216a, 2216b, respectively.

The first and second magnetic field sensing elements 2216a, 2216b are shown in a form representative of vertical Hall elements. Vertical hall elements are described above.

Accordingly, the first and second magnetic field sensing elements 2216a, 2216b have respective first and second directional maximum response axes 2218a, 2218b respectively. The directional maximum response axes 2218a, 2218b have the same characteristics as the maximum response axes 116, 118 of FIG. 2.

Current spinning or chopping can be used with the magnetic field sensing elements 2216a, 2216b as described above in conjunction with FIG. 13.

The first magnetic field sensing elements 2216a can generate a first electronic magnetic field signal 2214a, which is responsive to magnetic fields in the y direction, and second magnetic field sensing elements 2216b can generate a second electronic magnetic field signal 2214b, which is responsive to magnetic fields in the x direction.

The first and second electronic magnetic field signals 2214a, 2214b can be differential signals, each generated by a respective individual magnetic field sensing element, but are here shown as individual connections.

An electronic circuit 2202 can include first and second amplifiers 2204, 2206 coupled to receive the first and second magnetic field signals 2214a, 2214b, respectively and configured to generate first and second respective amplified signals 2204a, 2206a, respectively.

Optionally, the electronic circuit 2200 can include an x-y processor 2226 coupled to receive the first and second amplified signals 2204a, 2206a, configured to apply a calibration, and configured to generate an x signal 2202a and a y signal 2202b, respectively. This calibration is described more fully below. In other arrangements, the first and second amplified signals 2204a, 2206 can essentially bypass the x-y processor 2226.

The electronic circuit 2202 can also be configured to generate one or more drive signals 2212 that can drive the magnetic field sensing elements 2216a, 2216b.

It will be apparent that, having the two magnetic field signals 2214a, 2214b, there need not be a difference of signals, e.g., via differential amplifiers 1620, 1626 of FIG. 16 that would be used for four magnetic field signals. Instead, the x signal 2202a and the y signal 2202b can be indicative of responses from individual ones of the first and second magnetic field sensing elements 2218a, 2218b, respectively.

With non-differencing arrangements, unlike the differencing of signals of the magnetic field sensor 1600 of FIG. 16, the electronic magnetic field signals 2214a, 2214b are not necessarily fully independent. In other words, a movement of the shaft 102 of FIGS. 1 and 2 in the y direction might result not only result in a desired change of the electronic magnetic field single 2214a responsive to the y direction, but also in some undesirable change of the electronic magnetic field signal 2214b in the x direction. However, even with the above described arrangement that bypasses the x-y processor, still the x signal 2202a and the y signal 2202b might be sufficiently independent to result in sufficiently accurate signals among an x direction angle value 2202c, a y direction value 2202d, and a z tilt angle value 2202e described below.

As described above, angles (e.g., of the shaft 102 of FIG. 3) projected in the x-y plane are referred to herein as direction angles. A direction angle can be an x direction angle relative to the x-axis, or a y direction angle relative the x-axis. Angles (e.g., of the shaft 102 of FIG. 3) relative to the z-axis are referred to herein as tilt angles.

The electronic circuit 2202 is configured to generate one or more output signals, which can include, but which are not limited to, the x signal 2202a (a non-difference signal) representative of, for example, a projection of the shaft 102 of FIG. 3 upon the x-axis of the x-y plane, the y signal 2202b (a non-difference signal) representative of, for example, a projection of the shaft 102 of FIG. 3 upon the y-axis of the x-y plane, the x direction angle signal 2202c representative of, for example, a projection of the shaft 102 of FIG. 3 in the x-y plane and relative to the x-axis, the y direction angle signal 2202d representative of, for example, a projection of the shaft 102 of FIG. 3 projected in the x-y plane and relative to the y-axis, or the z tilt angle 2202e representative of, for example, a z tilt angle of the shaft 102 of FIG. 3 relative to the z-axis perpendicular to the x-y plane.

In some embodiments, the first and second magnetic field sensing elements 2216a, 2216b, respectively, here shown to be vertical Hall elements, can instead be magnetoresistance elements. Magnetoresistance elements are not used with current spinning or chopping.

In operation, referring briefly to FIG. 14, values of the signal 1402 can be representative of the magnetic field signal 2214a as an end of the shaft 102 of FIG. 3 is moved around a circle. Similarly, values of the signal 1404 of FIG. 14 can be representative of the magnetic field signal 2214b as an end of the shaft 102 of FIG. 3 is moved around a circle. Thus, compared to the four sinusoids of FIG. 14, for the arrangement of FIG. 22, there can be only two sinusoids.

Referring briefly to equations 1-5 above, similar computations for the x direction angle, the y direction angle, the z tilt angle, and for all computations of equations 1-5 can be used with the magnetic field sensor 2200 of FIG. 22, but, in equation (1) and (2) using the x and y signals 2202a, 2202b, respectively, rather than the x difference signal and y difference signal described above in conjunction with FIG. 13.

In some embodiments, the electronic circuit 2202 can include a calibration memory 2220 to store and provide calibration values 2220a that can be used with the x-y processor 2226 to enhance independence of the x signal 2202a and the y signal 2202b.

In some embodiments, the calibration memory 2220 is also configured to store and provide the calibration values 2220a, for example, according to the calibration described above in conjunction with FIG. 15.

In some embodiments, the electronic circuit 2202 can include an output format processor 2222 the same as or similar to the output format processor 1638 of FIG. 16.

Figure 23:
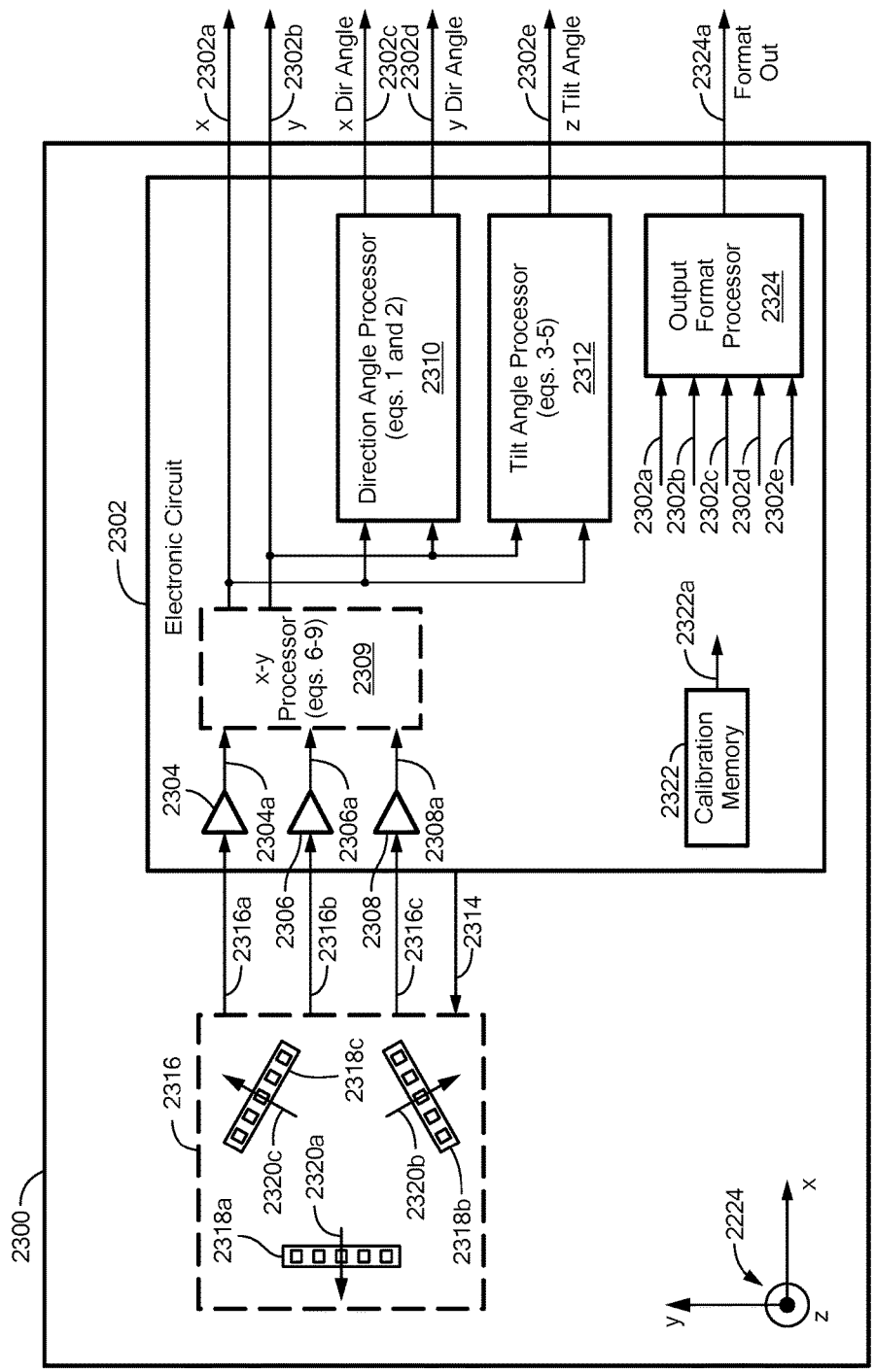
FIG. 23 is a top view of an electronic substrate having three magnetic field sensing elements and an electronic circuit that can be used as one of the above-mentioned electronic substrates.

Referring now to FIG. 23, an electronic substrate 2300 can be the same as or similar to the electronic substrates 108, 908 described above. However, unlike the substrates 108, 908, which can include four magnetic field sensing elements, upon the electronic substrate 2300 can be disposed three magnetic field sensing elements, for example, first, second, and third magnetic field sensing elements 2318a, 2318b, 2318c, respectively. The first, second, and third magnetic field sensing elements 2318a, 2318b, 2318c can be the same as or similar to the three magnetic field sensing elements 2006, 2008, 2010 of FIGS. 20 and 21.

Accordingly, the first, second, and third magnetic field sensing elements 2318a, 2318b, 2318c have respective first, second, and third directional maximum response axes 2314a, 2314b, 2314c, respectively. The directional maximum response axes 2314a, 2314b, 2314c have the same characteristics as the direction maximum response axes 2006, 2008, 2010 of FIG. 21.

Current spinning or chopping can be used with the magnetic field sensing elements 2318a, 2318b, 2318c as described above in conjunction with FIG. 13.

The first, second, and third magnetic field sensing elements 2318a, 2318b, 2318c can generate a respective first, second and third electronic magnetic field signals 2316a, 2316b, 2316c, respectively. In some embodiments, the first, second, and third electronic magnetic field signals 2316a, 2316b, 2316c are differential signals as provided by individual ones of the magnetic field sensing element 2318a, 2318b, 2318c, but are here shown as individual connections.

An electronic circuit 2302 can include first, second, and third amplifiers 2304, 2306, 2308 coupled to receive the first, second, and third magnetic field signals 2316a, 2316b, 2316c, respectively and configured to generate first, second, and third amplified signals 2304a, 2306a, 2308a, respectively.

Optionally, the electronic circuit 2200 can include an x-y processor 2309 coupled to receive the first, second, and third amplified signals 2304a, 2306a, 2308a configured to apply a calibration, and configured to generate an x signal 2302a and a y signal 2302b, respectively. This calibration is described more fully below.

The electronic circuit 2302 can also be configured to generate one or more drive signals 2314 that can drive the magnetic field sensing elements 2318a, 2318b, 2318c.

It will be apparent that, having the three magnetic field signals 2318a, 2318b, 2318c, there need not be a difference of signals, e.g., via differential amplifiers 1620, 1626 of FIG. 16 that would be used for four magnetic field signals. Instead, the x signal 2302a and the y signal 2302b can be indicative of responses from combined ones of the first, second, and third magnetic field sensing elements 2318a, 2318b, 2318c, respectively, the combination being other than a differencing of pairs of signals.

As described above, angles (e.g., of the shaft 102 of FIG. 3) projected in the x-y plane are referred to herein as direction angles. A direction angle can be an x direction angle relative to the x-axis, or a y direction angle relative the x-axis. Angles (e.g., of the shaft 102 of FIG. 3) relative to the z-axis are referred to herein as tilt angles.

The electronic circuit 2302 is configured to generate one or more output signals, which can include, but which are not limited to, an x signal 2302a (a non-difference signal) representative of, for example, a projection of the shaft 102 of FIG. 3 upon the x-axis of the x-y plane, a y signal 2302b (a non-difference signal) representative of, for example, a projection of the shaft 102 of FIG. 3 upon the y-axis of the x-y plane, an x direction angle signal 2302c representative of, for example, a projection of the shaft 102 of FIG. 3 in the x-y plane and relative to the x-axis, a y direction angle signal 2302d representative of, for example a projection of the shaft 102 of FIG. 3 in the x-y plane and relative to the y-axis, or a z tilt angle signal 2302e representative of, for example, a z tilt angle of the shaft 102 of FIG. 3 relative to the z-axis perpendicular to the x-y plane.

In some embodiments, the first, second, and third magnetic field sensing elements 2318a, 2318b, 2318c, respectively, here shown to be vertical Hall elements, can instead be magnetoresistance elements. Magnetoresistance elements are not used with current spinning or chopping.

In some embodiments, the three magnetic field sensing elements 2318a, 2318b, 2318c are not disposed in an orthogonal arrangement. In some embodiments, the three magnetic field sensing elements 2318a, 2318b, 2318c are arranged one hundred twenty degrees apart.

Referring briefly to the four signals of FIG. 14, it should be apparent that a similar three sinusoidal signals result from the three magnetic field sensing element 2318a, 2318b, 2318c as the shaft 102 of FIG. 1 is moved in a circle, and the three sinusoidal signals can be one under twenty degrees apart in phase.

Referring briefly to equations 1-5 above, similar computations for the x direction angle, the y direction angle, the z tilt angle, and for all computations of equations 1-5 can be used with the magnetic field sensor 2300 of FIG. 23, but, in equation (1) and (2) using the x and y signals 2302a, 2302b, respectively, rather than the x difference signal and y difference value signal described above in conjunction with FIG. 13.

In some embodiments, the electronic circuit 2302 can include a calibration memory 2322 to store and provide calibration values 2322a that can be used with the x-y processor 2309 to enhance independence of the x signal 2302a and the y signal 2302b.

In some embodiments, the calibration memory 2322 is also configured to store and provide the calibration values 2322aa, for example, according to the calibration described above in conjunction with FIG. 15.

As described above, the x-y processor 2309 is coupled to receive the three magnetic field signals 2304a, 2306a, 2308a and configured to generate the x signal 2302a and a y signal 2302b, similar to the x signal 2202a and the y signal 2202b of FIG. 22. To this end, further equations are described below, with which the x-y processor 2309 can convert the three amplified signals 2304a, 2306a, 2308a into Cartesian x and y signals 2302a, 2302b.

In some embodiments the x-y processor can compute the x and y signals 2302a, 2302b using each one of the amplified signals 2304a, 2306a, 2308a, essentially averaging the amplified signals together. To this end, a geometric consideration is provided below As a geometric consideration and assuming that the second magnet 102 of FIG. 1 experiences not only rotation but translation of the second magnet 102 as would be apparent from the arrangement of FIG. 1, the x-y processor 2309 can use the output signals of each magnetic field sensing elements 2318a, 2318b, 2318c to compute an x coordinate position of the shaft, and a y position of the shaft, e.g., 102 of FIG. 1. The x-y processor 2309 can essentially average output signals from the three magnetic field sensing elements 2318a, 2318b, 2318c to increase accuracy of the computation.

For example, if the magnetic field sensing elements 2318a, 2318b, 2318c are placed relative one hundred twenty degree apart as shown, then equation (6) can be used to compute an x position of the second magnet, e.g., 104:

$$X = F - \left(\frac{G+H}{2}\right) \quad (6)$$

where:

X is an x position (which is related to the x value 2302a) of the second magnet, e.g., 104, in an x direction;

F is a distance between the magnetic field sensing element 2318a and a center of the second magnet, e.g., 104;

G is a distance between the magnetic field sensing element 2318b and the center of the second magnet, e.g., 104; and H is a distance between magnetic field sensing element 2318c and the center of the second magnet, e.g., 104.

It should be understood that the distances F, G, and H are related to values of the magnetic field signals 2316a, 2316b, 2316c, respectively. Rotation amounts of the second magnet 104 can be used in place of the above distances.

As described above, the x-y processor 2309 is coupled to receive the three magnetic field signals 2304a, 2306a, 2308a and configured to generate the x signal 2302a and a y signal 2302b, similar to the x signal 2202a and the y signal 2202b of FIG. 22. To this end, further equations are described below, with which the x-y processor 2309 can convert the three amplified signals 2304a, 2306a, 2308a into Cartesian x and y signals 2302a, 2302b.

In some embodiments the x-y processor can compute the x and y signals 2302a, 2302b using each one of the amplified signals 2304a, 2306a, 2308a, essentially averaging the amplified signals together. To this end, a geometric consideration is provided below As a geometric consideration and assuming that the second magnet 102 of FIG. 1 experiences not only rotation but translation of the second magnet 102 as would be apparent from the arrangement of FIG. 1, the x-y processor 2309 can use the output signals of each magnetic field sensing elements 2318a, 2318b, 2318c to compute an x coordinate position of the shaft, and a y position of the shaft, e.g., 102 of FIG. 1. The x-y processor 2309 can essentially average output signals from the three magnetic field sensing elements 2318a, 2318b, 2318c to increase accuracy of the computation.

For example, if the magnetic field sensing elements 2318a, 2318b, 2318c are placed relative one hundred twenty degree apart as shown, then equation (6) can be used to compute an x position of the second magnet, e.g., 104:

$$X = F - \left(\frac{G+H}{2}\right) \quad (6)$$

where:

X is an x position (which is related to the x value 2302a) of the second magnet, e.g., 104, in an x direction;

F is a distance between the magnetic field sensing element 2318a and a center of the second magnet, e.g., 104;

G is a distance between the magnetic field sensing element 2318b and the center of the second magnet, e.g., 104; and H is a distance between magnetic field sensing element 2318c and the center of the second magnet, e.g., 104.

It should be understood that the distances F, G, and H are related to values of the magnetic field signals 2316a, 2316b, 2316c, respectively. Rotation amounts of the second magnet 104 can be used in place of the above distances.

In another embodiment, equation (7) can be used to compute the X position of the second magnet, e.g., 104:

$$X = \frac{(X_{2312a} + D_{2312a}) + (X_{2312b} - D_{2312b}\cos(60)) + (X_{2312c} - D_{231ca}\cos(60))}{3} \quad (7)$$

where:

X is an x position (which is related to the x value 2302a) of the second magnet, e.g., 104, in an x direction;

$X_{2318a}$ is an x projected position in an x-y plane of the magnetic field sensing element 2318a;

$D_{2318a}$ is a distance between the magnetic field sensing element 2318a and the center of the second magnet, e.g., 104;

$X_{2318b}$ is an x projected position in the x-y plane of the magnetic field sensing element 2318b;

$D_{2318b}$ is the distance between the magnetic field sensing element 2318b and the center of the second magnet, e.g., 104;

$X_{1312c}$ is an x projected position in the x-y plane of the magnetic field sensing element 2318c; and $D_{2318c}$ is the distance between the magnetic field sensing element 2318c and the center of the second magnet, e.g., 104.

In another embodiment, equation (7) can be used to compute the X position of the second magnet, e.g., 104:

$$X = \frac{(X_{2312a} + D_{2312a}) + (X_{2312b} - D_{2312b}\text{COS}(60)) + (X_{2312c} - D_{231ca}\text{COS}(60))}{3} \qquad (7)$$

where:

X is an x position (which is related to the x value 2302*a*) of the second magnet, e.g., 104, in an x direction;

$X_{2318a}$ is an x projected position in an x-y plane of the magnetic field sensing element 2318*a*;

$D_{2318a}$ is a distance between the magnetic field sensing element 2318*a* and the center of the second magnet, e.g., 104;

$X_{2318b}$ is an x projected position in the x-y plane of the magnetic field sensing element 2318*b*;

$D_{2318b}$ is the distance between the magnetic field sensing element 2318*b* and the center of the second magnet, e.g., 104;

$X_{1312c}$ is an x projected position in the x-y plane of the magnetic field sensing element 2318*c*; and $D_{2318c}$ is the distance between the magnetic field sensing element 2318*c* and the center of the second magnet, e.g., 104.

It should be understood that the distances above are related to values of the magnetic field signals 2316*a*, 2316*b*, 2316*c*. Rotation amounts of the second magnet 104 can be used in place of the above distances.

Using the same example, equation (8) can be used to compute a Y position of second magnet, e.g., 104:

$$Y = \sin(90)/\sin(120) * \left(\frac{3*G}{2} - \frac{3*H}{2}\right) \qquad (8)$$

where:

Y is a y position (which is related to the y value 2302*b*) of the second magnet, e.g., 104, in a y direction;

G is the distance between the magnetic field sensing element 2318*b* and the center of the second magnet, e.g., 104; and H is the distance between magnetic field sensing element 2318*c* and the center of the second magnet, e.g., 104

It should be understood that the distances G and H are related to values of the magnetic field signals 2316*b*, 2316*c*, respectively. Rotation amounts of the second magnet 104 can be used in place of the above distances.

In another embodiment, equation (9) can be used to compute the Y position of magnetic target 102:

$$Y = \frac{(Y_{2312b} + D_{2312b}\text{COS}(30)) + (Y_{2312c} - D_{2312c}\text{COS}(30))}{2} \qquad (9)$$

where:

Y is a y position (which is related to the y value 2302*b*) of the second magnet, e.g., 104, in a y direction;

$Y_{2318b}$ is a y projected position in the x-y plane of the magnetic field sensing element 2318*b*;

$D_{2318b}$ is a distance between the magnetic field sensing element 2318*b* and the center of the second magnet, e.g., 104;

$Y_{2318c}$ is a y projected position in the x-y plane of magnetic field sensing element 2318*c*; and $D_{2318c}$ is a distance between magnetic field sensing element 2318*c* and the center of the second magnet, e.g., 104.

It should be understood that the distances above are related to values of the magnetic field signals 2316*a*, 2316*b*, 2316*c*. Rotation amounts of the second magnet 104 can be used in place of the above distances.

In equation (9), the distance between magnetic field sensing element 2318*a* and the center of the second magnet, e.g., 104, is not used because the magnetic field sensing element 2318*a* is positioned to sense distance directly along the x axis. Therefore, the distance measured by magnetic field sensing element 2318*a* (and associated y value of this element) does not include a y projected position.

These above equations are provided as examples only. The equations above may be used, for example, if the magnetic field sensing elements are arranged in 120 degree increments (as shown in FIG. 23). Other equations may be used if the sensing elements are placed in other positions. For example, the magnetic field sensing elements may be placed at +/− forty-five degrees from a center element, at +/− sixty degrees from a center element, at +/− ninety degrees from a center element, or any other placement. Also, the magnetic field sensing elements 2318*a*, 2318*b*, 2318*c* need not be placed in regular spacing. For example, there can be any angle A between the magnetic field sensing element 2318*a* and the magnetic field sensing element 2318*b* and there can be any angle B between the magnetic field sensing 2318*a* and the magnetic field sensing elements 2318*c*. The angles A and B need not be the same angle.

Depending on the arrangement of the magnetic field sensing elements, the angles between them, different formulas may be used to compute the above X and Y positions.

It will also be apparent that, if the second magnet 102 of FIG. 1 is arranged to rotate without translation, other equations can be used to determine the X and Y positions. In some embodiments, the equations used to compute the X and Y positions may be adjusted to alter sensitivity, accuracy, timing, or other parameters related to the position of second magnet 104.

As described above, where the second magnet 104 of FIG. 1 experiences translation of the second magnet 104, sensing the x and y position of second magnet 104 provides the x signal 2302*a* and the y signal 2302*b*, resulting in computation of the z tilt angle signal 2302*e*, the x direction angle signal 2302*c*, and the y direction angle signal 2302*d* using equations described above.

Referring to FIGS. 24-29, in which like elements of FIG. 1 are shown having like reference designations, example joystick assemblies (e.g., 2400, shown in FIG. 24) as may be suitable for use with a device (e.g., a smartphone, tablet computer, instrumentation console, video game console, video game controller, keyboard, laptop computer, or other computing device) including at least a first magnet (e.g., 110, shown in FIG. 24) having north and south magnetic poles according to the disclosure are shown. The joystick assemblies may, for example, be used as a positional input device and be used in connection with one or more portions of the magnetic assemblies described in figures above (e.g., 100, shown in FIG. 1), for which magnets used in the magnetic assemblies provide a restoring force, and for which movement of one of the magnets used in the magnetic assemblies is sensed by electronic circuits to provide one or more output signals representative of one or more angles associated with the magnets. The joystick assemblies may also be used in connection with other magnetic assemblies.

It should be appreciated that the example joystick assemblies of FIGS. 24-29 described below are but several of many potential configurations of joystick assemblies in accordance with the disclosure. For example, while joystick assemblies including a substantially spherical second magnet (e.g., 2402, shown in FIG. 24) are shown in FIGS. 24-29, it should be appreciated that the second magnet may take the form of a variety of different shapes (e.g., depending on the application). Additionally, while several of the joystick assemblies are described as removable from the devices (e.g., 2408, shown in FIG. 24) with which they are used, it should be appreciated that the joystick assemblies may also be integrated into and substantially fixed to the devices, such as mobile phones, in some embodiments.

Figure 24:
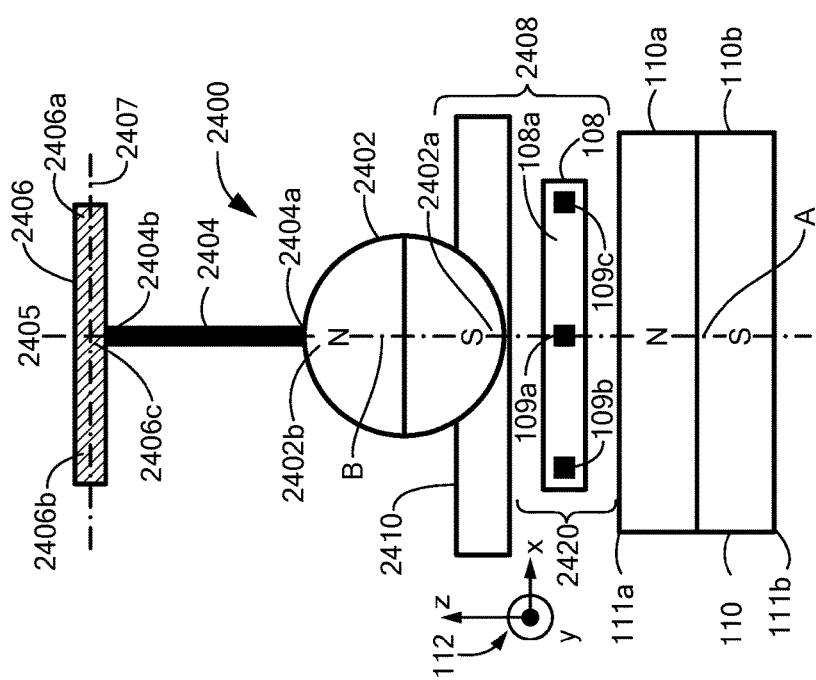
FIG. 24 is a side view of a first example configuration of a joystick assembly for use with a device comprising a first magnet having north and south magnetic poles according to the disclosure.

Referring to FIG. 24, a first example joystick assembly 2400 according to the disclosure for use with a device 2408 including a first example joystick surface 2410 and a first magnet 110 is shown to include a second magnet 2402, a moveable elongated shaft 2404 and a handle 2406. The second magnet 2402, which is a substantially spherical magnet in the illustrated embodiment, has a first portion 2402a proximate to the joystick surface 2410 and to a first surface 111a of the first magnet 110. The second magnet 2402 also has a second portion 2402b distal from the joystick surface 2410 and the first surface 111a of the first magnet 110.

The first portion 2402a of the second magnet 2402 corresponds to a south magnetic pole S of the second magnet 2402, and the second portion 2402b of the second magnet 2402 corresponds to a north magnetic pole N of the second magnet 2402 in the illustrated embodiment. Additionally, the first portion 110a of the first magnet 110 corresponds to a north magnetic pole N of the first magnet 110, and a second, opposing portion 110b of the first magnet 110 corresponds to a south magnet pole S of the first magnet 110 in the illustrated embodiment. However, in other embodiments, the first portion 2402a of the second magnet 2402 may correspond to a north magnetic pole N of the second magnet 2402 and the first portion 110a of the first magnet 110 may correspond to a south magnetic pole S of the first magnet 110. Additionally, the second portion 2402b of the second magnet 2402 may correspond to a south magnetic pole S of the second magnet 2402 and the second portion 110b of the first magnet 110 may correspond to a north magnetic pole N of the first magnet 110.

The first portion 2402a of the second magnet 2402 may be attracted to the first surface 111a of the first magnet 110 and may be positioned in contact with the joystick surface 2410. The joystick surface 2410, which may be a substantially curved surface or a substantially flat surface, corresponds to a surface on the device 2408 which is suitable for use with the joystick assembly 2400 (e.g., for receiving positioning input data). As one example, the joystick surface 2410 may correspond to a select surface on a front or rear face of the device 2408. For example, the joystick surface 2410 may correspond to a surface on or proximate to a so-called "home button" or another button on a device face. As another example, the joystick surface 2410 may correspond to a surface on a select portion of a screen (e.g., a touch screen) of the device 2408. As a further example, the joystick surface 2410 may correspond to a surface on a keyboard (e.g., a surface between keys on a keyboard) or a laptop computer, where the device 2408 corresponds to the keyboard or laptop computer. For example, the joystick surface 2410 may correspond to a surface on the keyboard or laptop computer which is traditionally reserved for so-called a "pointing stick" or isometric joystick, with the joystick assembly 2400 (and joystick assemblies of figures below) capable of integrating with and/or replacing the "pointing stick." It should be appreciated that the joystick surface 2410 may correspond to substantially any surface on or proximate to the device 2408 which is suitable or may be adapted to be suitable for use with the joystick assembly 2400.

The moveable elongated shaft 2404, which may take the form of a cylindrical rod, for example, and be indicative of a shaft that can be moved by a user, has first and second opposing ends 2404a, 2404b arranged along a major axis 2405 of the shaft 2404. The first end 2404a of the shaft 2404 is fixedly coupled to (e.g., threaded, clamped, adhered, glued, epoxied, or molded onto) the second magnet 2402 such that movement of the shaft 2404 results in movement of the second magnet 2402 relative to the first magnet 110. Additionally, the first end 2404a of the shaft 2404 is fixedly coupled to the second magnet 2402 such that a line B between centers of the north and south magnetic poles of the second magnet 2402 is moveable relative to a line A between the north and south magnetic poles of the first magnet 110. In other words, the shaft 2404 is fixedly coupled to the second magnet 2402 such that, if the shaft 2404 is moved relative to the first magnet 110, the second magnet 2402 also experiences movement relative to the first magnet 110.

The shaft 2404 and the second magnet 2402 are shown in a null or resting position in FIG. 24. In particular, an attraction of the second magnet 2402 to the first magnet 110 results in a restoring force upon the shaft 2404, with the restoring force allowing for the shaft 2404 to achieve the null position as shown when substantially no other force is applied to the shaft 2404. It should be appreciated that the shaft 2404 and the second magnet 2402 may be positioned at a plurality of different positions relative to the first magnet 110 upon application of a force to the shaft 2404, one such position being shown and described below in connection with FIGS. 30 and 31, for example.

The shaft 2404 and the second magnet 2402 may be removable from the joystick surface 2410, as described more fully below in conjunction with FIGS. 32-34, for example. However, let it suffice here to say that, with the example arrangement of FIG. 24, the shaft 2404 and the second magnet 2402 may be removable from the joystick surface 2410 upon application of a force which is greater than and in a substantially opposite direction with respect to the attraction of the second magnet 2402 to the first magnet 110.

Figures 26, 27:
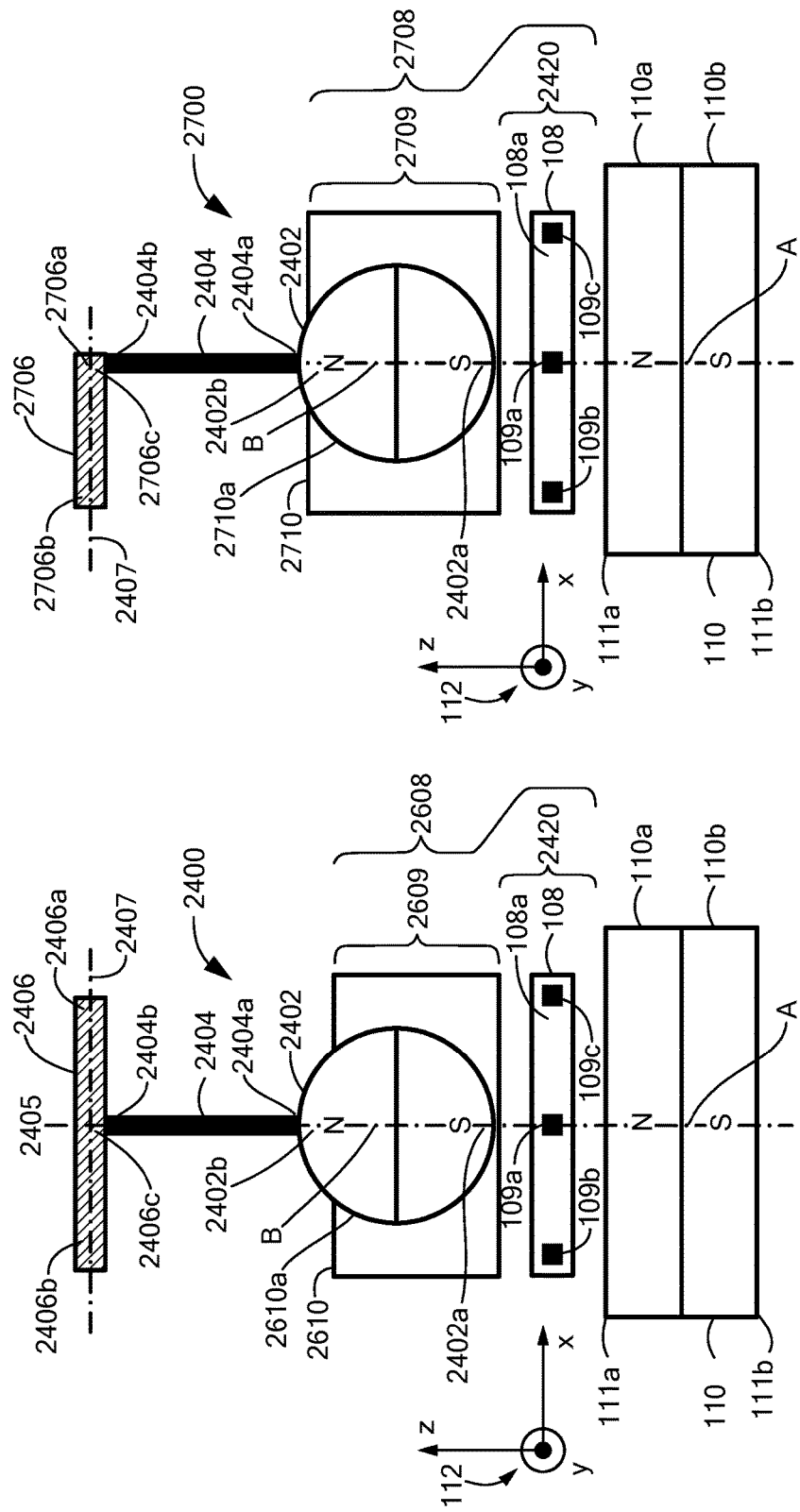
FIG. 26 is a side view of another example configuration of the joystick assembly of FIG. 24.
FIG. 27 is a side view of a second example configuration of a joystick assembly according to the disclosure.

The handle 2406, which may be a plastic or metal handle, for example, is coupled to (e.g., threaded, clamped, adhered, glued, epoxied, or molded onto) the second end 2404b of the shaft 2404. In the illustrated embodiment, the shaft 2404 takes the form of a first elongated shaft 2404 and the handle 2406 takes the form of a second elongated shaft 2406 having first and second opposing ends 2406a, 2406b arranged along a major axis 2407 of the second elongated shaft 2406. Additionally, a portion 2406c between the first and second ends 2406a, 2406b of the second elongated shaft 2406 is coupled to the second end 2404b of the first elongated shaft 2404. The shaft 2404 and the handle 2406 form a substantially T-shaped assembly in the illustrated embodiment. However, in other embodiments, the shaft 2404 and the handle 2406 may form a substantially L-shaped assembly, as shown in FIG. 27, for example, or other shaped assemblies (e.g., a V-shaped assembly) depending on a shape of the shaft 2404 and/or the handle 2406. It should be appreciated that the shaft 2404 and the handle 2406 may take the form of a variety of shapes. For example, while not shown, the handle 2406 may have a substantially circular or button shape.

In some embodiments, the handle 2406 is fixedly coupled to the shaft 2404. In other embodiments, the handle 2406 is removable from the shaft 2404. For example, it may be desirable to remove handle 2406 from shaft 2404 and replace handle 2406 with another handle (e.g., depending upon the application). Gaming applications may, for example, be better suited for a first handle (e.g., a thumbstick) having first dimensions while productivity applications may be better suited for a second handle (e.g., an ergonomic handle) having second dimensions.

In the illustrated embodiment, the device 2408 also includes a magnetic field sensor 2420 disposed between the joystick surface 2410 and the first magnet 110. The magnetic field sensor 2420, which may be the same as or similar to magnetic field sensors described in figures above (e.g., 2300, shown in FIG. 23), includes a plurality of magnetic field sensing elements 109a, 109b, 109c (e.g., Hall effect elements) supported by a surface 108a of substrate 108. The magnetic field sensing elements 109a, 109b, 109c, which each have a respective maximum response axis, are configured to generate a respective plurality of magnetic field signals and to detect a position of the second magnet 2402 relative to the first magnet 110. Specifically, motion of the second magnet 2402 with respect to the first magnet 110 can result in variations of a magnetic field sensed by the sensing elements 109a, 109b, 109c and, thus, result in variations of the magnetic field signals generated by the sensing elements 109a, 109b, 109c and the detected position of the second magnet 2402 relative to the first magnet 110. In some embodiments, the first magnet 110 forms part of the magnetic field sensor 2420.

Additionally, in some embodiments, the magnetic field signals may be received by circuitry (e.g., circuit 1308, shown in FIG. 13) configured to provide an output signal of the magnetic field sensor 2420 indicative of the detected position of the second magnet 2402 relative to the first magnet 110. The detected position of the second magnet 2402 relative to the first magnet 110 may, for example, be indicative of one or more of: a projection of the shaft 2404 upon the x-axis of the x-y plane of the joystick surface 2410 in accordance with coordinate axes 112, a projection of the shaft 2404 upon the y-axis of the x-y plane, and a z tilt angle of the shaft 2404 relative to the z-axis perpendicular to the x-y plane. Additionally, the detected position, as provided in the magnetic field sensor output signal, may be used as positional input data for the device 2408. The device 2408 may, for example, include a processor coupled to receive and process the magnetic field sensor output signal.

While a magnetic field sensor (e.g., 2420) including a particular number of sensing elements (e.g., at least sensing elements 109a, 109b, and 109c) is shown in FIG. 24 and figures below, it should be appreciated that magnetic field sensors including two or more sensing elements can be used to detect a position of a second magnet (e.g., 2402) relative to a first magnet (e.g., 110).

Figure 25:
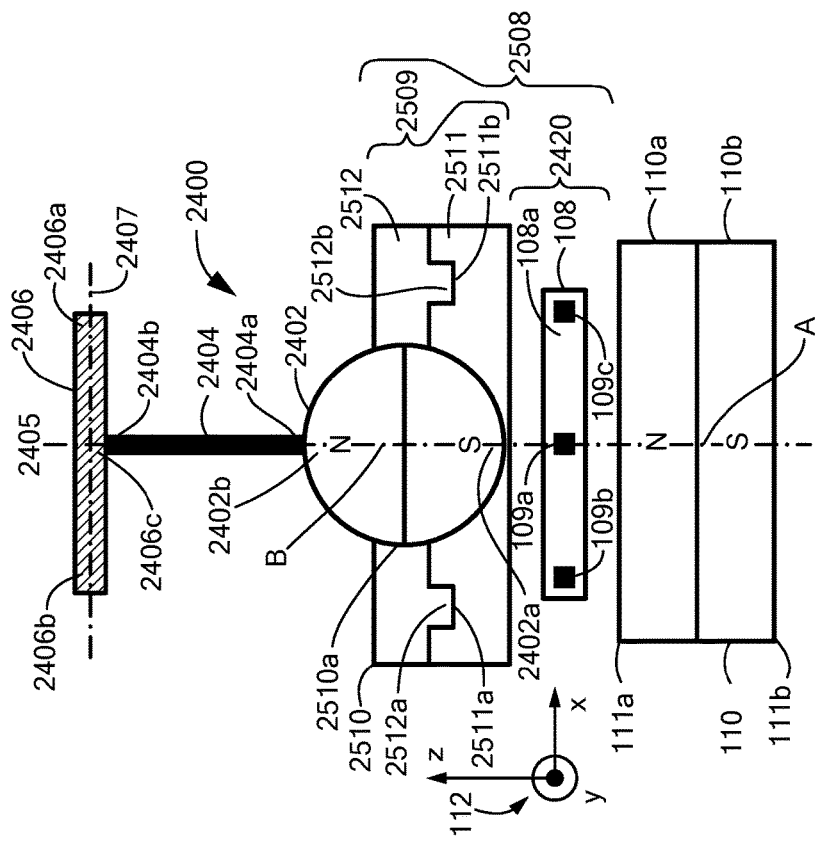
FIG. 25 is a side view of an example configuration of the joystick assembly of FIG. 24.

Referring to FIG. 25, in which like elements of FIG. 24 are shown having like reference designations, joystick assembly 2400 is shown with a device 2508 including a second example joystick surface 2510, first magnet 110 and magnetic field sensor 2420. The magnetic field sensor 2420 is disposed between the joystick surface 2510 and the first magnet 110, and the first portion 2402a of second magnet 2402 of joystick assembly 2400 is attracted to first surface 111a of the first magnet 110 and disposed in the joystick surface 2510. In the illustrated embodiment, the joystick surface 2510 has a cavity 2510a in a housing 2509 of the device 2508, the device housing 2509 having a first couplable portion 2511 and a second couplable portion 2512 (e.g., a mounting plate).

The second couplable portion 2512 may be configured to couple to the first couplable portion 2511 in a variety of different manners. As one example, the first couplable portion 2511 may have recesses 2511a, 2511b configured to receive corresponding projections 2512a, 2512b of the second couplable portion 2512. When projections 2512a, 2512b of the second couplable portion 2512 are received in recesses 2511a, 2511b of the first couplable portion 2511, the second couplable portion 2512 and the first couplable portion 2511 form at least two common planar surfaces in the illustrated embodiment. In some embodiments, the second couplable portion 2512 may be fixedly coupled to the first couplable portion 2511 (e.g., during manufacture of the device housing 2509) so as to fixedly and movably retain the second magnet 2402 within the cavity 2510a. In other embodiments, the second couplable portion 2512 may be removably coupled to the first couplable portion 2511 so as to allow for insertion, removal and/or replacement of the second magnet 2402.

While device housing 2509 is shown as having at least two planar surfaces and as taking the form of a substantially rectangular shape in the illustrated embodiment, it should be appreciated that device housing 2509 (and device housings described in figures above and below) can take the form of a variety of shapes and have one or more curved surfaces (e.g., for ornamental purposes and/or for reducing the volume of the device housing 2509). It follows that the first couplable portion 2511 and the second couplable portion 2512 of the device housing 2509 may also have one or more curved surfaces in some embodiments.

Referring to FIG. 26, joystick assembly 2400 is shown used with a device 2608 including a third example joystick surface 2610, first magnet 110 and magnetic field sensor 2420. The magnetic field sensor 2420 is disposed between the joystick surface 2610 and the first magnet 110, and the first portion 2402a of second magnet 2402 is attracted to first surface 111a of the first magnet 110 and may be positioned in contact with the joystick surface 2610. The joystick surface 2610 has a cavity 2610a in a housing 2609 of the device 2608, the housing 2609 provided of a single piece construction in the illustrated embodiment. The cavity 2610a substantially surrounds the second magnet 2402 to fixedly and movably retain the second magnet 2402 within the cavity 2610a. In one embodiment, with the above-described arrangement, the second magnet 2402 is able to rotate to a number of different positions with respect to the first magnet 110 but is substantially unable to move laterally relative to the joystick surface 2610.

Referring to FIG. 27, a second example joystick assembly 2700 according to the disclosure is shown used with a device 2708 including a fourth example joystick surface 2710, first magnet 110 and magnetic field sensor 2420. The joystick assembly 2700 includes second magnet 2402, movable elongated shaft 2404 and a handle 2706. The shaft 2404 takes the form of a first elongated shaft 2404 and the handle 2706 takes the form of a second elongated shaft 2706 having first and second opposing ends 2706a, 2706b arranged along a major axis 2707 of the second elongated shaft 2706 in the illustrated embodiment. The first end 2404a of the shaft 2404 is fixedly coupled to (e.g., threaded, clamped, adhered, glued, epoxied, or molded onto) the second magnet 2402 and the first end 2706a of the handle 2706 is coupled proximate to second end 2404b of the shaft 2404 to form a substantially L-shaped assembly.

The magnetic field sensor 2420 of the device 2708 is disposed between the joystick surface 2710 and the first magnet 110, and the first portion 2402a of the second magnet 2402 is attracted to first surface 111a of the first magnet 110 and may be positioned in contact with the joystick surface 2710. The joystick surface 2710 has a cavity 2710a in a housing 2709 of the device 2708, the housing 2709 provided of a single piece construction in the illustrated embodiment. The cavity 2710a substantially surrounds the second magnet 2402 to fixedly and movably retain the second magnet 2402 within the cavity 2710a.

Referring to FIG. 28, in which like elements of FIG. 26 are shown having like reference designations, a third example joystick assembly 2800 is shown used with a device 2608 including joystick surface 2610, first magnet 110 and magnetic field sensor 2420. The joystick assembly 2800 includes second magnet 2402 and movable elongated shaft 2404, but no handle (e.g., 2406). The first end 2404a of the shaft 2404 is fixedly coupled to (e.g., threaded, clamped, adhered, glued, epoxied, or molded onto) the second magnet 2402, and the first portion 2402a of second magnet 2402 is attracted to first surface 111a of the first magnet 110 and may be positioned in contact with the joystick surface 2610. In some embodiments, a handle or other accessory (e.g., a trigger button) may be coupled proximate to the second end 2404b of the shaft 2404 to provide further configurability for the joystick assembly 2800.

Referring to FIG. 29, in which like elements of FIG. 27 are shown having like reference designations, a fourth example joystick assembly 2900 is shown used with a device 2708 (e.g., a mobile computing device) including joystick surface 2710, first magnet 110 and magnetic field sensor 2420. The joystick assembly 2900 includes a substantially spherical trackball 2902, the trackball 2902 having a first portion 2902a proximate to the joystick surface 2710 and to first surface 111a of the first magnet 110 and a second portion 2902b distal from first surface 111a of the first magnet 110. The joystick surface 2710 of the device 2708, which has a cavity 2710a, as discussed above, substantially surrounds the trackball 2902 such that the trackball 2902 is fixedly and movably retained relative to the joystick surface 2710.

Additionally, the trackball 2902 includes a second magnet 2903, the second magnet 2903 having a first portion 2903a proximate to first portion 2902a of the trackball 2902 and a second portion 2903b proximate to second portion 2902b of the trackball 2902. In one embodiment, the trackball 2902 includes a magnetic material providing the second magnet 2903. Additionally, in one embodiment, the trackball 2902 includes an outer shell (e.g., a plastic or metal shell) enclosing the second magnet 2903.

The first portion 2903a of the second magnet 2903 corresponds to a south magnetic pole S of the second magnet 2903, and the second portion 2903b of the second magnet 2903 corresponds to a north magnetic pole N of the second magnet 2903 in the illustrated embodiment. The first portion 2903a of the second magnet 2903 is attracted to the first portion 110a of the first magnet 110 in the illustrated embodiment.

The trackball 2902 encloses the second magnet 2903 or, more generally is arranged with respect to the second magnet 2903, such that movement of the trackball 2903 results in movement of the second magnet 2903 relative to the first magnet 110. Additionally, the trackball 2902 encloses the second magnet 2903, or is arranged with respect to the second magnet 2903, such that a line C between centers of the north and south magnetic poles N, S, of the second magnet 2903 is movable relative to a line A between the north and south magnetic poles N, S of the first magnet 110.

The trackball 2902 and the second magnet 2903 are each shown in a null or resting position in the illustrated embodiment. In particular, an attraction of the second magnet 2903 to the first magnet 110 results in a restoring force upon the second magnet 2903, with the restoring force allowing for the trackball 2902 and the second magnet 2903 to achieve the null position as shown when substantially no other force is applied to the trackball 2902. However, it should be appreciated that the trackball 2902 and the second magnet 2903 may be positioned at a plurality of different positions relative to the first magnet 110 upon application of a force to the trackball 2902.

In one embodiment, the restoring force described above exists at each different position of the second magnet 2903 relative to the first magnet 110. The magnetic field sensor 2420 may detect a position of the second magnet 2903 and, thus, a position of the trackball 2902, relative to the first magnet 110. In other words, the magnetic field sensor 2420 may detect an actual position of the trackball 2902 relative to the first magnet 110, rather than a relative position of the trackball 2902 with respect to a previous position of the trackball 2902. Such configuration may, for example, be desirable in applications where absolute position information is required or helpful, and/or in applications having menu based graphical user interfaces.

While the trackball 2902 is described as fixedly and movably retained relative to joystick surface 2710 in the illustrated embodiment, it should be appreciated that in some embodiments the trackball 2902 may be removable from a joystick surface of a device in which the joystick assembly 2900 and, thus, trackball 2902 are used. For example, if the joystick assembly 2900 were used with the device 2508 shown in FIG. 25, the trackball 2902 could be removable from joystick surface 2510 upon removal of the second coupling portion 2512 from the first coupling portion 2511. Removal of the trackball 2902 from the joystick surface 2510 may, for example, be desirable for replacing the trackball 2902 with a same or similar "new" trackball and/or for lubricating the trackball 2902.

Figure 30:
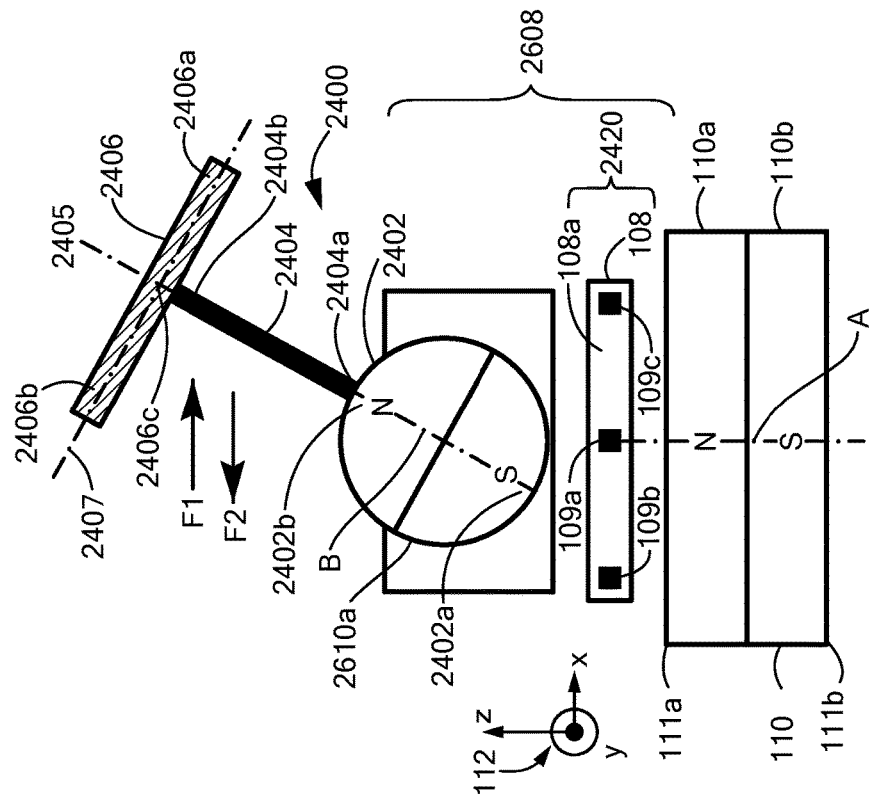
FIG. 30 is a side view of the joystick assembly of FIG. 24 with a change in position.

Referring to FIG. 30, in which like elements of FIG. 24 are shown having like reference designations, the second magnet 2402 and the shaft 2404 of joystick assembly 2400 are shown moved to a first example position relative to the first magnet 110. The second magnet 2402 may, for example, be moved to the first position in response to a user applying a force F1 upon at least one of the second magnet 2402, the shaft 2404 and the handle 2406. If the user were to release the second magnet 2402, the shaft 2404 and/or the handle 2406, the force F1 would cease to exist, and the joystick assembly 2400 would return to its null or resting position, as shown in FIG. 24, for example, as a result of a restoring force F2. The restoring force F2 is a result of an attraction of the second magnet 2402 to the first magnet 110.

Figure 31:
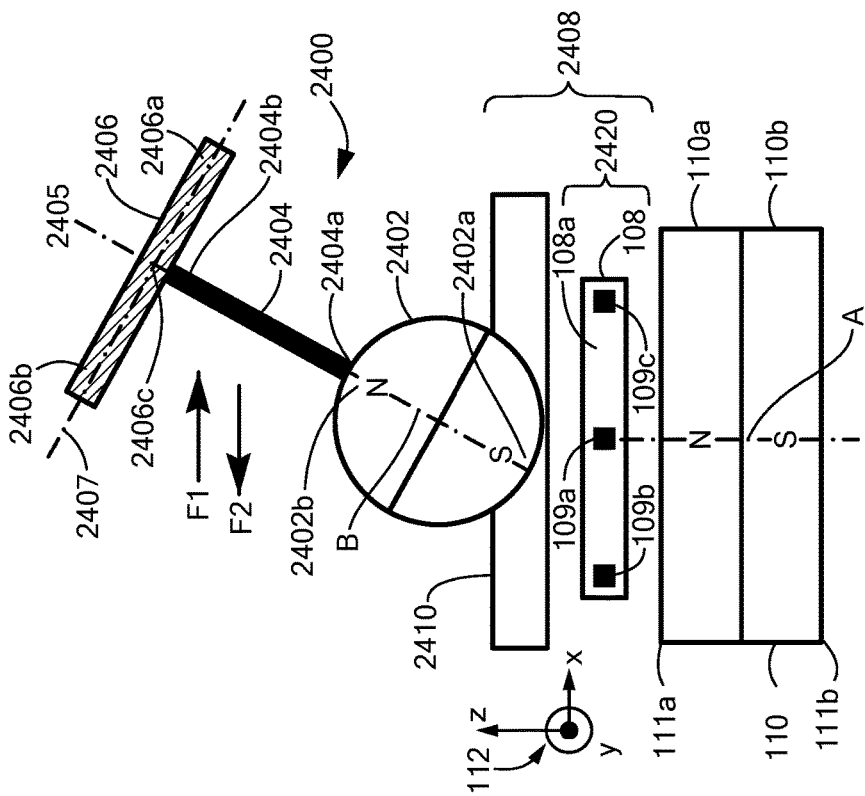
FIG. 31 is a side view of the joystick assembly of FIG. 26 with a change in position.

Referring to FIG. 31, in which like elements of FIGS. 26 and 30 are shown having like reference designations, the second magnet 2402 and the shaft 2404 of joystick assembly 2400 are shown moved to a first example position relative to the first magnet 110. Similar to the embodiment shown in FIG. 30, the second magnet 2402 may be moved to the first position in response to a user applying a force F1 upon at least one of the second magnet 2402, the shaft 2404 and the handle 2406. If the user were to release the second magnet 2402, the shaft 2404 and/or the handle 2406, the joystick assembly 2400 would return to its null or resting position, as shown in FIG. 26, for example, as a result of a restoring force F2.

In another example embodiment, the device housing 2609 may be shaped (e.g., comprise an opening) to allow for z-axis displacement of the second magnet 2402 relative to joystick surface 2610 (e.g., within cavity 2610a of joystick surface 2610). In such embodiment, the second magnet 2402 may, for example, be moved from a first z-axis position relative to the joystick surface 2610 to a second, different z-axis position relative to the joystick surface 2610 (e.g., for z-axis button like functionality) in response to a user applying a force from proximate the joystick surface 2610 to distal the joystick surface 2610. If the user were to release the second magnet 2402 (i.e., if the force were to no longer be applied), the joystick assembly 2400 would return to the first z-axis position (e.g., a null or resting position) as a result of a restoring force. The restoring force is a result of an attraction of the second magnet 2402 to the first magnet 110. It should be appreciated that other arrangements of the joystick assembly 2400 and the device 2608, including the device housing 2609, are possible.

Referring to FIG. 32, another example joystick assembly 3200 according to the disclosure is shown used with a device 3208 including a joystick surface 3210, a magnetic field sensor 3220, and a first magnet 3230 having north and south magnetic poles. The magnetic field sensor 3220, which can be the same as or similar to magnetic field sensor 2420 described in figures above, is disposed between the joystick surface 3210 and the first magnet 3230 and includes a plurality of magnetic field sensing elements 3221a, 3221b, 3221c (e.g., Hall effect elements).

The joystick assembly 3200 includes a second magnet 3202, a moveable elongated shaft 3204 and a handle 3206. The second magnet 3202, which is a substantially spherical magnet in the illustrated embodiment, has north and south magnetic poles. At least a first portion of the second magnet 3203 is attracted to the first magnet 3230 and may be positioned in contact with a corresponding portion of the joystick surface 3210, as shown. Additionally, at least a second portion of the second magnet 3202 is received in and fixedly coupled to a cavity 3204c formed in a first end 3204a of the shaft 3204, which shaft 3204 also has a second opposing end 3204b arranged along a major axis 3205 of the shaft 3204. The handle 3206 is fixedly coupled to the second end 3204b of the shaft 3204 in the illustrated embodiment.

Referring also to the side view of the joystick assembly 3200 shown in FIG. 33, the movable elongated shaft 3204 and the second magnet 3202 are removable (i.e., capable of "breaking away") from the joystick surface 3210 upon application of a force F1 which is greater than and in a substantially opposite direction with respect to the attraction of the second magnet 3202 to the first magnet 3230. Additionally, the shaft 3204 and the second magnet 3202 are capable of being coupled to the joystick surface 3210 upon application of a force F2 from a surface distal to the joystick surface 3210 to a surface proximate to the joystick surface 3210.

With the above-described arrangement, the joystick assembly 3200 can be coupled to the joystick surface 3210 and the magnetic field sensor may detect a position of the second magnet 3202 with respect to the first magnet 3230 when the joystick assembly 3200 is in use. Additionally, the joystick assembly 3200 can be removed from the joystick surface 3210 when the joystick assembly 3200 is not in use. The foregoing may, for example, provide for a plug and play type joystick assembly 3200, allowing for the device 3208 including the joystick surface 3210 to return to its original form-factor when the joystick assembly 3200 is not in use. Additionally, in safety critical applications (e.g., production environments), such arrangement may also prevent or reduce the possibility of the joystick assembly 3200 "sticking" to a user's clothing, which is desirable for reasons apparent.

Figure 34:
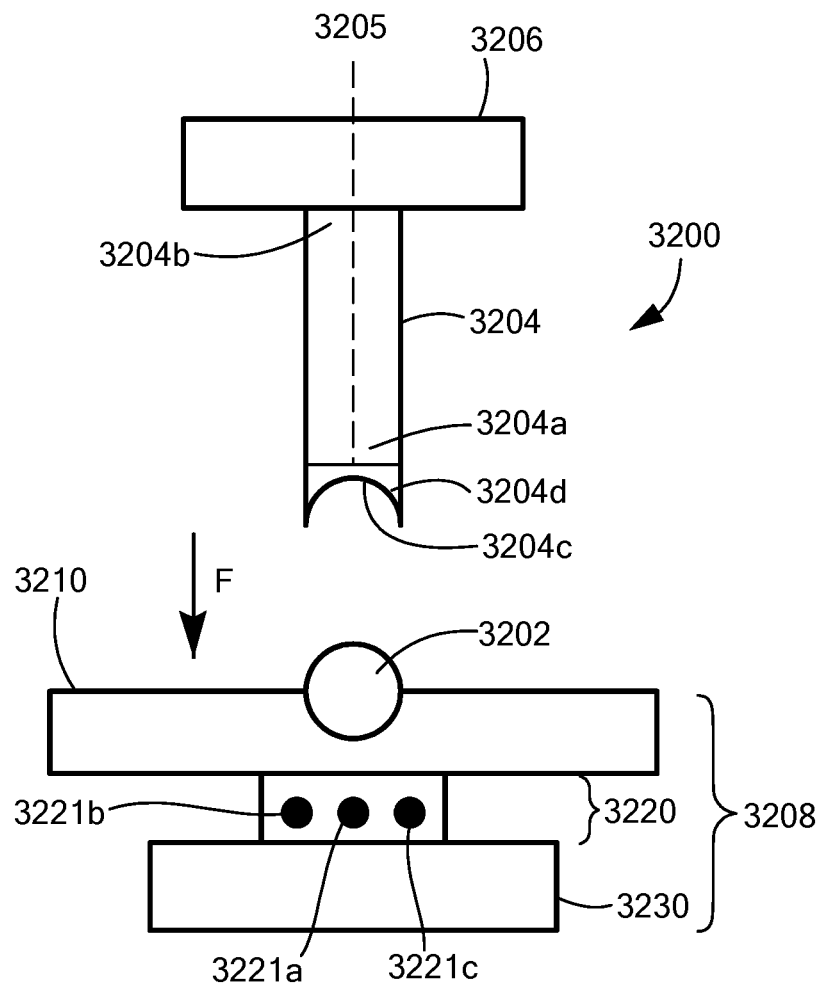
FIG. 34 is a side view of another example configuration of a joystick assembly according to the disclosure.

Referring to FIG. 34, in which like elements of FIGS. 32 and 33 are shown having like reference designations, another example joystick assembly 3400 is shown used with the device 3208 of FIGS. 32 and 33, the device 3208 including joystick surface 3210, magnetic field sensor 3220, and first magnet 3230.

The joystick assembly 3400 includes second magnet 3202, moveable elongated shaft 3204 and handle 3206. The second magnet 3203 may be attracted to the first magnet 3230 and at least a first portion of the second magnet 3203 may be may be positioned in contact with a corresponding portion of the joystick surface 3210, as shown. Additionally, at least a second portion of the second magnet 3202 may be received in and removably coupled to the cavity 3204c formed in a first end 3204a of the shaft 3204.

In one example embodiment, the cavity 3204c may include a third magnet 3204d having north and south magnetic poles and an attraction of the second magnet 3202 to the third magnet 3204d may result in the second magnet 3202 being received in and coupled to the cavity 3204c. Additionally, application of a force which is greater than and in a substantially opposite direction with respect to the attraction of the third magnet 3204d to the second magnet 3202 may result in the second magnet 3202 being decoupled or removed from the cavity 3204c.

In another example embodiment, the second magnet 3202 and the cavity 3204c may form a so-called "ball and socket" type assembly in which the second magnet 3202 is provided as a magnetic ball and the cavity 3204c is provided as a socket in which the magnetic ball is received. In such embodiment, the cavity 3204c may have one or more protrusions for "locking" the second magnet 3202 in place and a release mechanism for releasing the second magnet 3202 from the cavity 3204c. The release mechanism may, for example, move the protrusions from proximate an inner surface of the cavity 3204c to proximate an outer surface of the cavity 3204c, allowing for motion of the second magnet 3202 within the cavity 3204c. For example, the second magnet 3202 may be received in and coupled to the cavity 3204c upon application of a force F from distal the joystick surface 3210 to proximate the joystick surface 3210. Additionally, the second magnet 3202 may be decoupled from the cavity 3204c upon activation of the release mechanism and upon application of a force which is substantially opposite from the force F from proximate the joystick surface 3210 to distal the joystick surface 3210.

In some embodiments, the second magnet 3202 is fixedly coupled to the joystick surface 3210. For example, the second magnet 3202 may be substantially integrated into the device 3208 and the shaft 3204 may be coupled and decoupled from the second magnet 3202 as desired. In other embodiments, the second magnet 3202 is removable from the joystick surface 3210 and provided separate from the device 3208.

The handle 3206, similar to handle 3206 of FIGS. 32 and 33, is fixedly coupled to the second end 3204b of the shaft 3204 in the illustrated embodiment.

Referring to FIG. 35, another example joystick assembly 3500 according to the disclosure for use with a device (e.g., 3208, shown in FIG. 32) including at least a first magnet (e.g., 3230, shown in FIG. 32) includes a second magnet 3502, a moveable elongated shaft 3504 and a handle 3506. The second magnet 3502 has north and south magnetic poles and is fixedly coupled to a first end 3504a of the shaft 3504 (here, a first elongated shaft), which shaft 3504 also has a second opposing end 3504b arranged along a major axis 3505 of the shaft 3504. Additionally, the handle 3506, which takes the form of a second elongated shaft 3506 having first and second opposing ends 3506a, 3506b arranged along a major axis 3507 of the shaft 3506 in the illustrated embodiment, is movably coupled to the second end 3504b of the shaft 3504 via a hinge 3508. The handle 3706 may also be fixedly coupled to the shaft 3504 to form a substantially T-shaped assembly, e.g., using a first coupling structure comprising a first coupling portion 3511a provided on the handle 3506 and a second coupling portion 3511b provided on the shaft 3504. For example, the first coupling portion 3511a may have a recess configured to receive a corresponding projection of the second coupling portion 3511b.

Referring also to the side view of the joystick assembly 3500 shown in FIG. 36, the hinge 3508 is coupled between the handle 3506 and the shaft 3504, resulting in the handle 3506 being pivotable about at least one axis with respect to the shaft 3504, as shown by the arrows in FIGS. 35 and 36. The hinge 3508 also makes the handle 3506 foldable with respect to the shaft 3504 (e.g., making it relatively easy to stow away the joystick assembly 3500). In the illustrated embodiment, the first end 3506a of the handle 3506 may be fixedly coupled to a surface proximate to the second end 3504b of the shaft 3504, e.g., using a second coupling structure which may be the same as or different from the first coupling structure described above. As one example, the second coupling structure may comprise a first coupling portion 3512a provided on the handle 3506 and a second coupling portion 3512a provided on the shaft 3504, with the first coupling portion 3512a having a recess configured to receive a corresponding projection of the second coupling portion 3512b.

Referring to FIG. 37, in which like elements of FIGS. 35 and 36 are shown having like reference designations, another example joystick assembly 3700 includes second magnet 3502, a moveable elongated shaft 3704 and a handle 3706. The second magnet 3502 is fixedly coupled to a first end 3704a of the shaft 3704 (here, a first elongated shaft 3706), which shaft 3704 also has a second opposing end 3704b arranged along a major axis 3705 of the shaft 3704. Additionally, the handle 3706, which takes the form of a second elongated shaft 3706 having first and second opposing ends 3706a, 3706b arranged along a major axis 3707 of the shaft 3706 in the illustrated embodiment, is coupled to the second end 3704b of the shaft 3704 via a hinge 3508. The hinge 3508 is coupled between the handle 3706 and the shaft 3704, resulting in the handle 3706 being pivotable about at least one axis with respect to the shaft 3704, as shown by the arrow.

In the illustrated embodiment, the shaft 3704 also comprises a recess 3714 configured to receive at least a portion of the handle 3706 when the handle 3706 is folded. In one embodiment, when the handle 3706 is folded and the portion of the handle 3706 is received in the recess 3714, the shaft 3704 and the handle 3706 form at least one common planar surface 3715.

Figure 38:
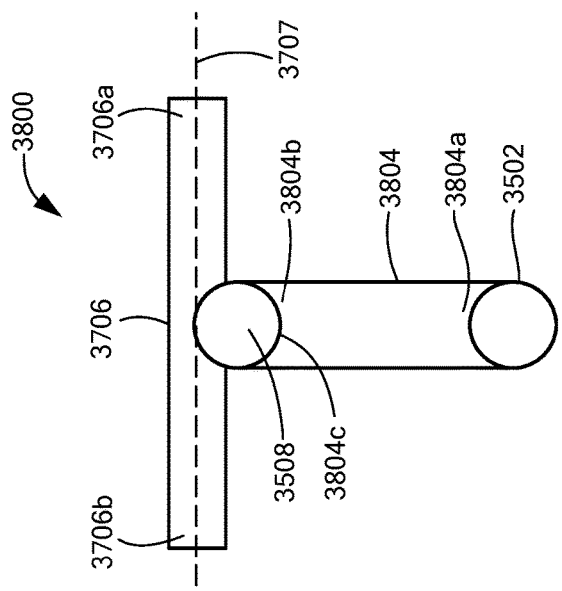
FIG. 38 is a side view of a further example configuration of a joystick assembly according to the disclosure.

Referring to FIG. 38, another example joystick assembly 3800 includes second magnet 3502, a moveable elongated shaft 3804 and handle 3706. The second magnet 3502 is fixedly coupled to a first end 3804a of the shaft 3804 and the handle 3706 is coupled to a second opposing end 3804b of the shaft 3804 via hinge 3508. In the illustrated embodiment, the hinge 3508 is received in and coupled to a cavity 3804c formed proximate to the second end 3804b of the shaft 3804.

The hinge 3508 results in the handle 3706 being pivotable about at least one axis with respect to the shaft 3804.

Figure 39:
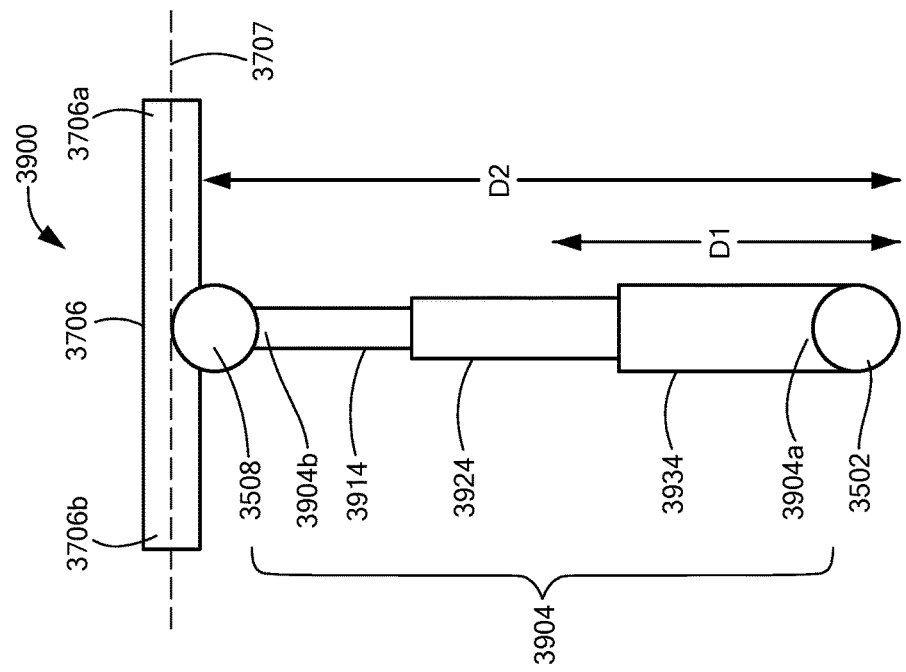
FIG. 39 is a side view of another example configuration of a joystick assembly according to the disclosure.

Referring to FIG. 39, another example joystick assembly 3900 includes second magnet 3502, a moveable elongated shaft 3904 and handle 3706. The second magnet 3502 is coupled proximate to a first end 3904a of the shaft 3904 and the handle 3706 is coupled proximate to a second opposing end 3904b of the shaft 3904 via a hinge 3508. The hinge 3508 is coupled between the second end 3904b of the shaft 3904 and the handle 3706, resulting in the handle 3706 being pivotable about at least one axis with respect to the shaft 3904.

In the illustrated embodiment, the shaft 3904 also includes an inner tube 3914, an outer tube 3934 and an intermediate tube 3924 between the inner tube 3914 and the outer tube 3934. Outer tube 3934 is telescopically slideable with respect to intermediate tube 3924 and intermediate tube 3924 is telescopically slideable with respect to inner tube 3914. In the illustrated embodiment, the shaft 3904 may, for example, extend from a first distance D1 to a second distance D2 which is greater than the distance D1 by telescopically sliding tubes 3914, 3924, 3934. As one example, it may be desirable to extend the shaft 3904 from distance D1 to distance D2, or a distance between distance D1 and distance D2, depending upon the device or application in which the joystick assembly 3900 is being used. As another example, the joystick assembly 3900 may be provided as a multi-purpose joystick assembly 3900, with the joystick assembly 3900 capable of being additionally used as a stylus or a pointing device in connection with the device in which the joystick assembly 3900 is used, or otherwise. In such embodiment, it may be desirable to extend the shaft 3904 depending upon a particular use of the joystick assembly 3900.

Figure 40:
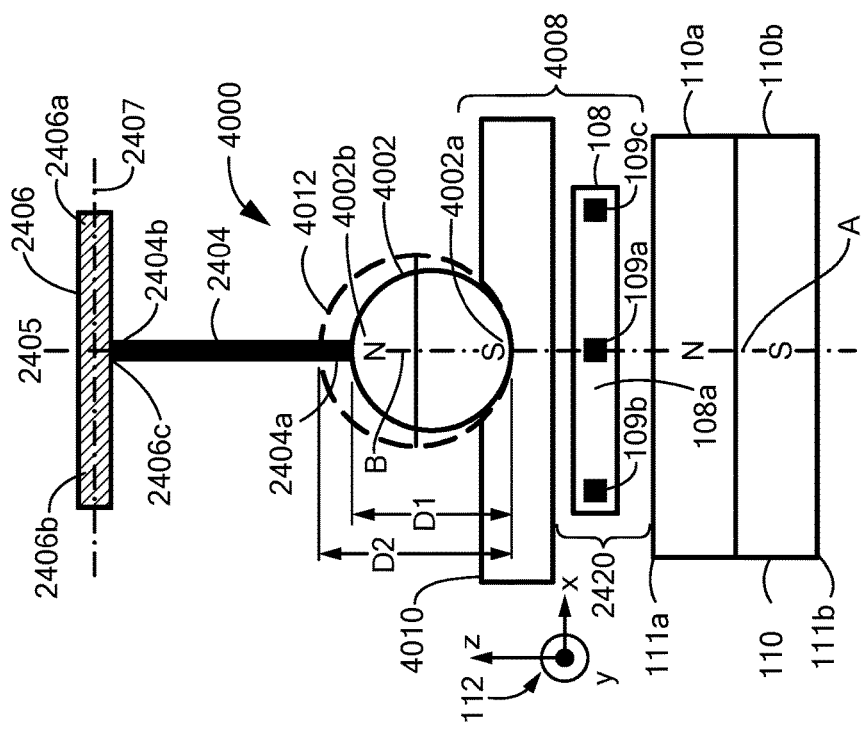
FIG. 40 is a side view of a further example configuration of a joystick assembly according to the disclosure.

Referring to FIG. 40, in which like elements of FIG. 24 are shown having like reference designations, another example joystick assembly 4000 according to further embodiment of the disclosure is shown used with a device 4008 including a joystick surface 4010, magnetic field sensor 2420, and first magnet 110. The magnetic field sensor 2420 is disposed between the joystick surface 4010 and the first magnet 110.

The joystick assembly 4000 includes a second magnet 4002, movable elongated shaft 2404 and a handle 2406. The second magnet 4002, which can be the same as or similar to second magnet 2402 described above in connection with FIG. 24, has a first portion 4002a proximate to the joystick surface 4010 and to a first surface 111a of the first magnet 110. Additionally, the second magnet 4002 has a second portion 4002b distal from the joystick surface 4010 and the first surface 111a of the first magnet 110. The first portion 4002a of the second magnet 4002 corresponds to a south magnetic pole S of the second magnet 4002, and the second portion 4002b of the second magnet 4002 corresponds to a north magnetic pole N of the second magnet 4002 in the illustrated embodiment.

The first portion 4002a of the second magnet 4002 may be attracted to the first surface 111a of the first magnet 110 and may be positioned in contact with the joystick surface 4010. Additionally, the second portion 4002b of the second magnet 4002 may be removably coupled to (e.g., threaded or clamped onto) the first end 2404a of the movable elongated shaft 2404 in the illustrated embodiment. An attraction force between the second magnet 4002 and the first magnet 110 results in a restoring force upon the shaft 2404, with the restoring force allowing for the shaft 2404 to achieve the shown null or resting position when substantially no other force is applied to the shaft 2404. Additionally, a magnitude of the attraction force, as detected by magnetic field sensor 2420, as will be discussed, is associated with a joystick classification according to the disclosure. The joystick classification may, for example, comprise a user classification, the user classification being one of an administrator, a user, an operator and a manager. The user classification may additionally or alternatively correspond to any number of job titles or classifications as may be suitable for gaming applications. For example, a gaming application may apply different software configurations based on the user classification (or "type" of joystick that is attached).

Specifically, magnetic field sensing elements 109a, 109b, 109c of magnetic field sensor 2420 are configured to generate a respective plurality of magnetic field signals in response to a detected magnetic field, with the detected magnetic field being indicative of a position of the second magnet 4002 relative to the first magnet 110, the magnitude of the attraction force between the second magnet 4002 and the first magnet 110, and the joystick classification associated with the attraction force.

In one embodiment, the magnitude of the attraction force and the associated joystick classification are a function of size and/or a shape of the second magnet 4002, with the second magnet 4002 capable of being removed from the first end 2404a of the shaft 2404 and replaced with another second magnet (e.g., depending upon a desired joystick classification). For example, the second magnet 4002 may be substantially spherical magnet, as shown, and the magnitude of the attraction force and the associated joystick classification may be a function of a diameter of the second magnet 4002 coupled to the shaft 2404. The second magnet 4002, which has a first diameter D1 in the illustrated embodiment, may result in the attraction force between the second magnet 4002 and the first magnet 110 having a first magnitude, with the first magnitude associated with a first joystick classification (e.g., user). Additionally, a second magnet 4012, which is shown in dotted lines and has a second larger diameter D2 than the first diameter D1, may result in the attraction force having a second larger magnitude than the first magnitude, with the second magnitude associated with a second joystick classification (e.g., administrator).

Figure 41:
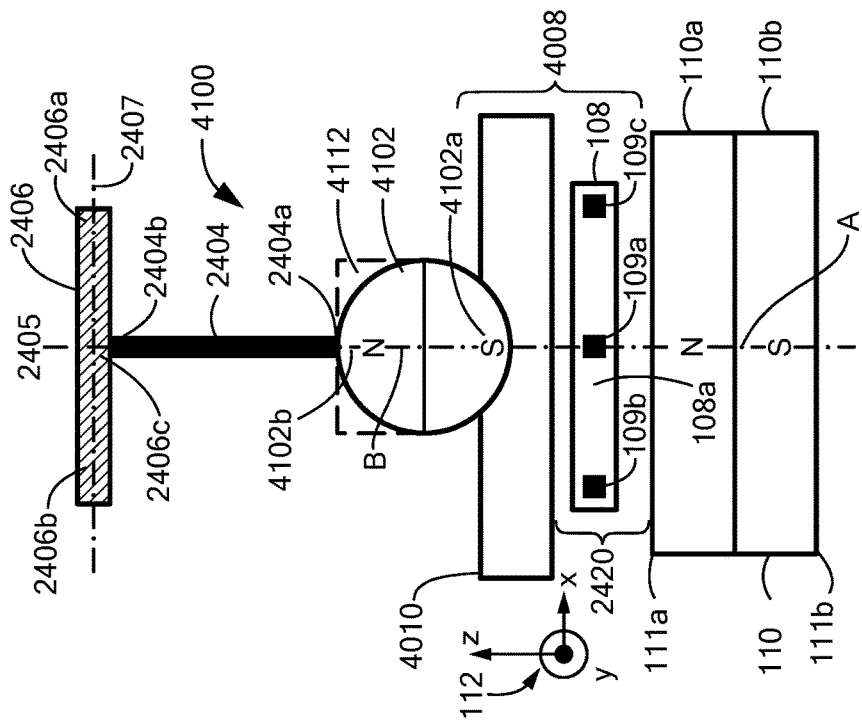
FIG. 41 is a side view of another example configuration of a joystick assembly according to the disclosure.

Referring also to the side view of a similar joystick assembly 4100 shown in FIG. 41, a second magnet 4102, which has a first shape, may result in the attraction force having a third magnitude, with the third magnitude associated with a third joystick classification (e.g., operator). Additionally, a second magnet 4112, which is shown in dotted lines and has a second shape which is different from the first shape, may result in the attraction force having a fourth larger magnitude than the third magnitude, with the fourth magnitude associated with a fourth joystick classification (e.g., manager).

The magnitude of the attraction force and the associated joystick classification may additionally or alternatively be a function of a material or materials of the second magnets (e.g., 4102). For example, the second magnet 4102 may comprise a first magnetic material or a first combination of magnetic materials (e.g., one or more ferromagnetic material(s) including, but not limited to, a hard ferrite, samarium-cobalt (SmCo), Neodymium Iron Boron (NdFeB), resulting in the attraction force having a fifth magnitude, with the fifth magnitude associated with a fifth joystick classification. Additionally, the second magnet 4112 may comprise a second magnetic material or a second combination of magnetic materials which is/are different from the first magnetic material or the first combination of magnetic materials, resulting in the attraction force having a sixth larger magnitude than the fifth magnitude, with the sixth magnitude associated with a sixth joystick classification.

It should be appreciated that the second magnets according to the joystick assemblies of FIGS. 40 and 41 may also be replaced with a different second magnet to adjust a weight of the second magnet (e.g., based on user preferences and/or the application in which the joystick assembly is used). Adjusting a weight of the second magnet (e.g., 4102) may, for example, providing for different responsivity levels of the shaft 2404 to forces applied by a user. For example, with a heavier second magnet, the user would have to apply more force to the shaft 2404 to move the shaft 2404 and the second magnet, allowing for slower and potentially more precise movement of the shaft 2404 and the second magnet. In some embodiments, a sensitivity level of the magnetic field sensor 2420 may also be adjusted to provide for responsivity variations.

Figure 42:
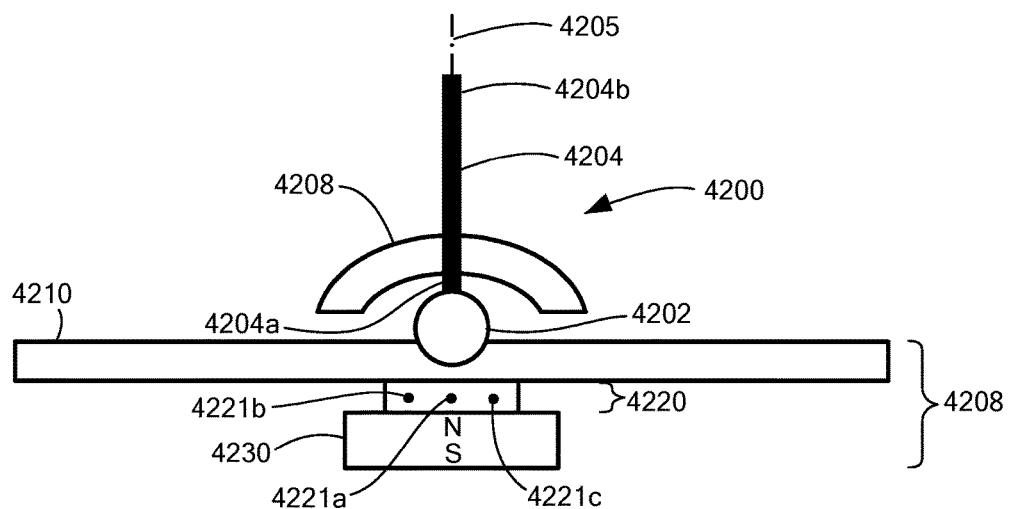
FIG. 42 is a side view of a further example configuration of a joystick assembly according to the disclosure.

Referring to FIG. 42, another example joystick assembly 4200 according to a further embodiment of the disclosure is shown used with a device 4208 including a joystick surface 4210, a magnetic field sensor 4220, and a first magnet 4230 having north and south magnetic poles. The magnetic field sensor 4220, which can be the same as or similar to magnetic field sensor 2420 described in figures above, is disposed between the joystick surface 4210 and the first magnet 4230 and includes a plurality of magnetic field sensing elements 4221a, 4221b, 4221c (e.g., Hall effect elements).

The joystick assembly 4200 includes a second magnet 4202, a moveable elongated shaft 4204 and a motion restriction element 4208. The second magnet 4202 has north and south magnetic poles and at least a first portion of the second magnet 4203 is attracted to the first magnet 4230 and may be positioned in contact with a corresponding portion of the joystick surface 4210, as shown. Additionally, at least a second portion of the second magnet 4202 is fixedly coupled to a first end 4204a of the shaft 4204, which shaft 4204 also has a second opposing end 4204b arranged along a major axis 4205 of the shaft 4204.

The motion restriction element 4208, which may take the form of a variety of shapes and sizes, is coupled to proximate to the first end 4204a of the shaft 4204 in the illustrated embodiment and is configured to restrict an excursion (e.g., a range of motion) of the second magnet 4202 with respect to the joystick surface 4210 to a predetermined excursion. For example, the motion restriction element 4208 may take the form of a "C" shape and the dimensions of the motion restriction element 4208 may be selected based, at least in part, on the predetermined excursion.

Figure 43:
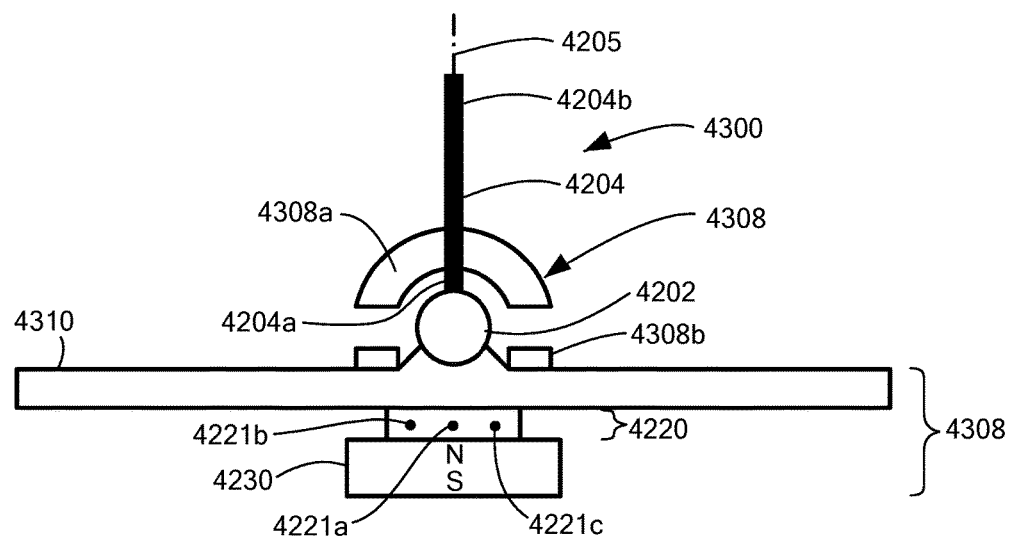
FIG. 43 is a side view of another example configuration of a joystick assembly according to the disclosure.

Referring also to a side view of example joystick assembly 4300 shown in FIG. 43, in which like elements of FIG. 42 are shown having like reference designations, a joystick assembly 4300 includes another example motion restriction element 4308 having a first motion restriction portion 4308a and a second motion restriction portion 4308b. The first motion restriction portion 4308a is coupled substantially near or proximate to the first end 4204a of the shaft 4204 and the second motion restriction portion 4308b is disposed on the joystick surface 4310 of a device 4308 in FIG. 42. The second motion restriction portion 4308b may, for example, further restrict an excursion of the second magnet 4202 with respect to the joystick surface 4310 to the predetermined excursion. Dimensions of the first and second motion restriction portions 4308a, 4308b may, for example, be selected based, at least in part, on the predetermined excursion.

While motion restriction elements are only shown in the embodiments of FIGS. 42 and 43, it should be appreciated that motion restriction elements can be incorporated into substantially any of the joystick assemblies described above in conjunction with FIGS. 24-43.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

All references cited herein are hereby incorporated herein by reference in their entirety.

It is to be appreciated that the concepts, systems, circuits and techniques sought to be protected herein are not limited to use with particular devices (e.g., mobile computing devices) but rather, may be useful in substantially any device and application where it is desired to have a joystick assembly. For example, while the joystick assemblies are described as suitable for use with mobile computing devices in figures above, it should be appreciated that the joystick assemblies disclosed herein can also be found suitable for use in many other devices and applications including those found in an automobile, e.g., for controlling an automobile stereo (e.g., for selection of a radio station or a particular feature of the stereo) and/or for selection of specific terrain settings in a vehicle terrain management system of the vehicle for optimizing performance of the vehicle in various driving conditions, such as mud, sand, and snow).

Having described preferred embodiments, which serve to illustrate various concepts, structures and techniques, which are the subject of this patent, it will now become apparent that other embodiments incorporating these concepts, structures and techniques may be used.

Additionally, elements of different embodiments described herein may be combined to form other embodiments not specifically set forth above.

Accordingly, it is submitted that the scope of the patent should not be limited to the described embodiments but rather should be limited only by the spirit and scope of the following claims.

What is claimed is:

1. A joystick assembly for use with a device comprising a joystick surface and a first magnet having north and south magnetic poles, comprising:
   a second magnet having north and south magnetic poles; and
   a movable elongated shaft having first and second opposing ends arranged along a major axis of the shaft, the first end coupled to the second magnet such that movement of the shaft results in movement of the second magnet relative to the first magnet such that a line between centers of the north and south magnetic poles of the second magnet is movable relative to a line between the north and south magnetic poles of the first magnet, wherein an attraction of the second magnet to the first magnet results in a restoring force upon the shaft, and wherein the shaft and the second magnet are removable from the joystick surface.

2. The joystick assembly of claim 1, wherein the device further comprises a magnetic field sensor disposed between the joystick surface and the second magnet, the magnetic field sensor comprising a plurality of magnetic field sensing elements supported by a substrate and configured to generate a respective plurality of magnetic field signals and to detect a position of the second magnet relative to the first magnet.

3. The joystick assembly of claim 1, wherein the device further comprises a device housing having at least two couplable portions, wherein at least one of the couplable portions includes the joystick surface.

4. The joystick assembly of claim 1, wherein the second magnet is a substantially spherical magnet, and the first end of the shaft comprises a cavity in which the second magnet is retained.

5. The joystick assembly of claim 4, wherein the second magnet is removable from the shaft upon application of a predetermined force.

6. The joystick assembly of claim 5, wherein the second magnet and the shaft take the form of a ball and socket type assembly.

7. The joystick assembly of claim 1, further comprising a handle coupled to the second end of the movable elongated shaft.

8. The joystick assembly of claim 7, wherein the movable elongated shaft comprises a first elongated shaft and the handle takes the form of a second elongated shaft having first and second opposing ends arranged along a major axis of the second elongated shaft.

9. The joystick assembly of claim 8, wherein a portion between the first and second ends of the second elongated shaft is coupled to the second end of the movable elongated shaft.

10. The joystick assembly of claim 7, wherein the handle is fixedly coupled to the movable elongated shaft.

11. The joystick assembly of claim 7, wherein the movable elongated shaft and the handle form a substantially T-shaped assembly.

12. The joystick assembly of claim 7, wherein the movable elongated shaft and the handle form a substantially L-shaped assembly.

13. The joystick assembly of claim 7, wherein the handle is foldable with respect to the movable elongated shaft.

14. The joystick assembly of claim 13, further comprising a hinge coupled between the handle and the movable elongated shaft, the hinge resulting in the handle being pivotable about at least one axis with respect to the movable elongated shaft.

15. The joystick assembly of claim 1, further comprising a motion restriction element configured to restrict an excursion of the second magnet with respect to the joystick surface to a predetermined excursion.

16. The joystick assembly of claim 15, wherein the motion restriction element is coupled to the movable elongated shaft proximate to the first end of the shaft.

17. The joystick assembly of claim 15, wherein the motion restriction element is disposed on the joystick surface.

18. The joystick assembly of claim 1, wherein the device is at least one of a smartphone, a tablet computer, and instrumentation console, a video game console, a video game controller, a keyboard, and a laptop computer.

* * * * *

UNITED STATES PATENT AND TRADEMARK OFFICE
CERTIFICATE OF CORRECTION

| | |
|---|---|
| PATENT NO. | : 10,048,718 B2 |
| APPLICATION NO. | : 15/224942 |
| DATED | : August 14, 2018 |
| INVENTOR(S) | : Ali Husain Yusuf Sirohiwala |

It is certified that error appears in the above-identified patent and that said Letters Patent is hereby corrected as shown below:

Column 2, Line 22, delete "parallel the" and replace with --parallel to the--

Column 2, Line 34, delete "to a an x-axis" and replace with --to an x-axis--

Column 3, Line 1, delete "parallel the" and replace with --parallel to the--

Column 3, Line 5, delete "parallel the" and replace with --parallel to the--

Column 3, Line 17, delete "a an x-axis" and replace with --an x-axis--

Column 3, Line 37, delete "parallel the" and replace with --parallel to the--

Column 3, Line 61, delete "result in" and replace with --results in--

Column 4, Line 14, delete "parallel the" and replace with --parallel to the--

Column 4, Line 18, delete "parallel the" and replace with --parallel to the--

Column 4, Line 28, delete "a an x-axis" and replace with --an x-axis--

Column 4, Line 49, delete "a an x-axis" and replace with --an x-axis--

Column 5, Line 2, delete "result in" and replace with --results in--

Column 5, Line 24, delete "a an x-axis" and replace with --an x-axis--

Column 5, Line 41, delete "a an x-axis" and replace with --an x-axis--

Column 5, Line 64, delete "result in" and replace with --results in--

Signed and Sealed this
Thirteenth Day of November, 2018

Andrei Iancu
*Director of the United States Patent and Trademark Office*

CERTIFICATE OF CORRECTION (continued)
U.S. Pat. No. 10,048,718 B2

Column 9, Line 55, delete "of signal" and replace with --of a signal--

Column 12, Line 31, delete "describe and electronic" and replace with --describe an electronic--

Column 12, Lines 34-35, delete "as used to" and replace with --is used to--

Column 13, Line 53, delete "109b as a" and replace with --109b has a--

Column 14, Line 2, delete "that a similar" and replace with --that similar--

Column 14, Line 48, delete "by user" and replace with --by a user--

Column 14, Line 54, delete "104 substantially" and replace with --104 is substantially--

Column 15, Line 34, delete "cavity surface 908a" and replace with --cavity surface 906a--

Column 17, Line 26, delete "x-axis" and replace with --y-axis--

Column 17, Line 61, delete "in with a" and replace with --with a--

Column 18, Line 65, delete "are signal also larger" and replace with --signals are also larger--

Column 18, Line 67, delete "unit indicative" and replace with --units indicative--

Column 19, Line 7, delete "of magnetic assemblies" and replace with --of the magnetic assemblies--

Column 19, Line 65, delete "tilt angle" and replace with --tilt angles--

Column 20, Line 27, delete "for" and replace with --four--

Column 20, Line 36, delete "element" and replace with --elements--

Column 20, Line 47, delete "6010" and replace with --1610 are--

Column 20, Line 48, delete "amplifier" and replace with --amplifiers--

Column 20, Line 48, delete "associated the" and replace with --associated with the--

Column 20, Line 52, delete "6020, 6028" and replace with --1620, 1626--

Column 20, Line 57, delete "amplifier 1628" and replace with --amplifier 1626--

Column 21, Line 23, delete "1634" and replace with --1636--

CERTIFICATE OF CORRECTION (continued)
U.S. Pat. No. 10,048,718 B2

Column 21, Line 26, delete "1634" and replace with --1636--

Column 21, Line 33, delete "1624, 1628" and replace with --1624, 1630--

Column 21, Line 57, delete "processor 1636" and replace with --processor 1638--

Column 21, Line 62, delete "and SPI" and replace with --an SPI--

Column 21, Line 63, delete "and I²C" and replace with --an I²C--

Column 22, Line 11, delete "1620a" and replace with --1626a--

Column 22, Line 37, delete "shown and" and replace with --shown in--

Column 22, Line 42, delete "shown and" and replace with --shown in--

Column 23, Line 6, delete "shown in" and replace with --shown and--

Column 24, Line 13, delete "2200" and replace with --2202--

Column 24, Line 19, delete "2206" and replace with --2206a--

Column 24, Line 37, delete "only result in" and replace with --only in--

Column 24, Lines 51-52, delete "angle relative the x-axis" and replace with --angle relative to the y-axis--

Column 25, Line 47, delete "2314a, 2314b, 2314c" and replace with --2320a, 2320b, 2320c--

Column 25, Line 48, delete "2314a, 2314b, 2314c" and replace with --2320a, 2320b, 2320c--

Column 26, Line 1, delete "2200" and replace with --2302--

Column 26, Line 24, delete "x-axis" and replace with --y-axis--

Column 26, Line 55, delete "one under twenty" and replace with --one hundred twenty--

Column 27, Line 5, delete "2322aa" and replace with --2322a--

Column 27, Line 24, delete "of each magnetic" and replace with --of each of the magnetic--

Column 27, Line 33, delete "degree apart" and replace with --degrees apart--

Column 28, Line 5, delete "of each magnetic" and replace with --of each of the magnetic--

Column 28, Line 14, delete "degree apart" and replace with --degrees apart--

CERTIFICATE OF CORRECTION (continued)
U.S. Pat. No. 10,048,718 B2

Column 28, Equation 7, delete
"$$X = \frac{(X_{2312a} + D_{2312a}) + (X_{2312b} - D_{2312b}COS(60)) + (X_{2312c} - D_{2312c}COS(60))}{3}$$" and replace with
--$$X = \frac{(X_{2318a} + D_{2318a}) + (X_{2318b} - D_{2318b}COS(60)) + (X_{2318c} - D_{2318c}COS(60))}{3}$$--

Column 28, Line 60, delete "$X_{1312c}$" and replace with --$X_{2318c}$--

Column 29, Equation 7, delete
"$$X = \frac{(X_{2312a} + D_{2312a}) + (X_{2312b} - D_{2312b}COS(60)) + (X_{2312c} - D_{2312c}COS(60))}{3}$$" and replace with -
-$$X = \frac{(X_{2318a} + D_{2318a}) + (X_{2318b} - D_{2318b}COS(60)) + (X_{2318c} - D_{2318c}COS(60))}{3}$$--

Column 29, Line 20, delete "$X_{1312c}$" and replace with --$X_{2318c}$--

Column 29, Equation 9, delete "$$Y = \frac{(Y_{2312b} + D_{2312b}COS(30)) + (Y_{2312c} - D_{2312c}COS(30))}{2}$$" and replace with --$$Y = \frac{(Y_{2318b} + D_{2318b}COS(30)) + (Y_{2318c} - D_{2318c}COS(30))}{2}$$--

Column 31, Line 62, delete "for so-called a "pointing" and replace with --for a so-called "pointing--

Column 34, Line 56, delete "2707" and replace with --2407--

Column 35, Line 59, delete "trackball 2903" and replace with --trackball 2902--

Column 37, Lines 34-35, delete "magnet 3203" and replace with --magnet 3202--

Column 38, Line 7, delete "assembly 3400" and replace with --assembly 3200--

Column 38, Line 11, delete "assembly 3400" and replace with --assembly 3200--

Column 38, Line 13, delete "magnet 3203" and replace with --magnet 3202--

Column 38, Line 14, delete "magnet 3203" and replace with --magnet 3202--

Column 38, Line 15, delete "may be may be positioned" and replace with --may be positioned--

Column 39, Line 9, delete "handle 3706" and replace with --handle 3506--

Column 39, Line 32, delete "portion 3512a" and replace with --portion 3512b--

CERTIFICATE OF CORRECTION (continued)
U.S. Pat. No. 10,048,718 B2

Column 41, Line 29, delete "be substantially" and replace with --be a substantially--

Column 42, Line 11, delete "providing" and replace with --provide--

Column 42, Line 34, delete "magnet 4203" and replace with --magnet 4202--

Column 42, Line 42, delete "coupled to proximate" and replace with --coupled proximate--

Column 42, Line 60, delete "device 4308" and replace with --device 4208--

Column 43, Line 59, delete "removable from the joystick surface." and replace with --removable from the joystick surface wherein the movable elongated shaft and the second magnet are removable upon application of a force which is greater than and in a substantially opposite direction with respect to the attraction of the second magnet to the first magnet.--

Column 44, Lines 58-59, delete "and instrumentation" and replace with --an instrumentation--